United States Patent [19]
Eggebeen et al.

[11] Patent Number: 6,166,884
[45] Date of Patent: Dec. 26, 2000

[54] APPARATUS AND SYSTEM FOR STABILIZING A DISK MEDIA SURFACE FOR ENGAGEMENT WITH A DRIVE HEAD

[75] Inventors: James Eggebeen, Temecula, Calif.; Ronald F. Hales; Tolan Brown, both of Roy, Utah; Robert Allen Bruce, Fruit Heights, Utah

[73] Assignee: Iomega Corporation, Roy, Utah

[21] Appl. No.: 09/182,930

[22] Filed: Oct. 30, 1998

[51] Int. Cl.⁷ .................................................. G11B 5/82
[52] U.S. Cl. .......................................................... 360/135
[58] Field of Search .......................... 360/135; 428/65.3, 428/694 R

[56] References Cited

U.S. PATENT DOCUMENTS

| | | | |
|---|---|---|---|
| 3,947,893 | 3/1976 | Hall, Sr. ................................ | 360/133 |
| 4,091,454 | 5/1978 | Kauffmann ............................ | 360/135 |
| 4,149,207 | 4/1979 | Porter, Jr. et al. .................... | 360/133 |
| 4,562,505 | 12/1985 | Mroz ..................................... | 360/135 |
| 5,012,380 | 4/1991 | Harissis et al. ....................... | 360/135 |

*Primary Examiner*—Robert S. Tupper
*Attorney, Agent, or Firm*—Woodcock Washburn Kurtz Mackiewicz & Norris LLP

[57] ABSTRACT

An apparatus and system for improving the contact between the heads of a disk drive and the storage media of the disk by improving disk stability. The apparatus comprises a disk having a disk stability pattern disposed proximate a center region of the disk. The disk stability pattern improves disk stability by reducing vibration modes in the spinning disk, thereby minimizing the formation of standing waves in the spinning disk media, and by improving disk compliance, thereby minimizing disk anisotropic curl and tilt.

23 Claims, 58 Drawing Sheets

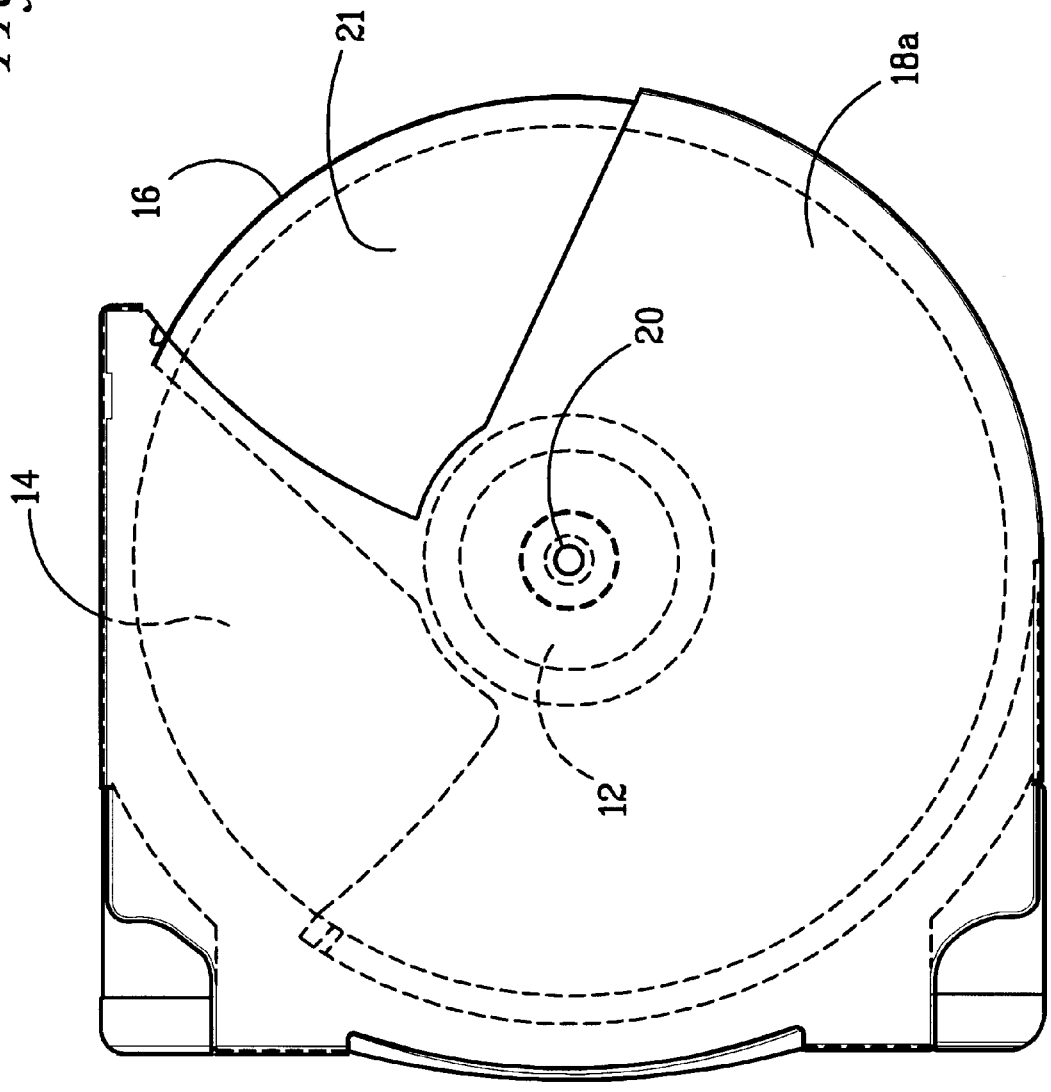

Disk standing waves using non-circular attachment method

FIG. 8A1

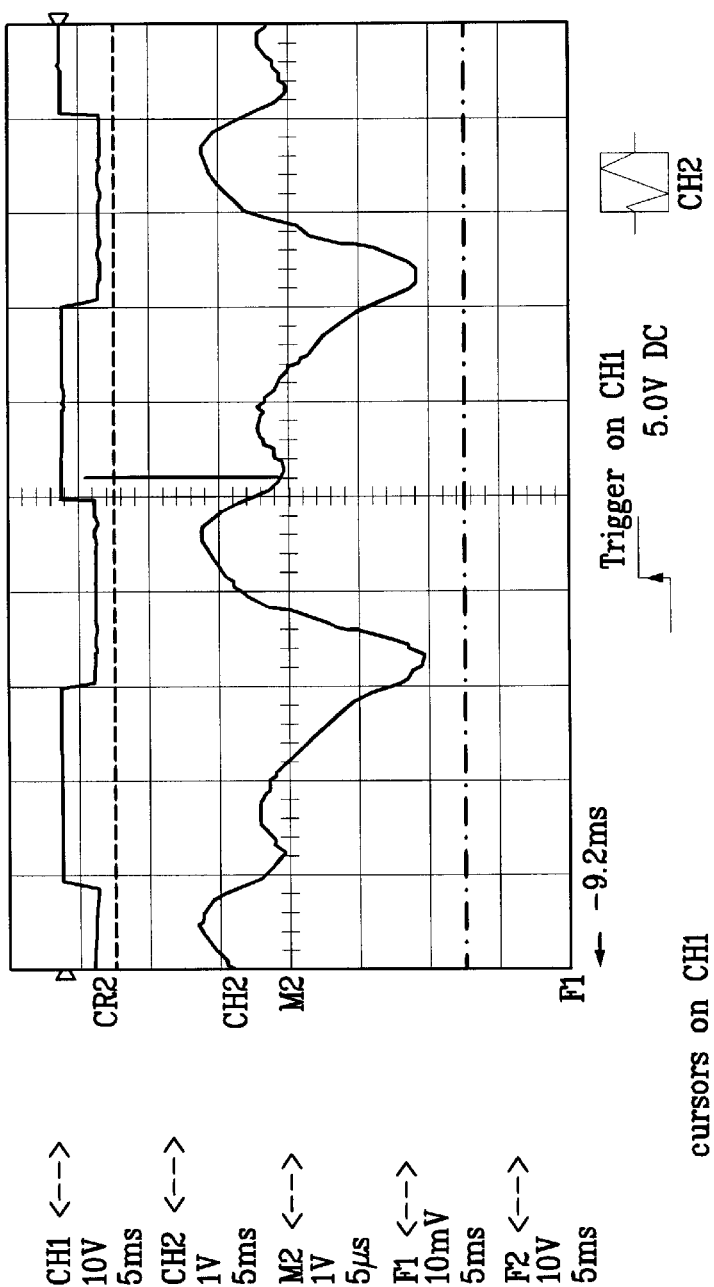
FIG. 8A2

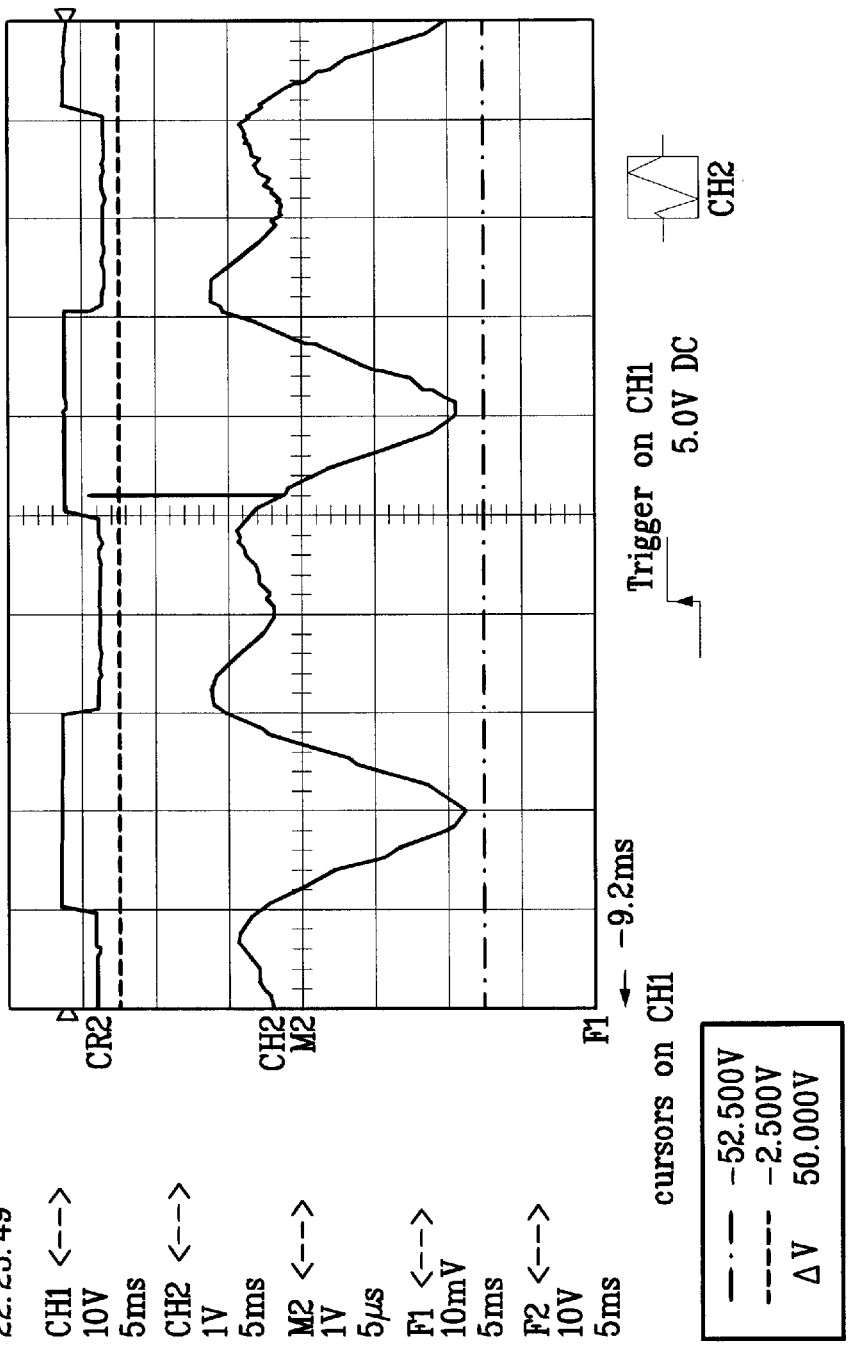
FIG. 8A3

13-Dec-96
23:03:56

After 16 Hole Pattern
DHA A
1 Volt (division) = 10 microns
MMC Glue DHA
File 004.bmp
Full Head Extension (Micrometer Setting 0.253)

Recalibration Suggested (SYSTEM CONFIG Menu)

RUN ☒
Normal

CH1 13 Dec, 23:03:53
DC, BWL:20MHz
V@Center −27.5V
t@Center 40.8ms

CH2 13 Dec, 23:03:53
DC, BWL:20MHz
V@Center 0.0V
t@Center 40.8ms

M2 06 Feb, 01:28:15
V@Center 0.0V
t@Center 50.000μs

F1 13 Dec, 23:03:53
V@Center 497.3mV
t@Center 40.8ms

F2 13 Dec, 23:03:53
V@Center −27.5V
t@Center 40.8ms

CH1 <—>  10V  5ms
CH2 <—>  1V   5ms
M2  <—>  1V   5μs
F1  <—>  10mV 5ms
F2  <—>  10V  5ms

Trigger on CH1
5.0V DC cursors on CH1

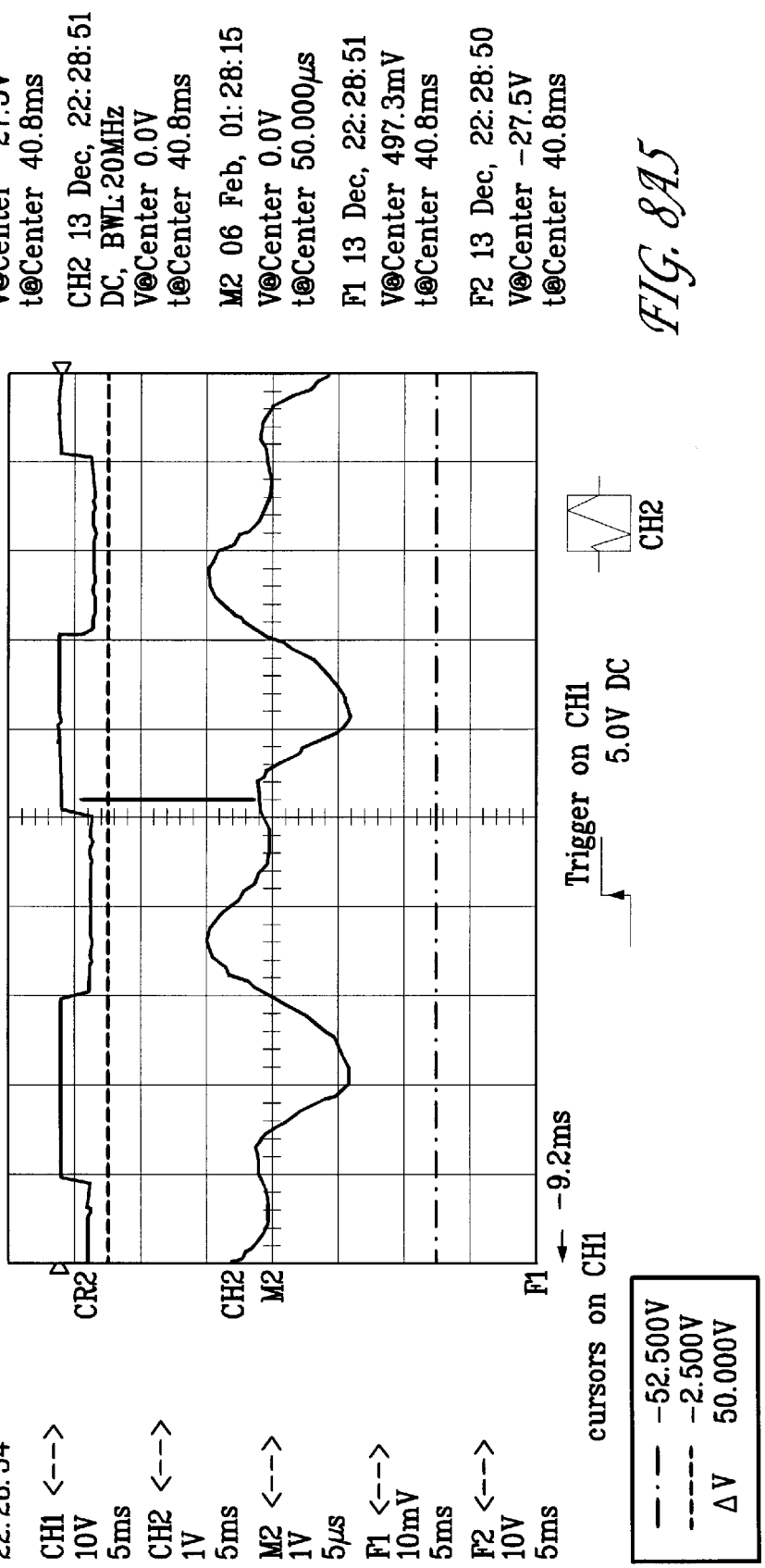
FIG. 8A5

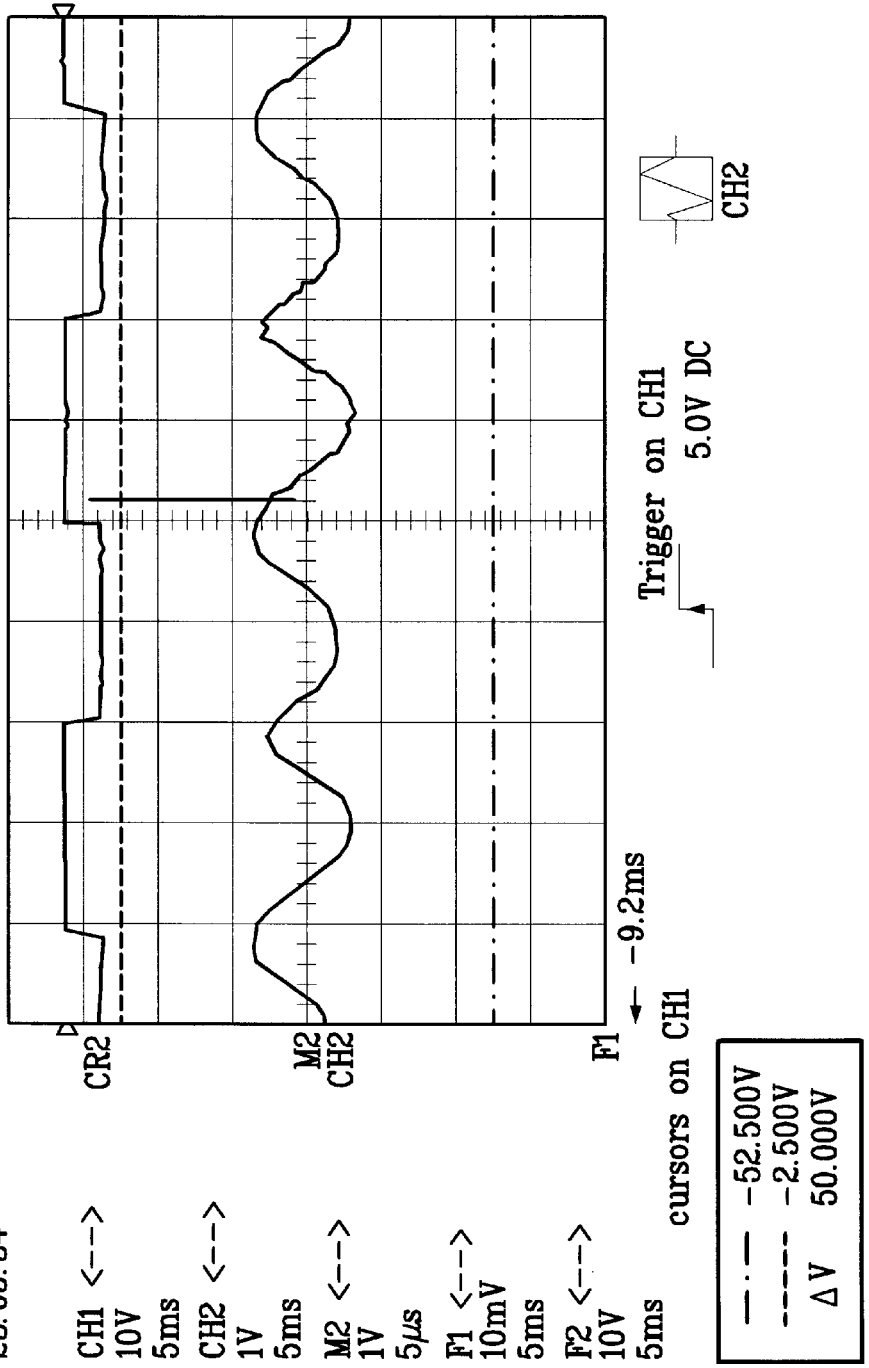
FIG. 8A6

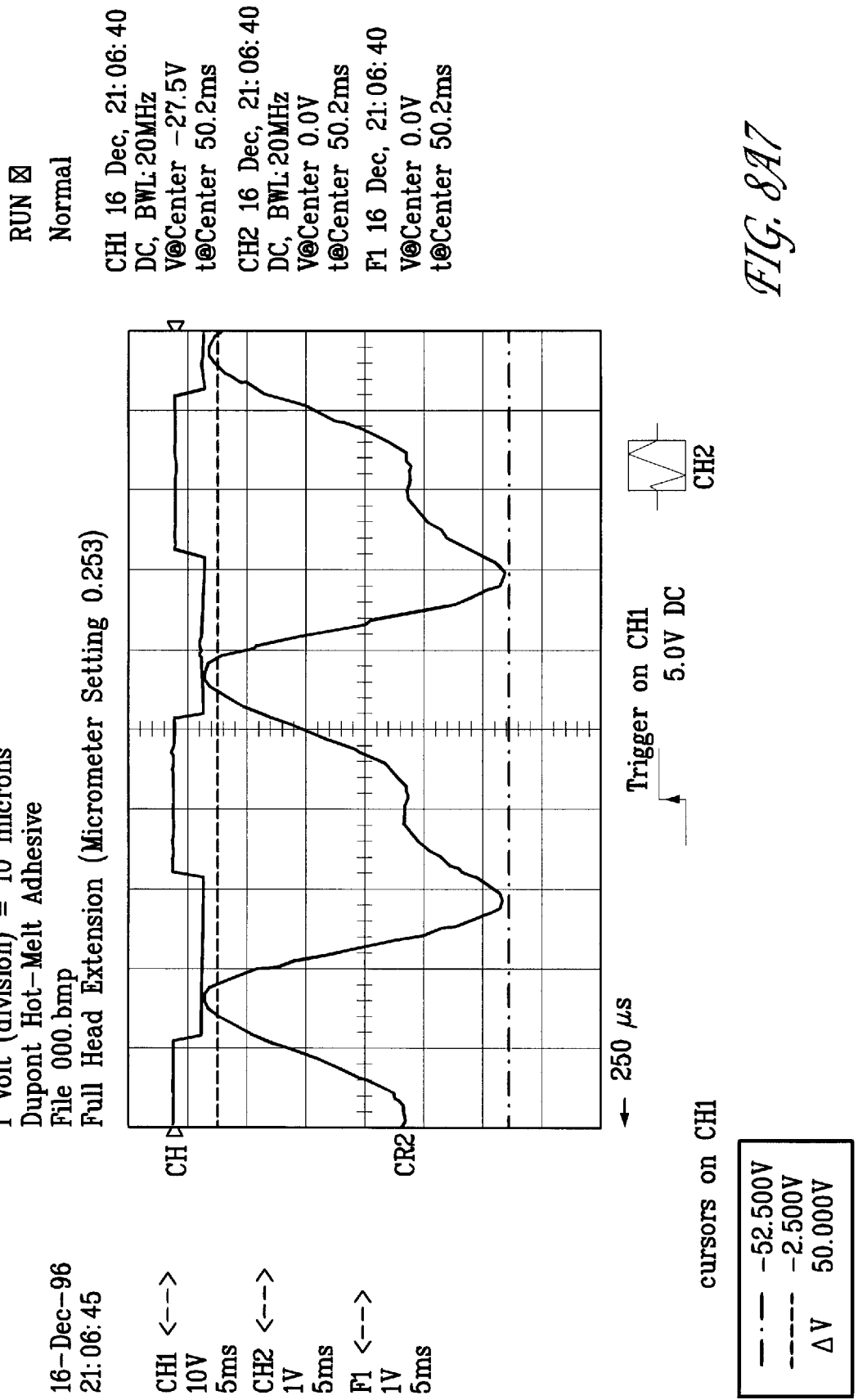
FIG. 8A7

FIG. 8A8

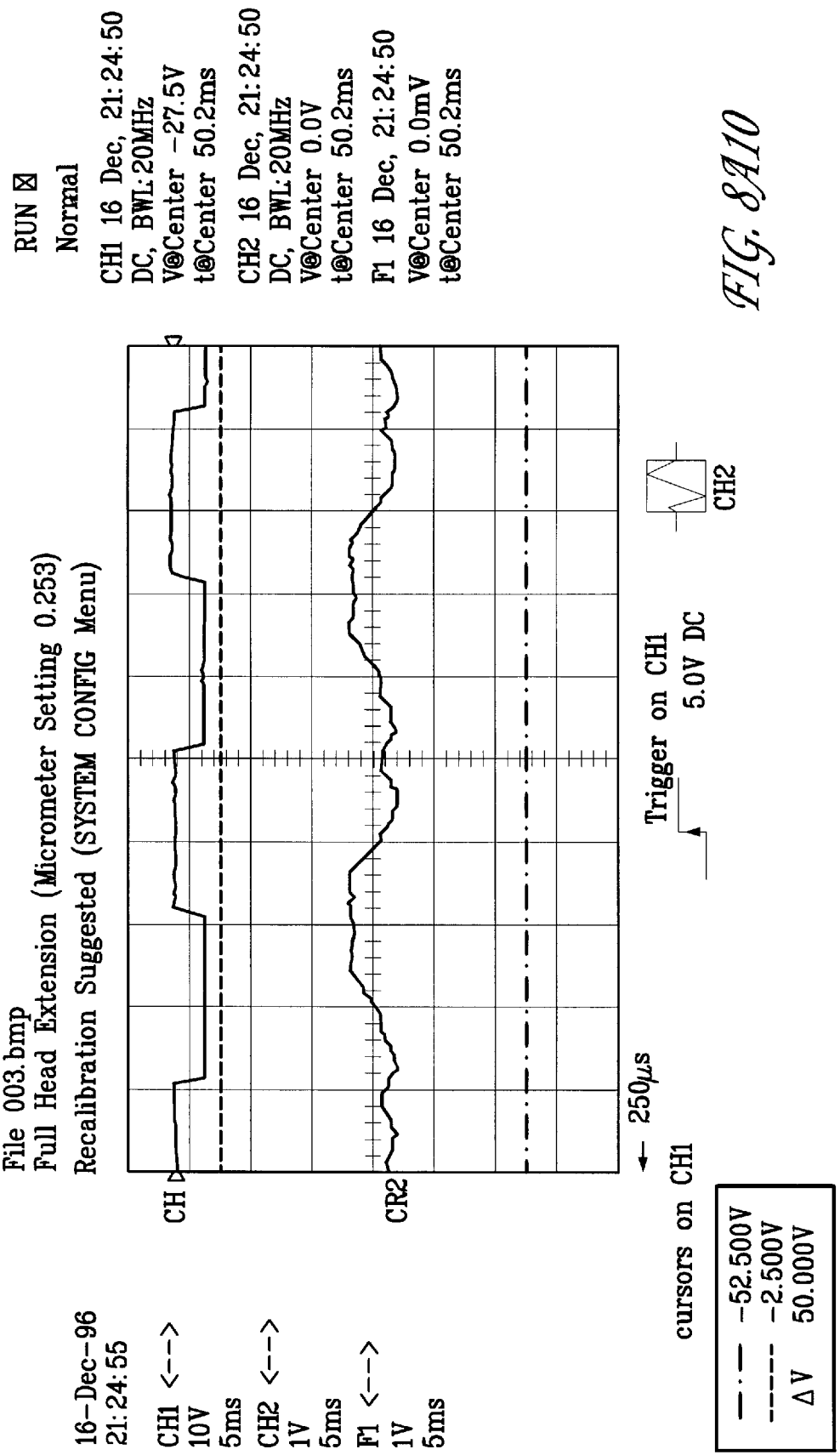
FIG. 8A10

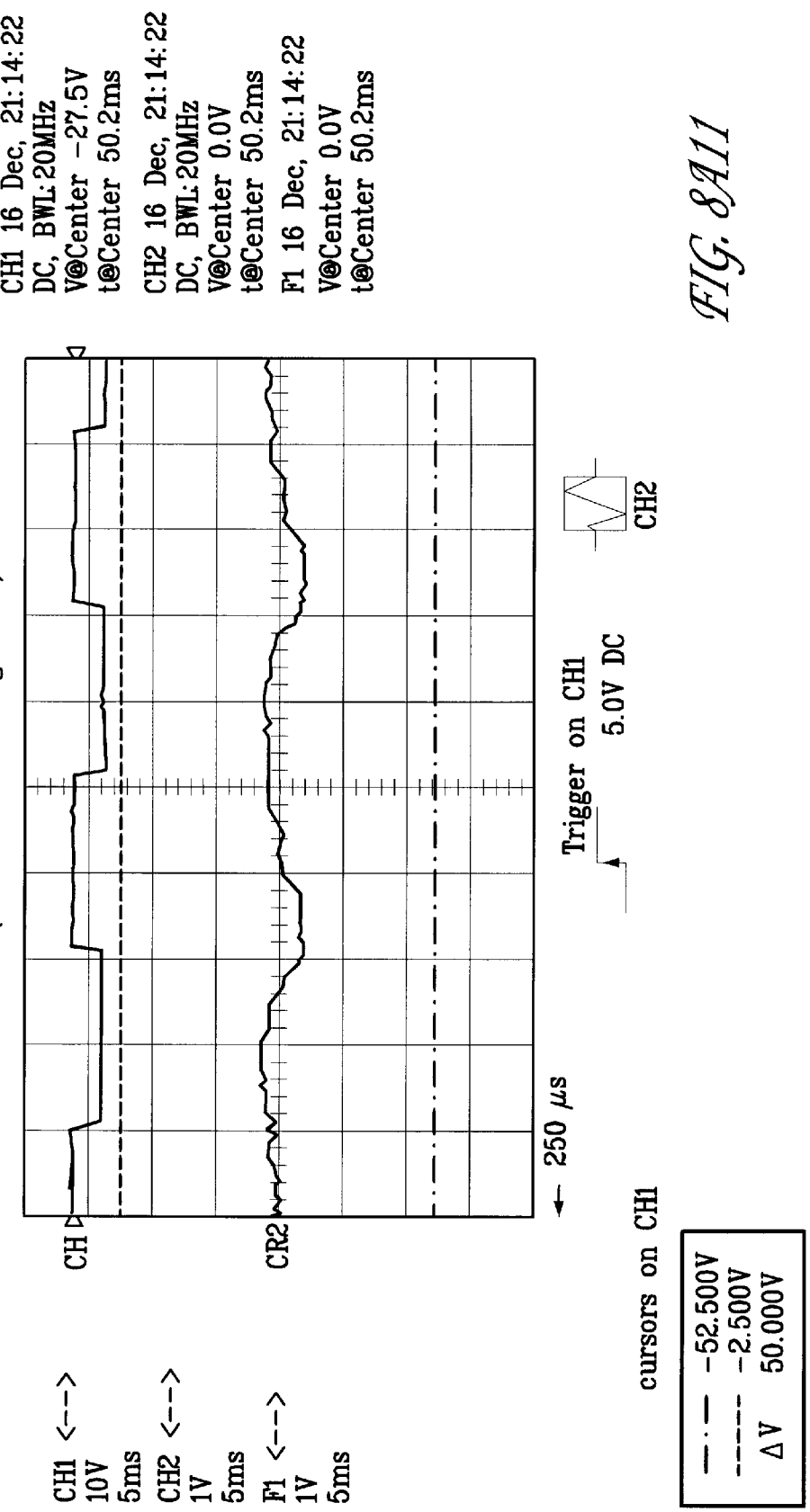
FIG. 8A11

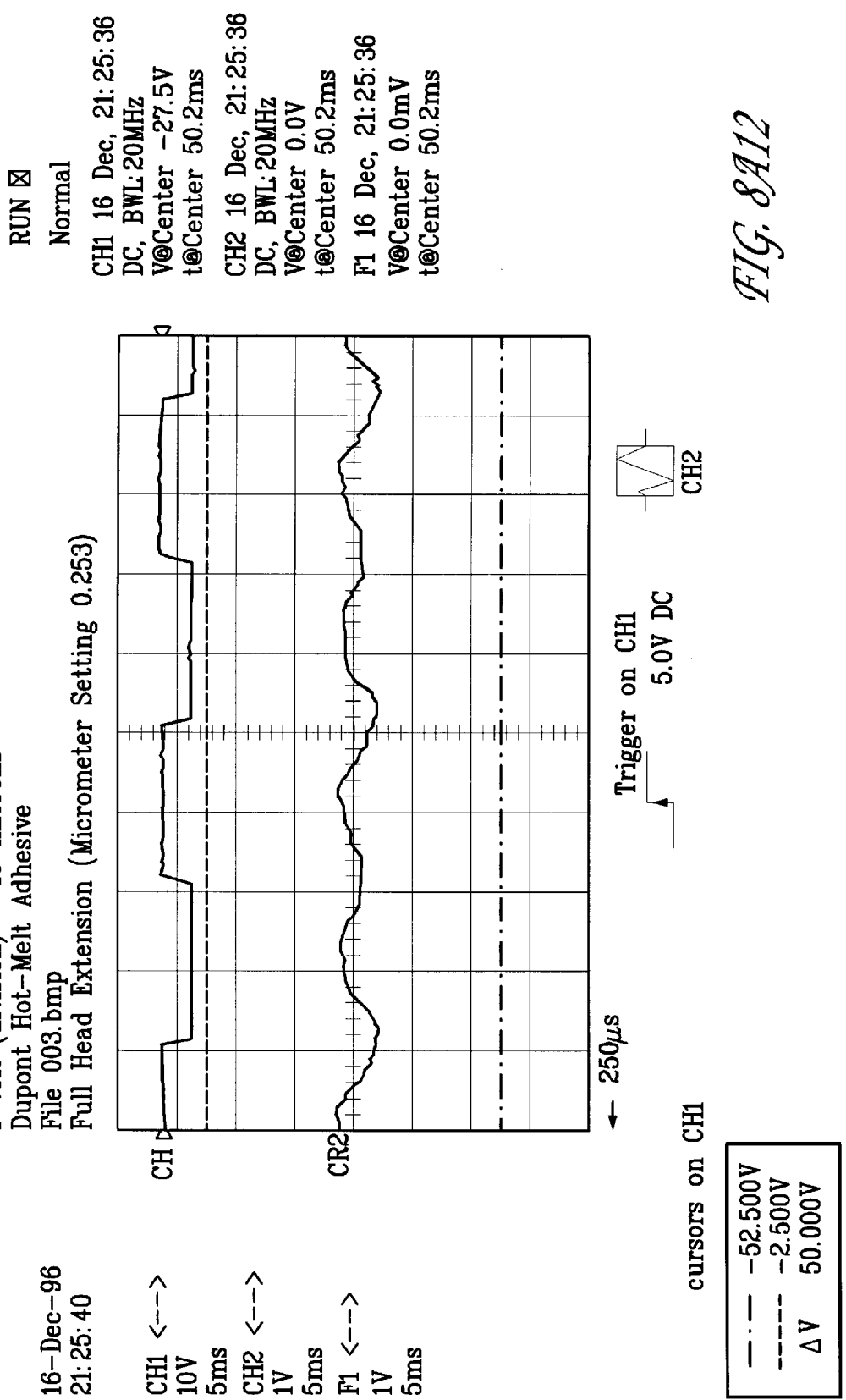
FIG. 8A12

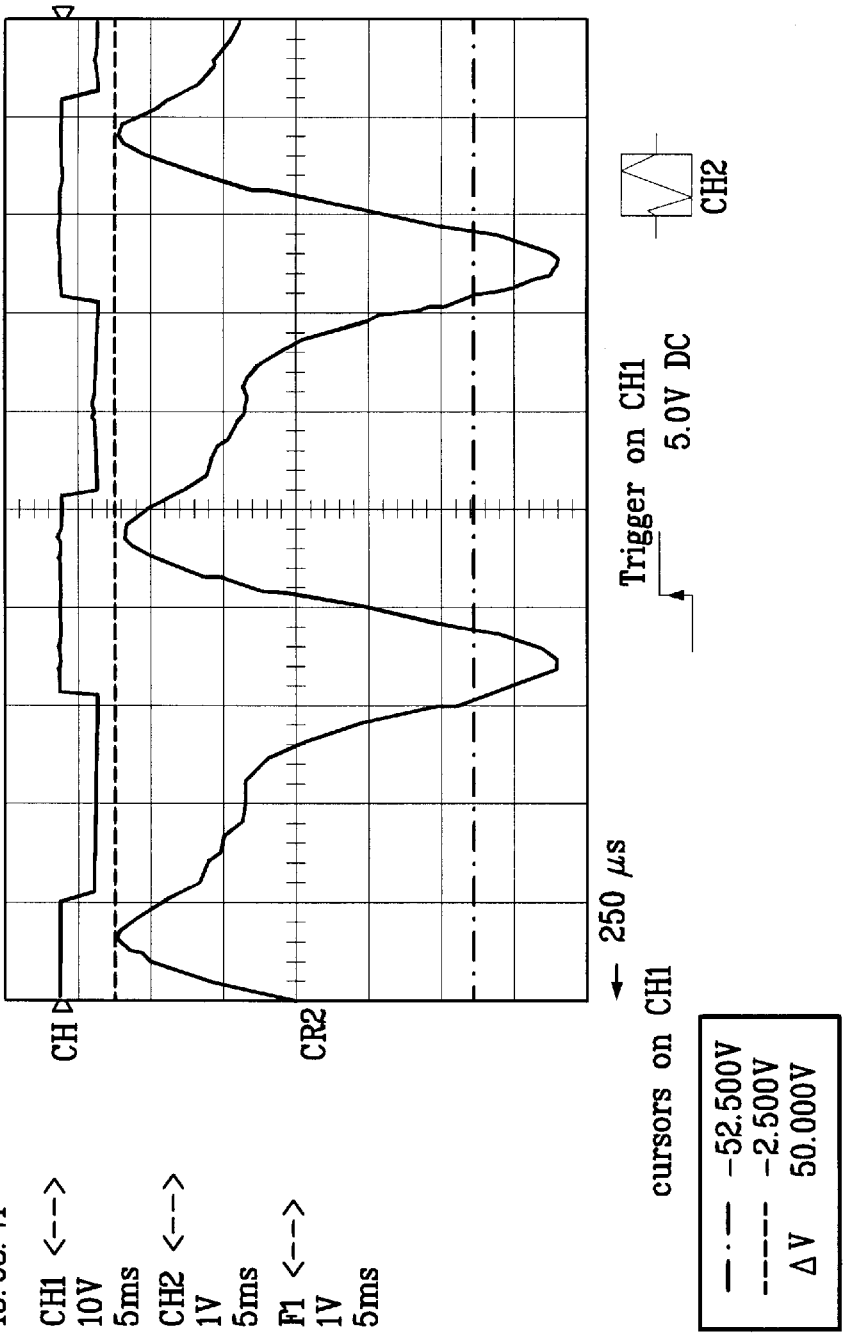
FIG. 8A13

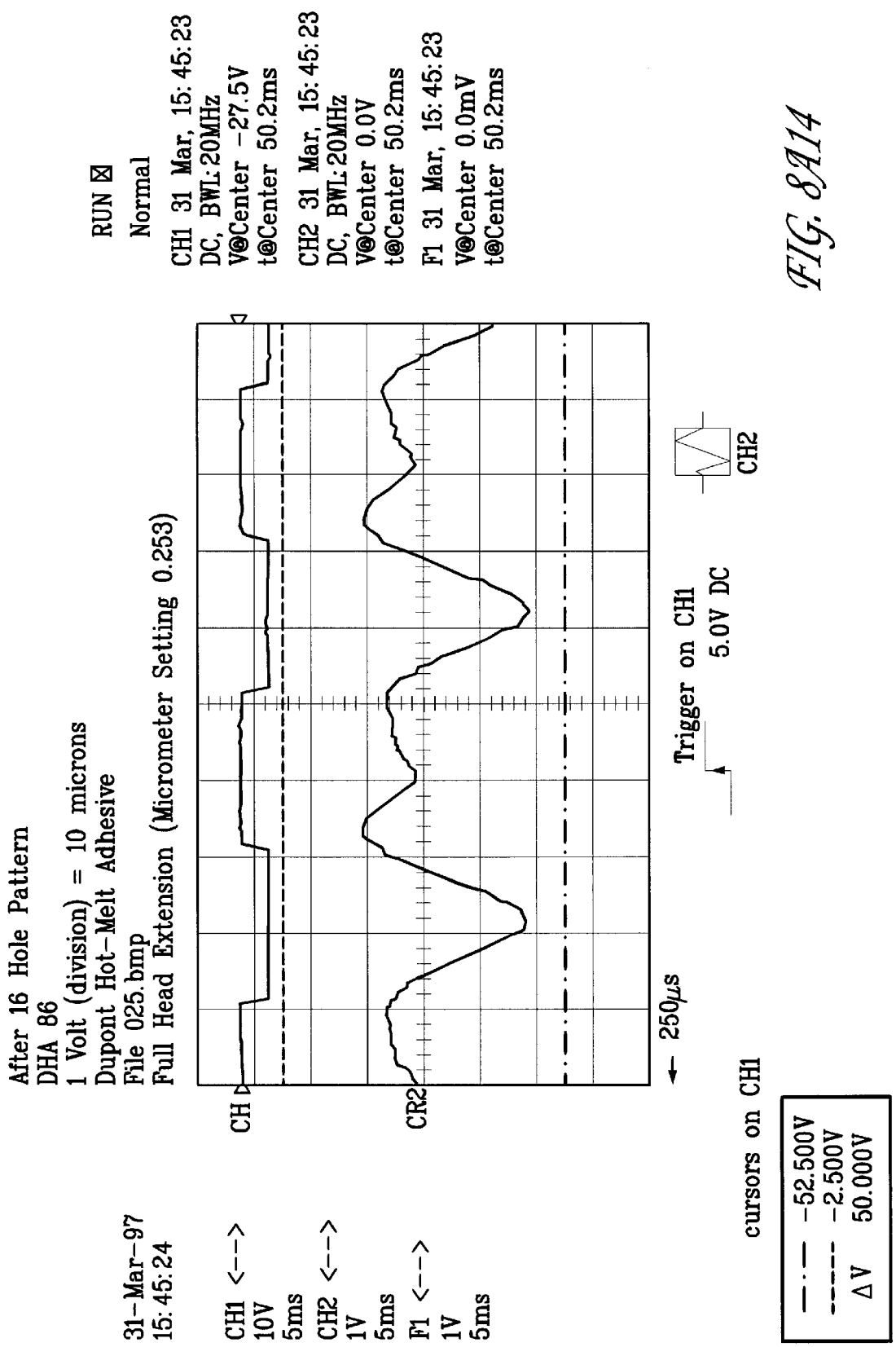
FIG. 8A14

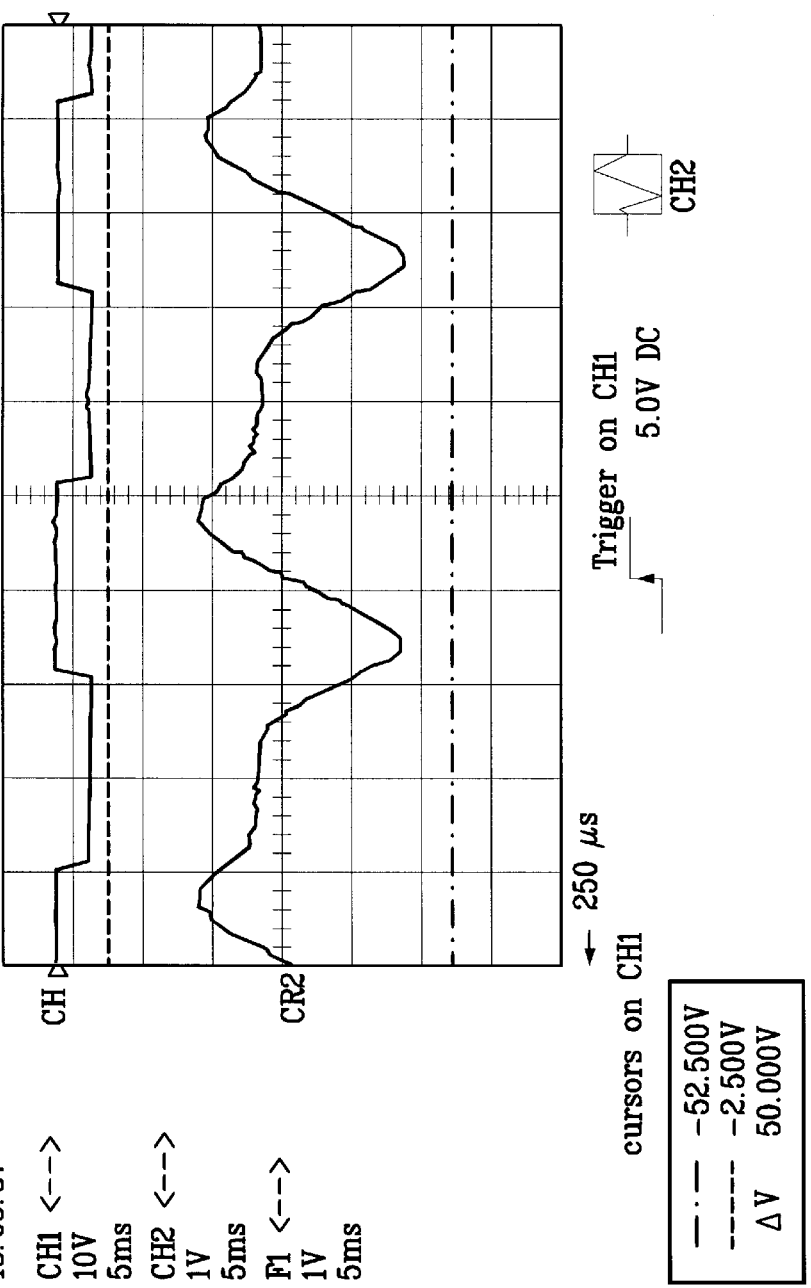
FIG. 8A15

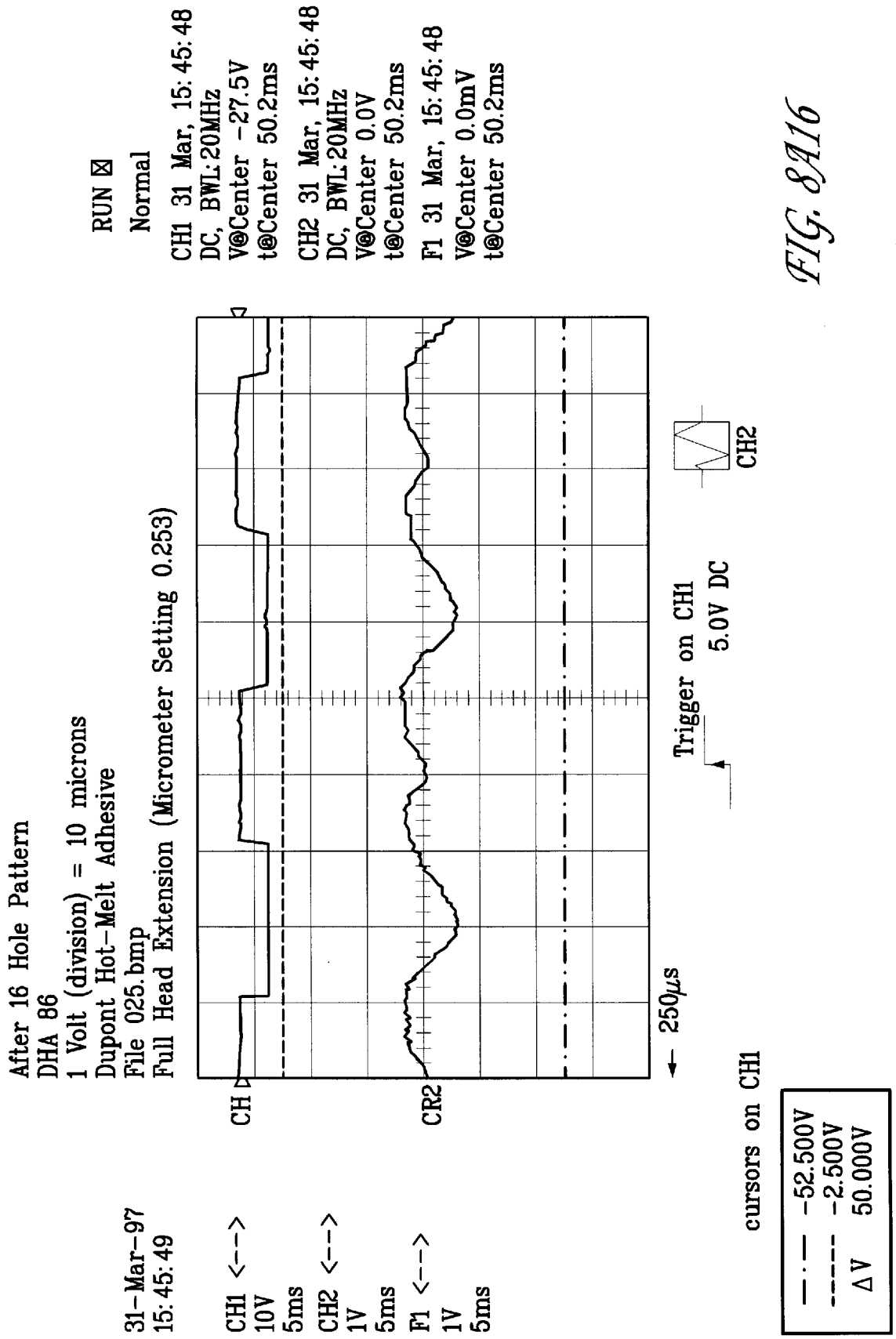
FIG. 8A16

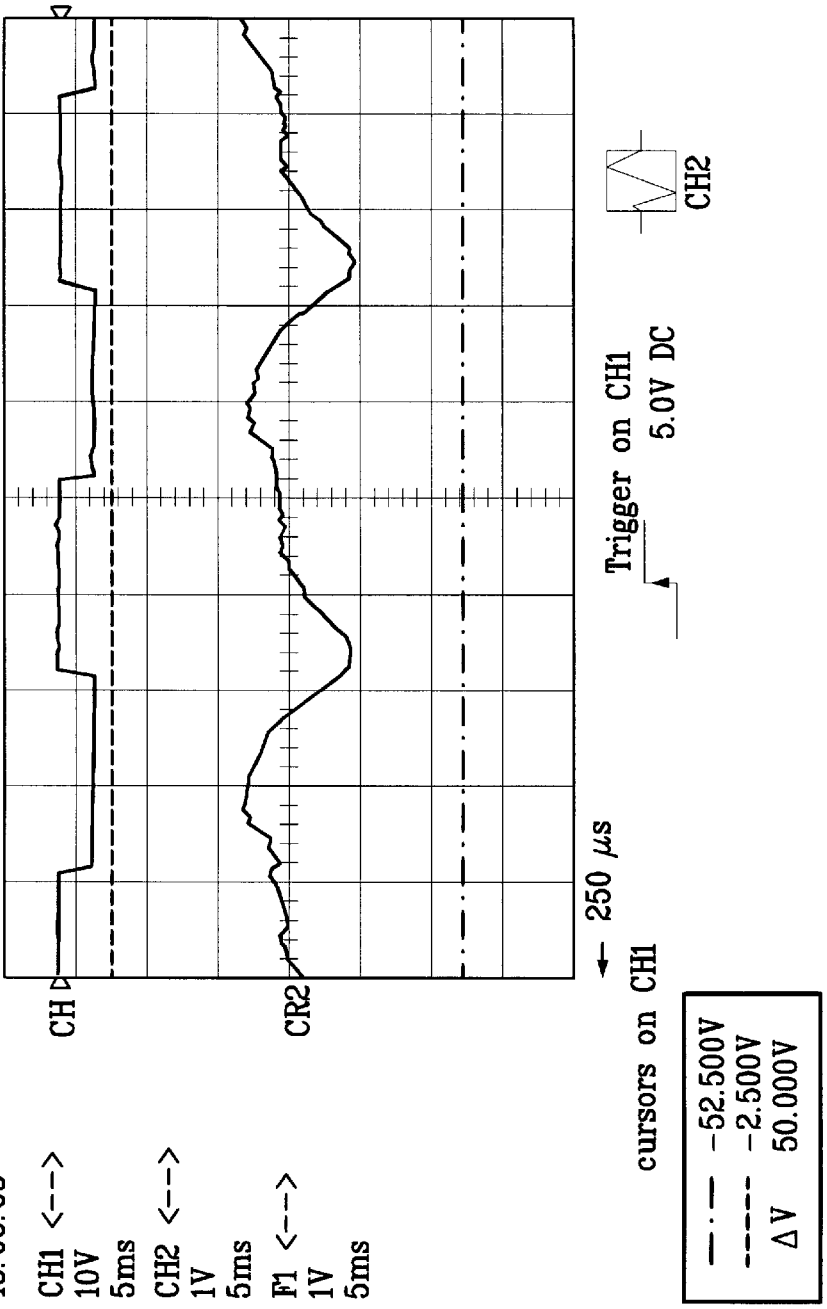
FIG. 8A17

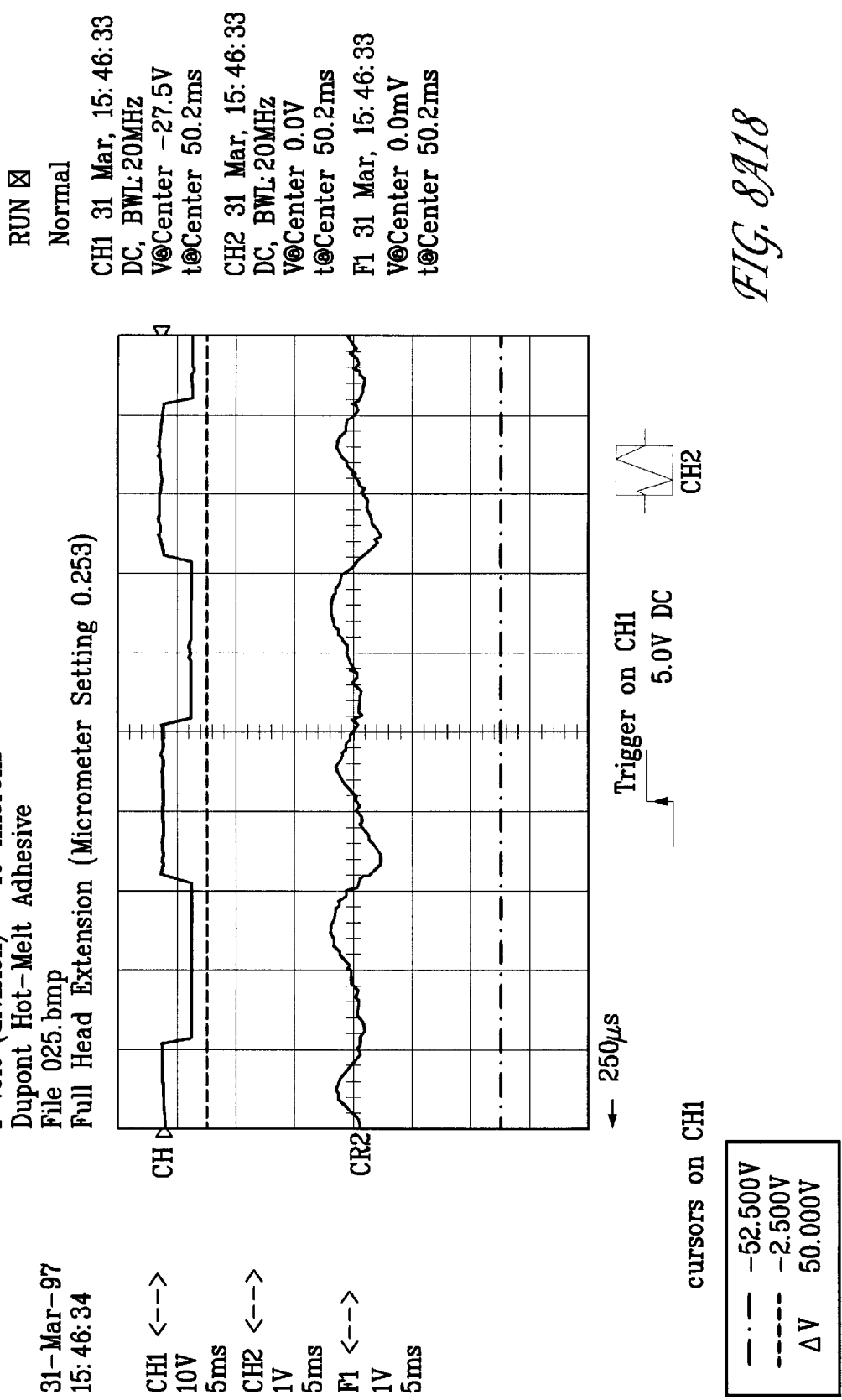
FIG. 8A18

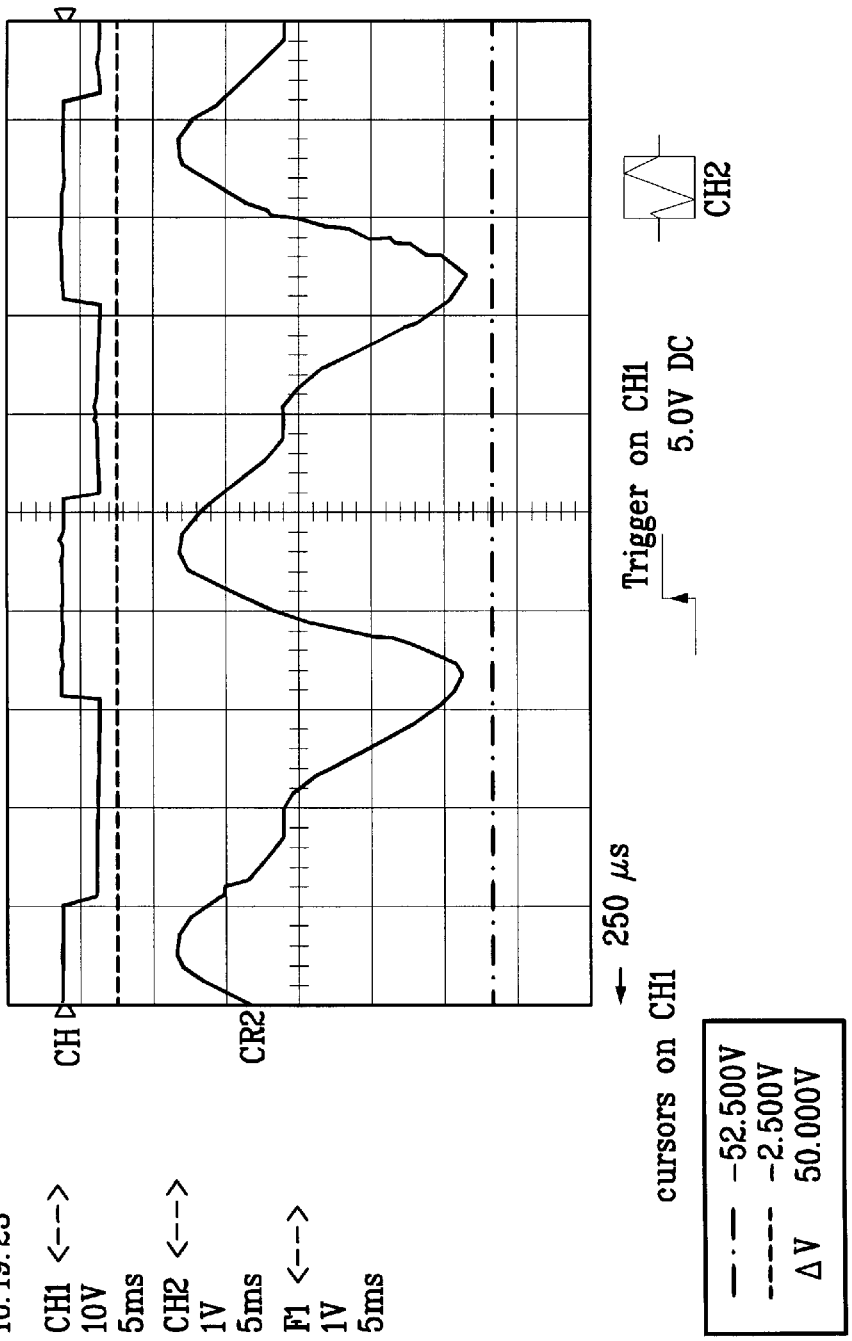
FIG. 8B1

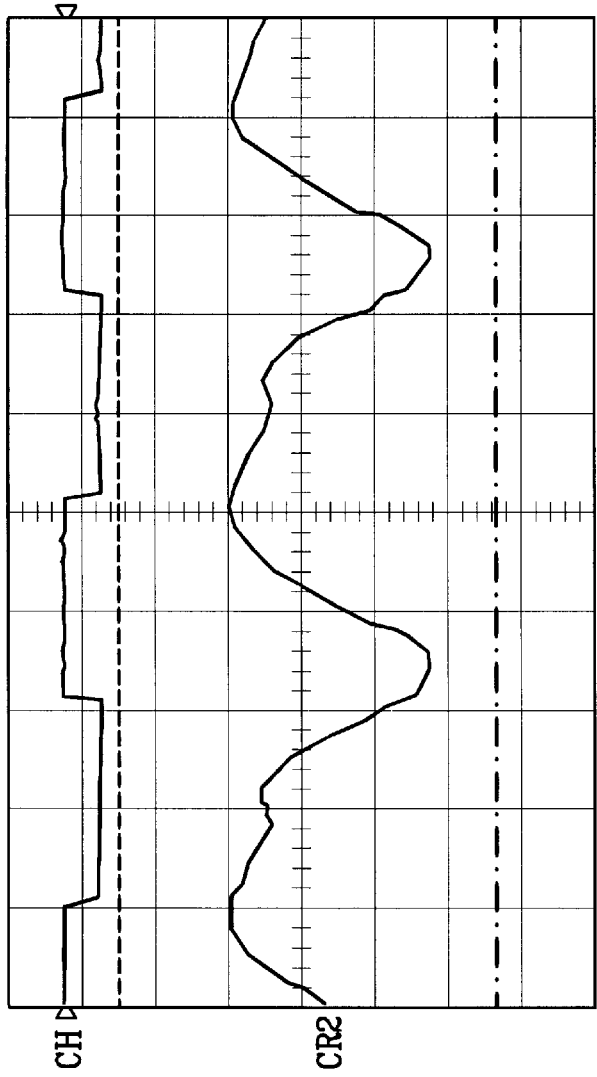
FIG. 8B2

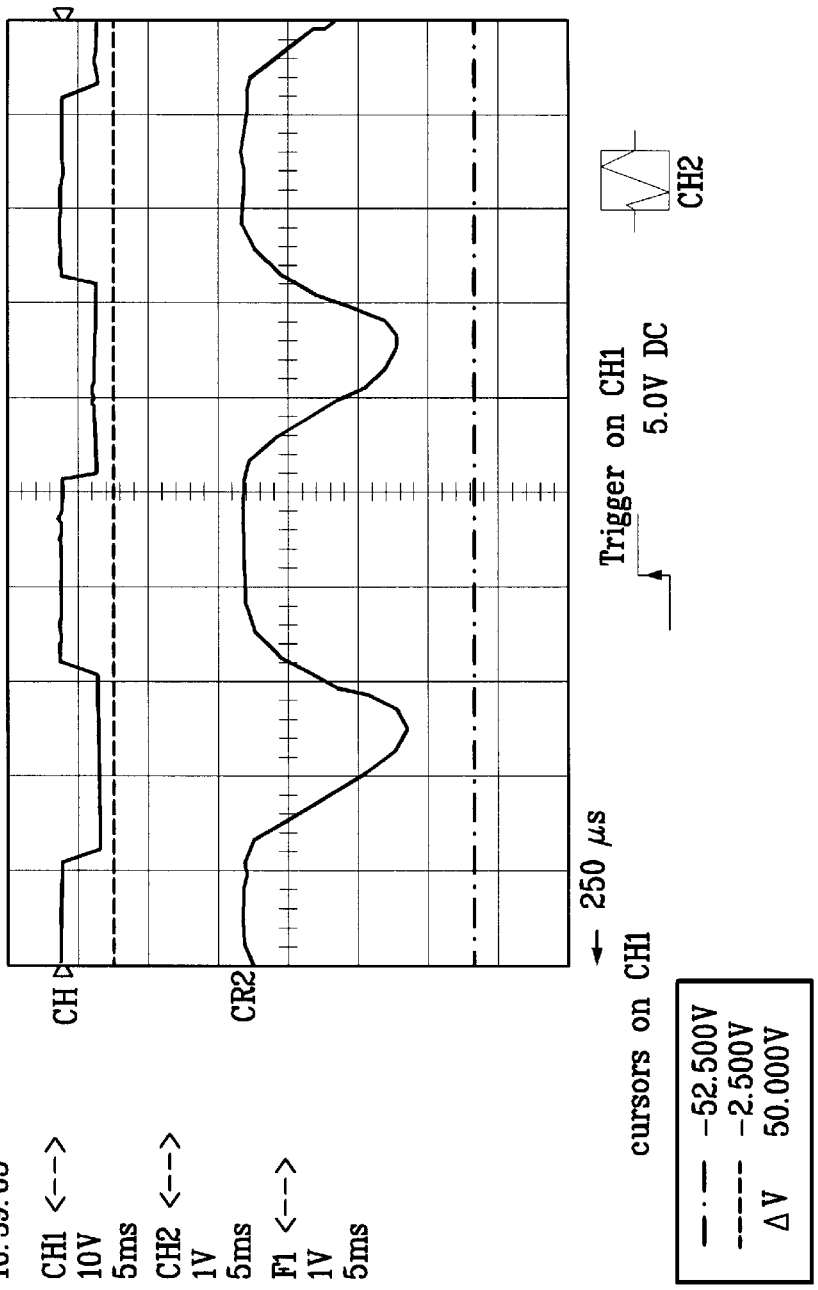
FIG. 8B3

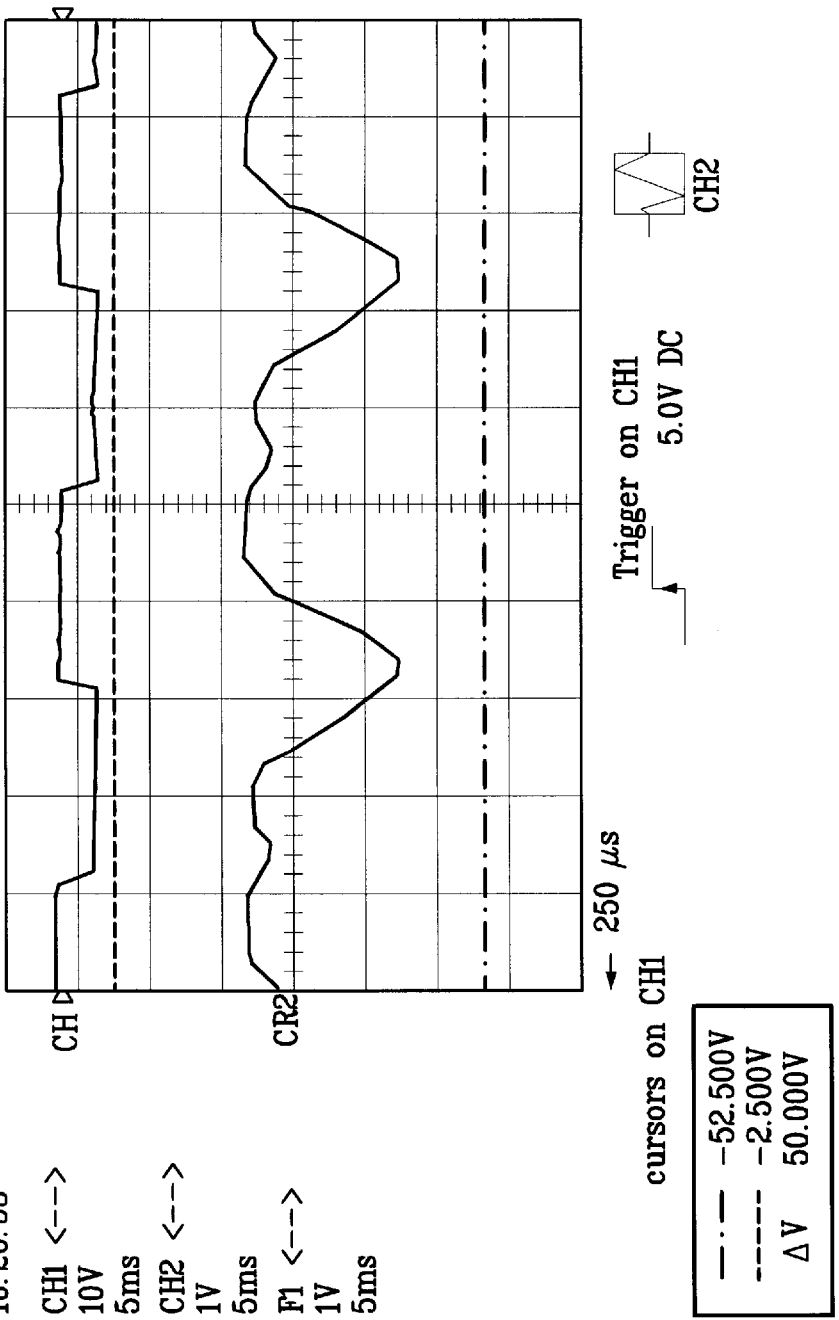
FIG. 8B4

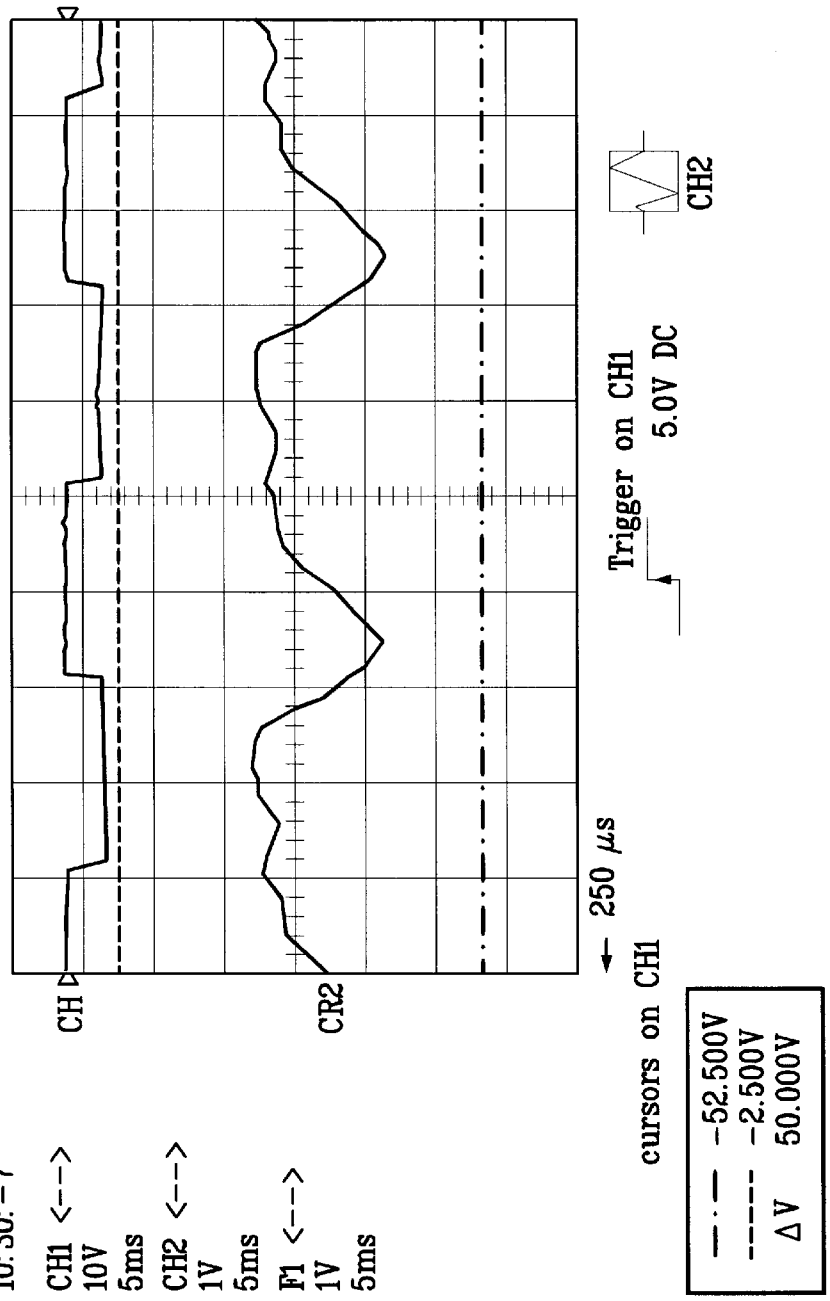
FIG. 8B5

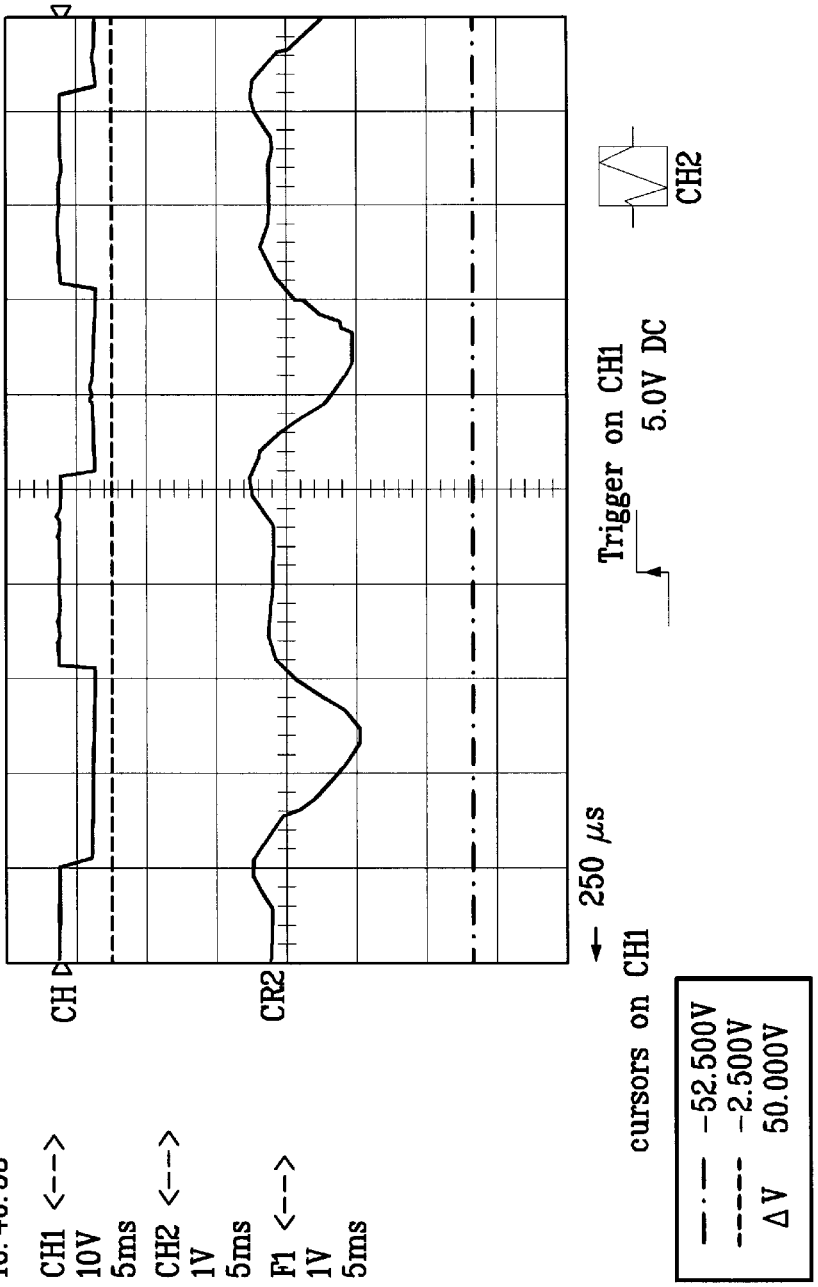
FIG. 8B6

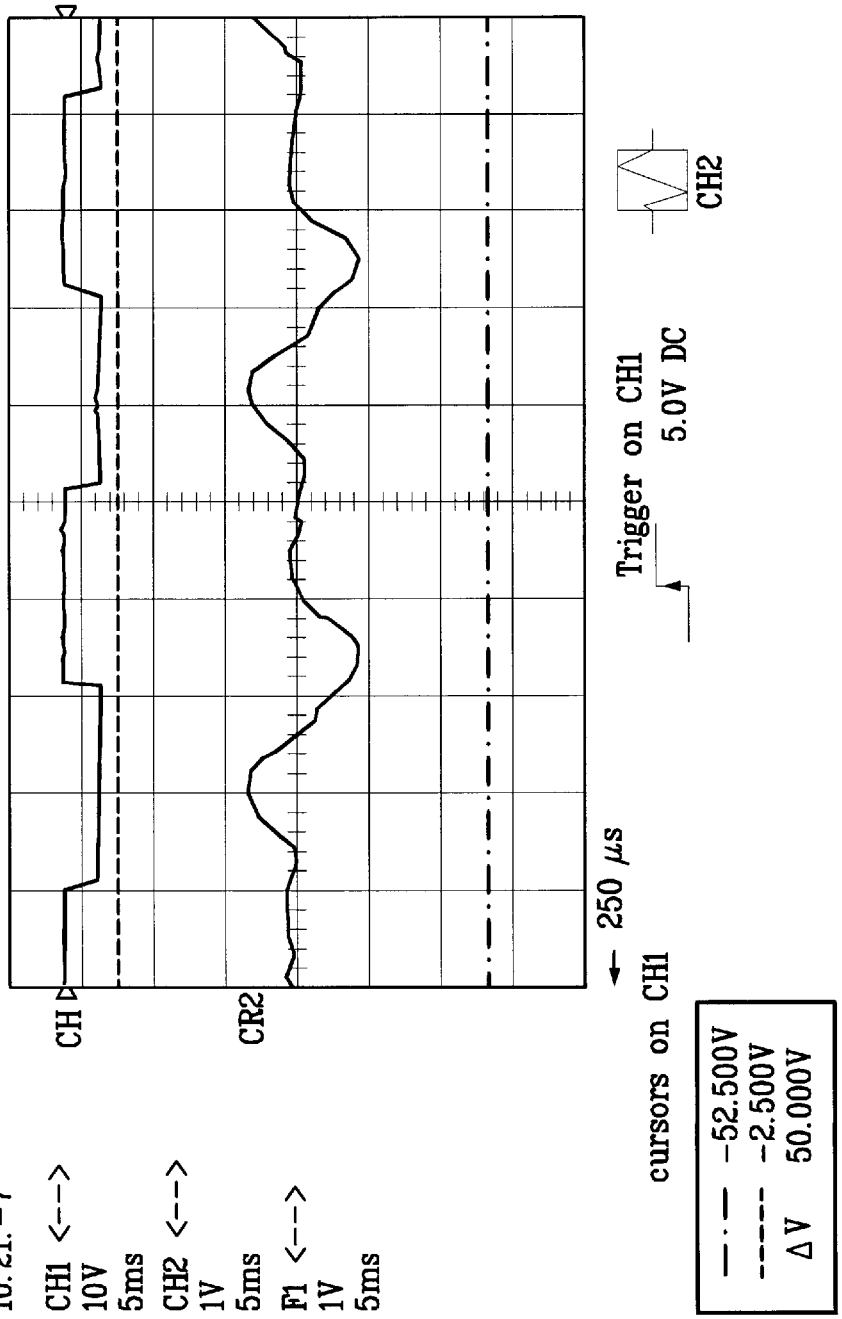
FIG. 8B7

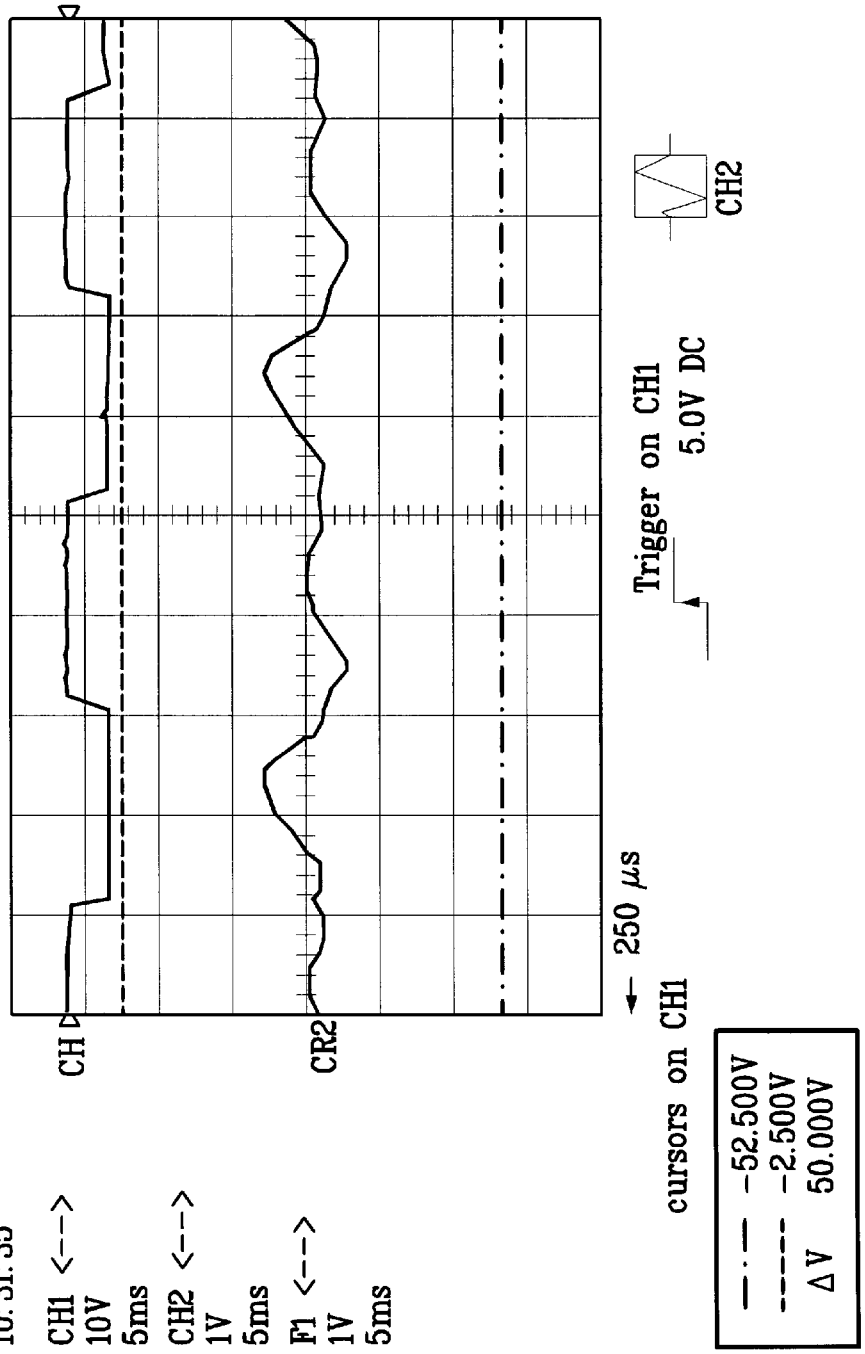
FIG. 8B8

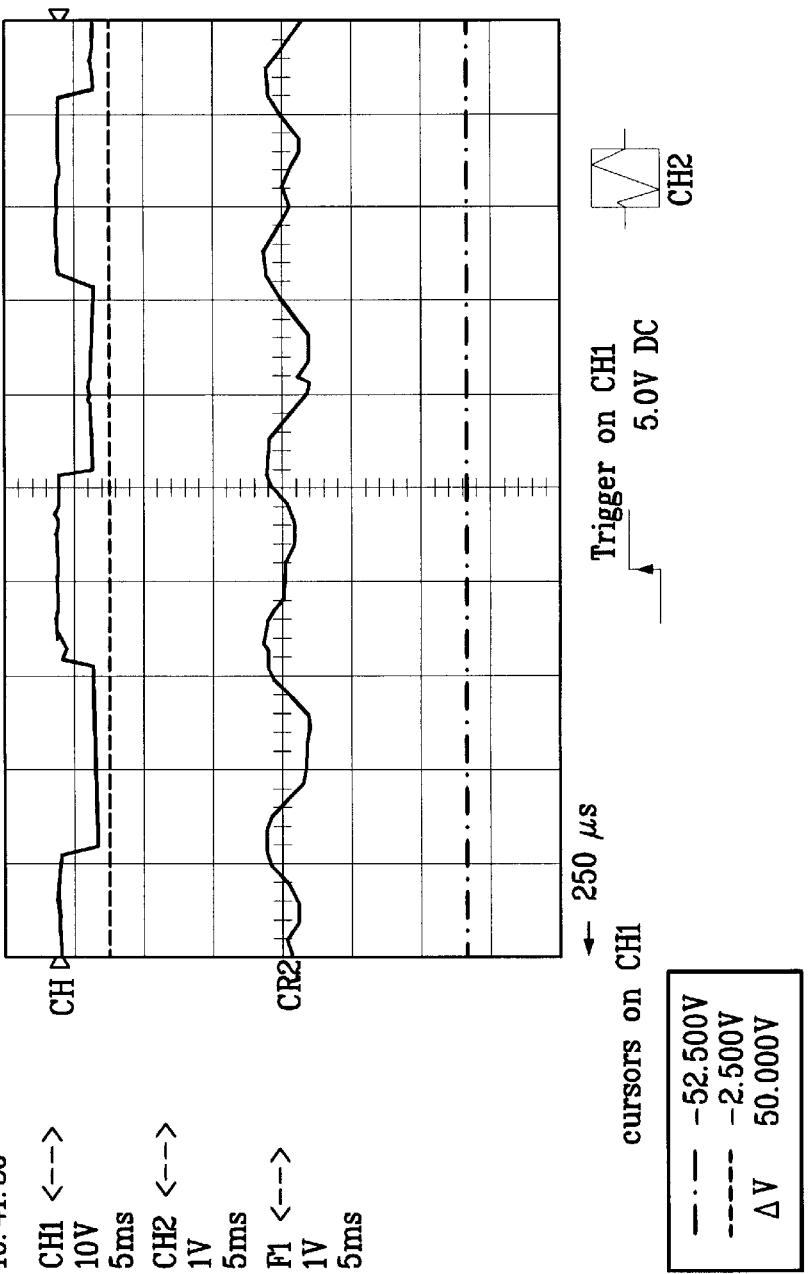
FIG. 8B9

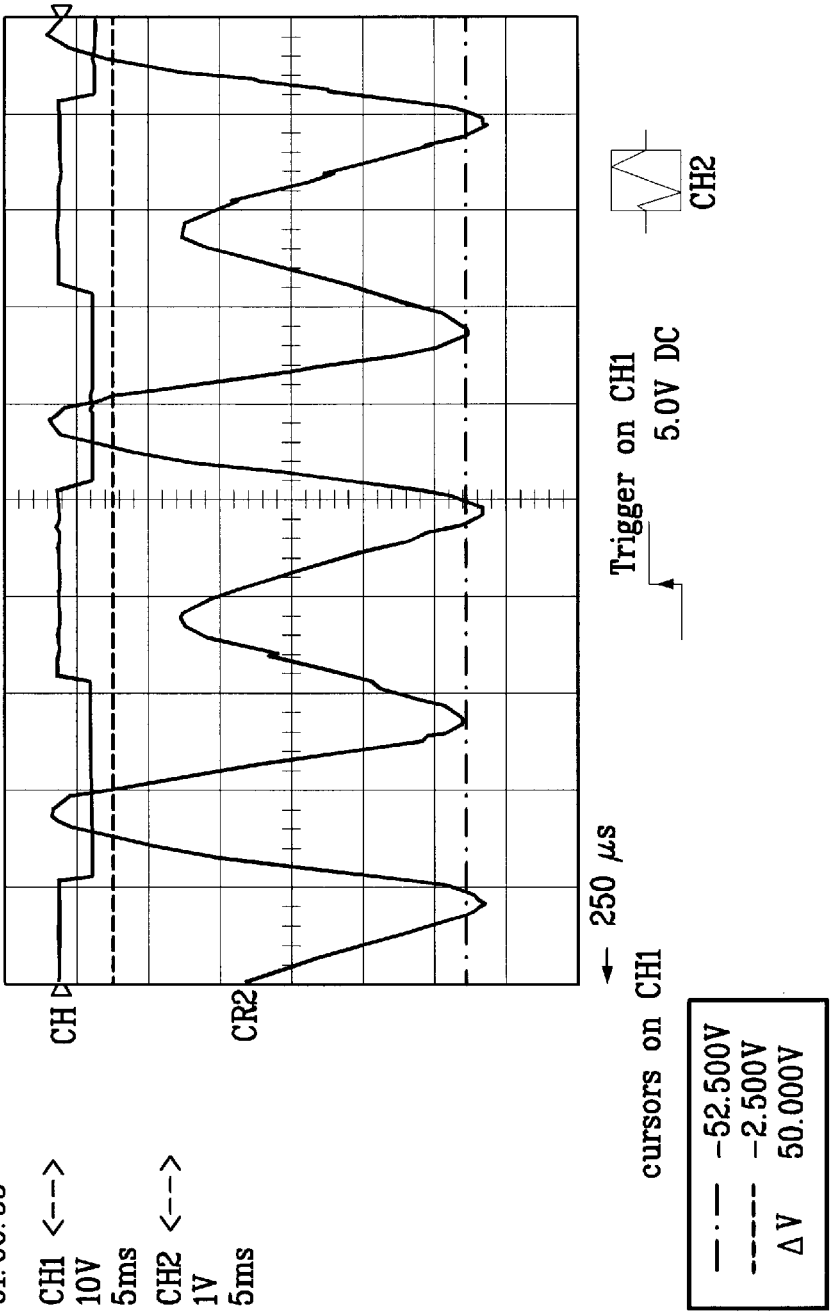
FIG. 8C1

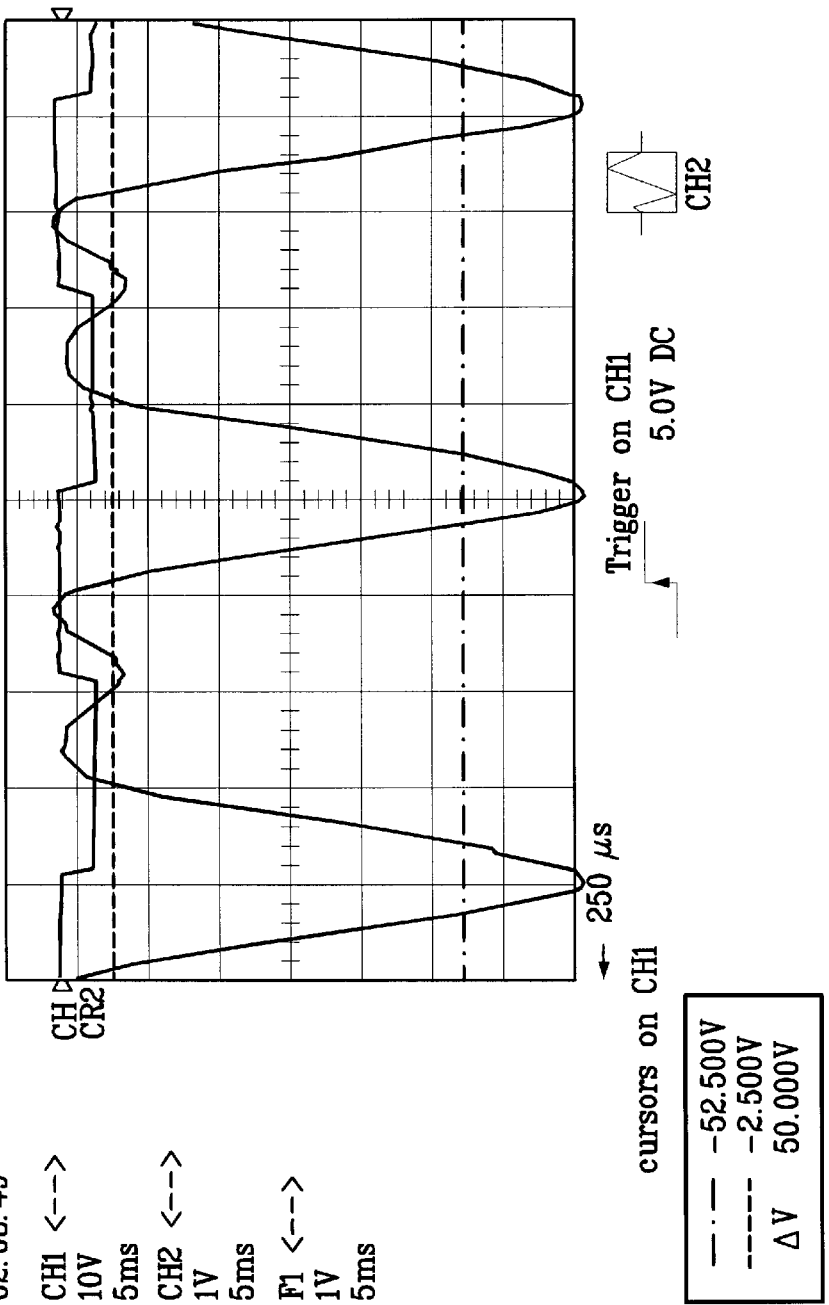
FIG. 8C2

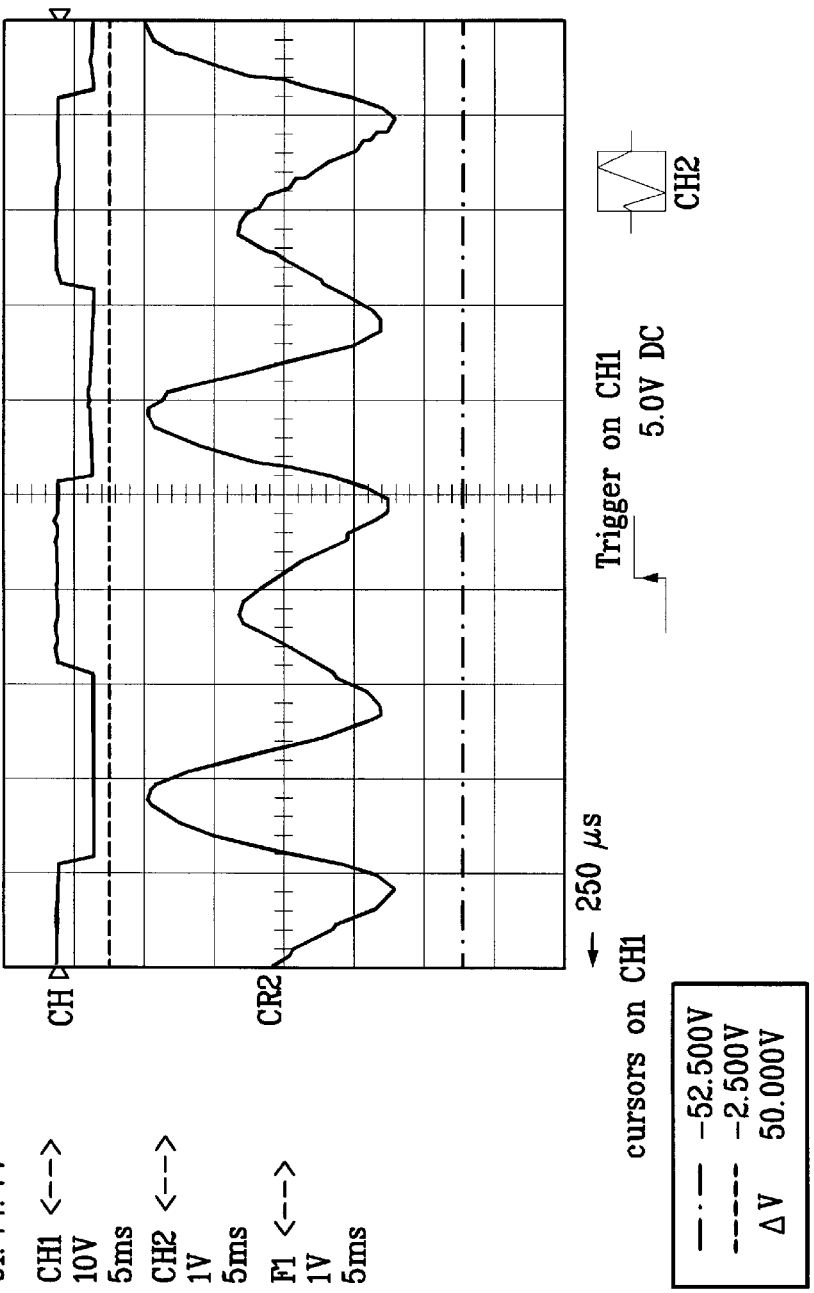
FIG. 8C3

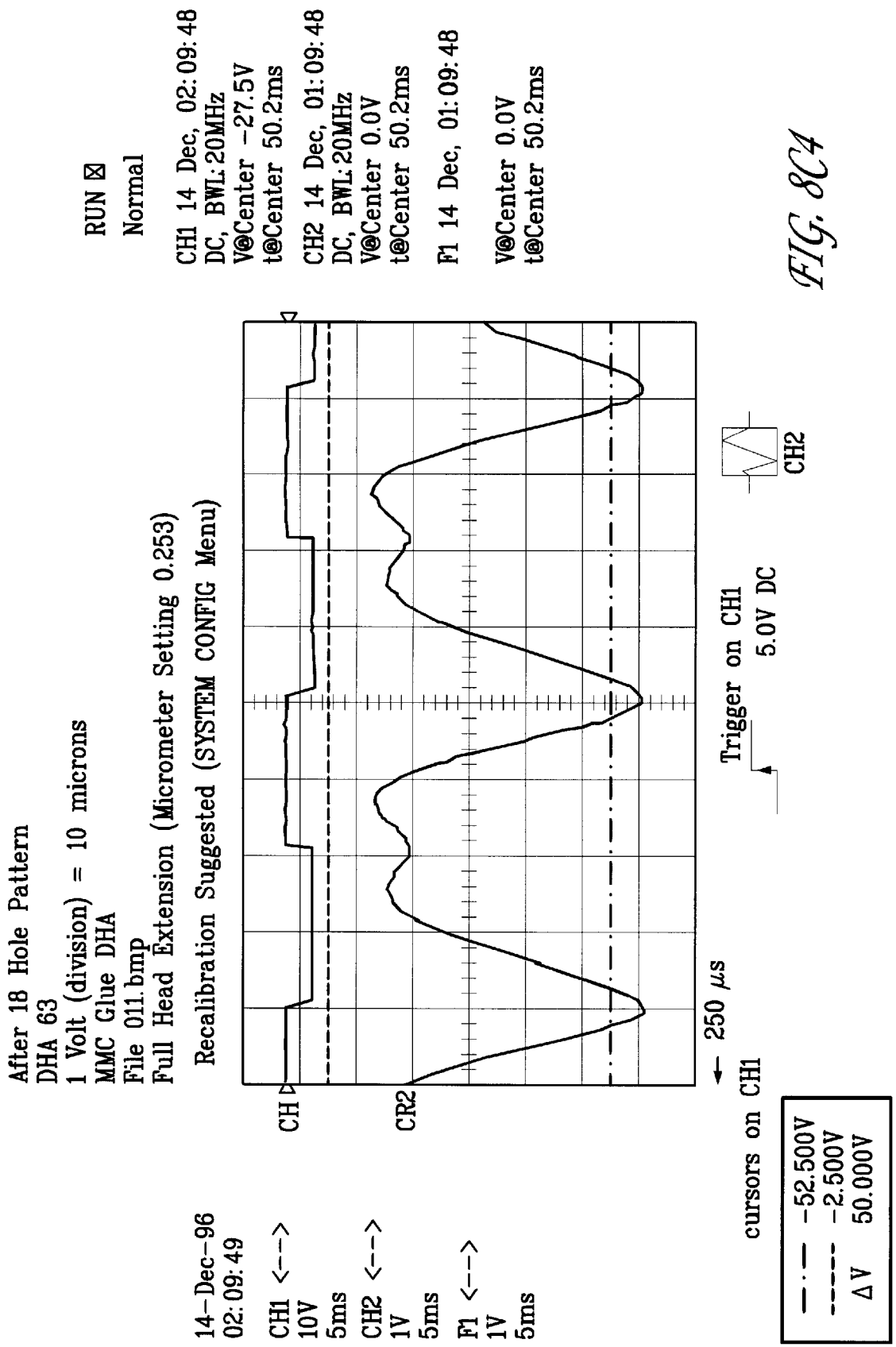
FIG. 8C4

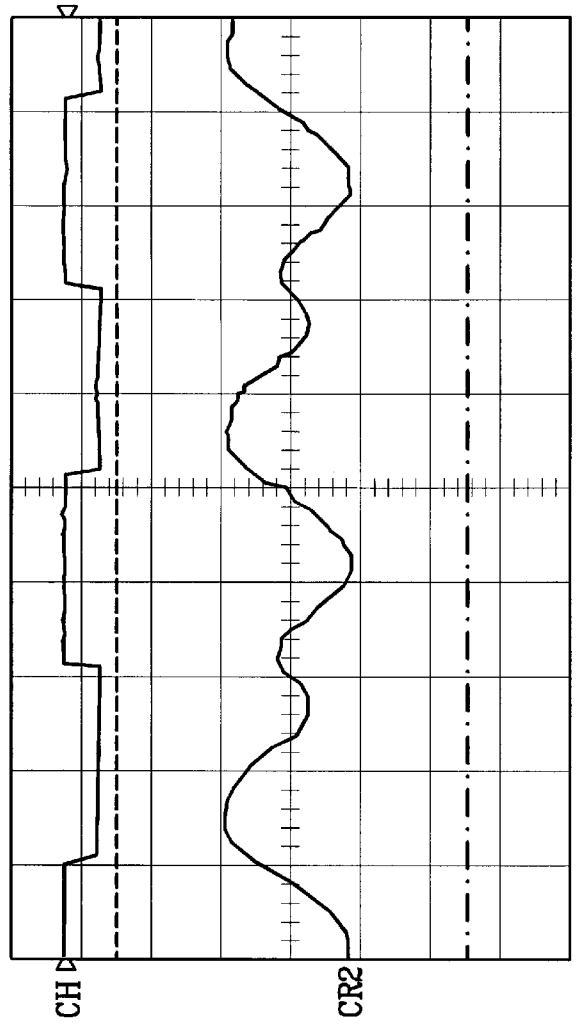
FIG. 8C5

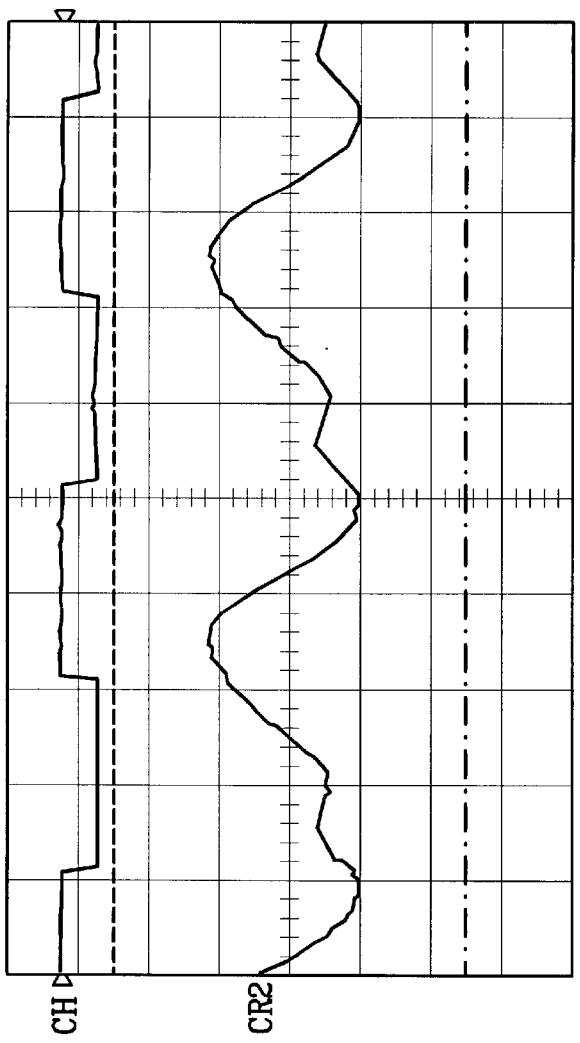
FIG. 8C6

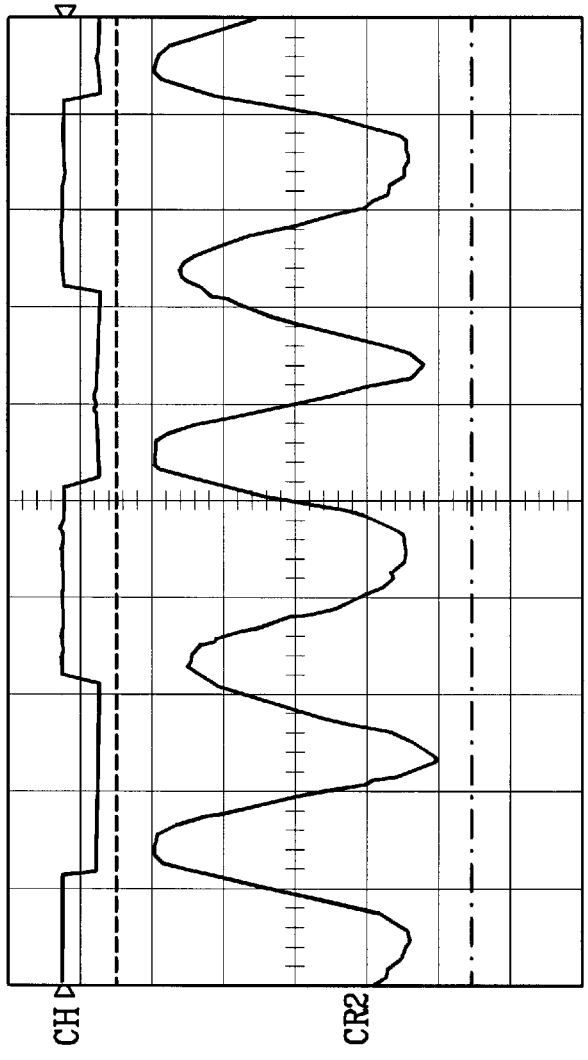
FIG. 8C7

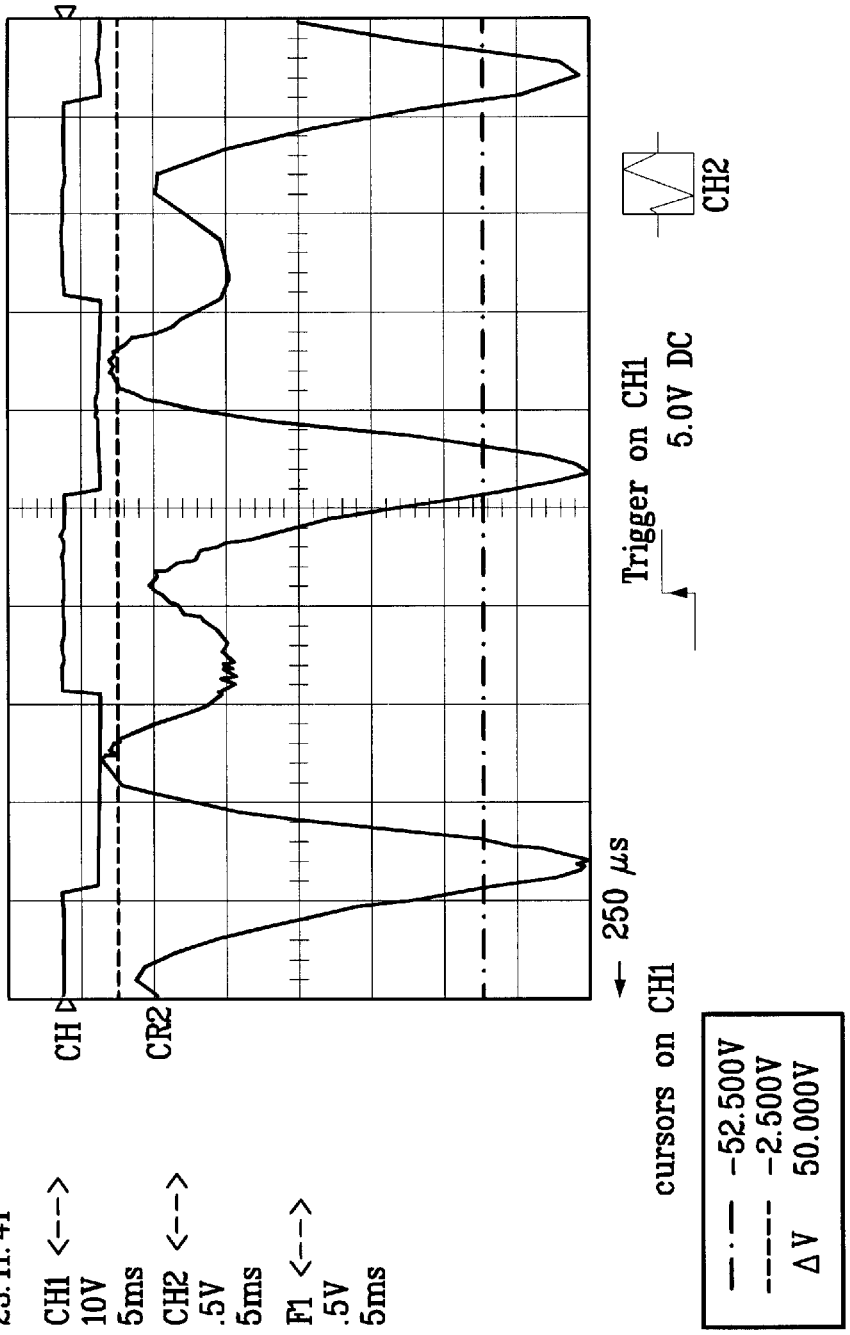
FIG. 8C8

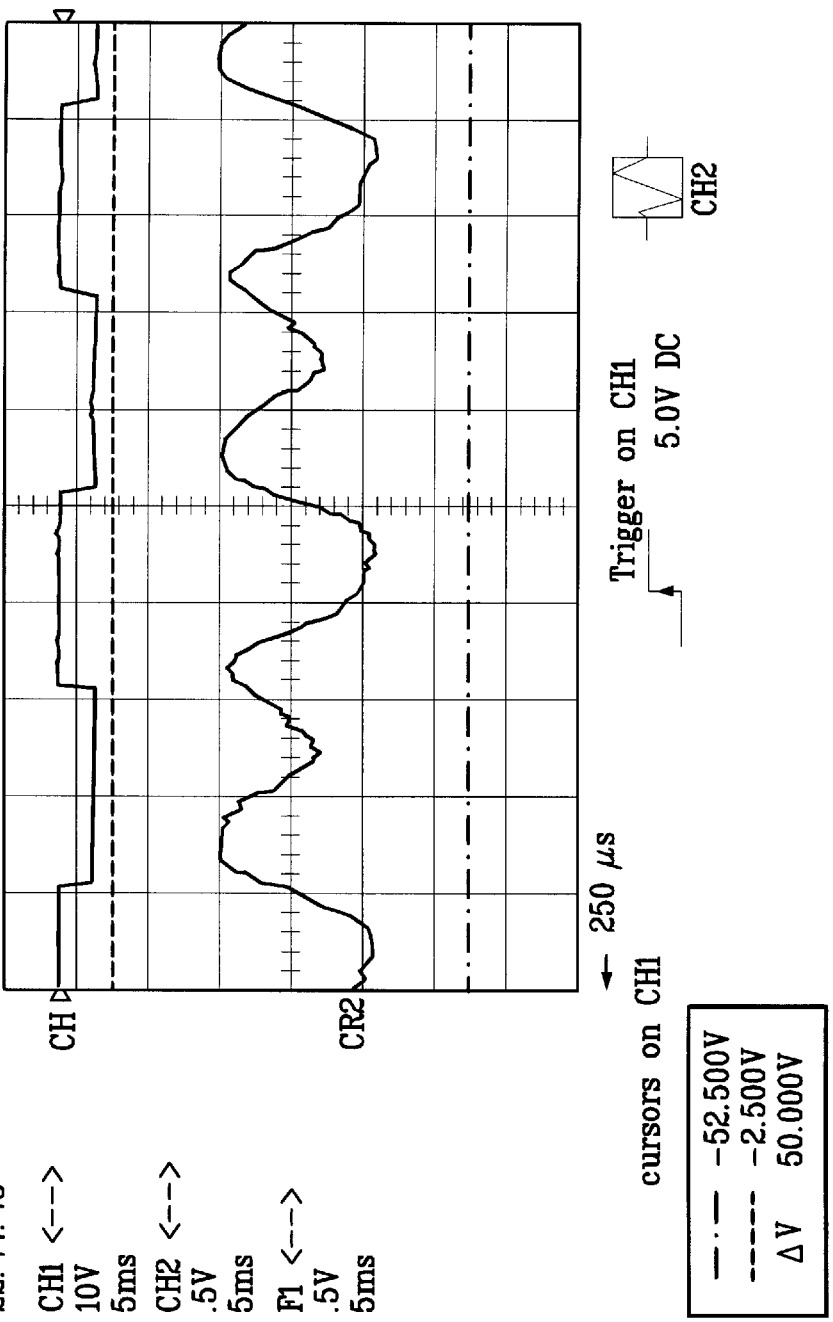
FIG. 8C9

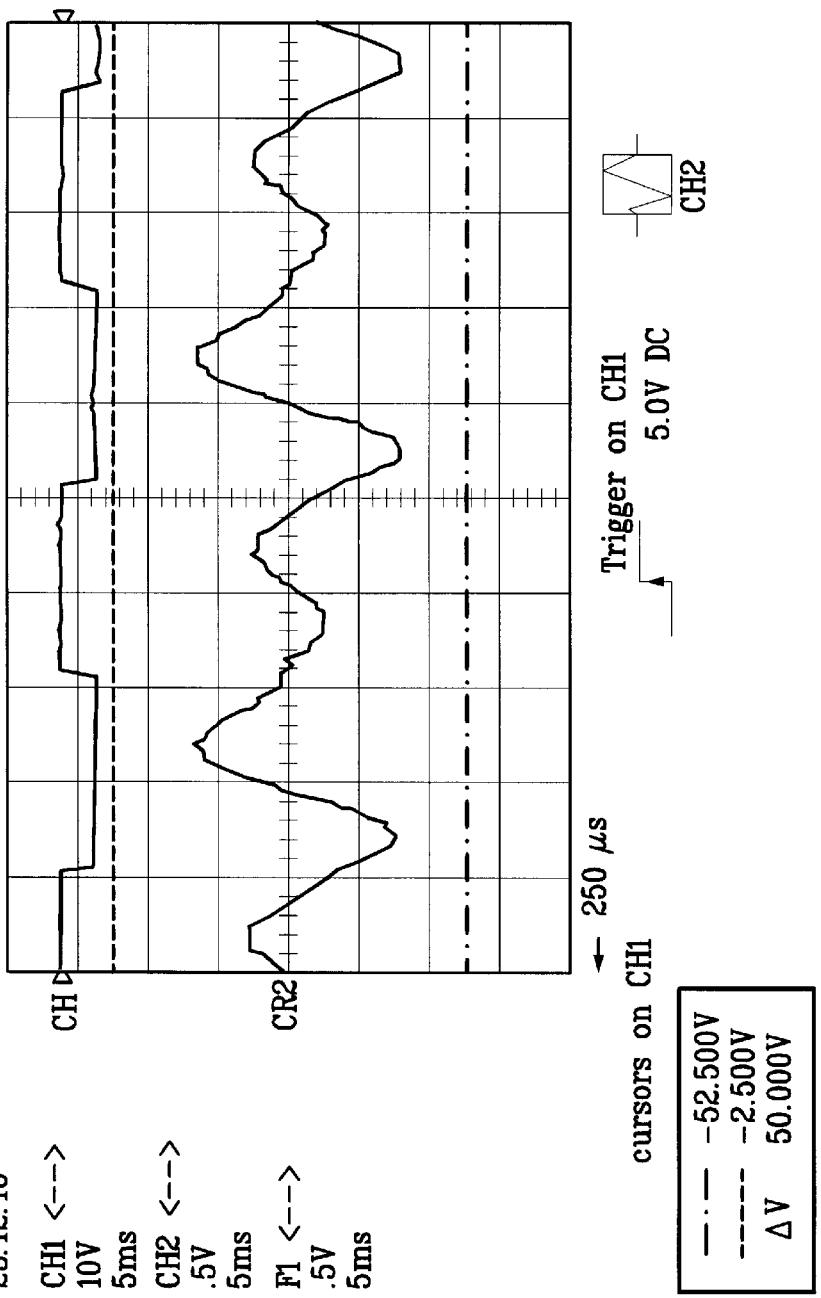
FIG. 8C10

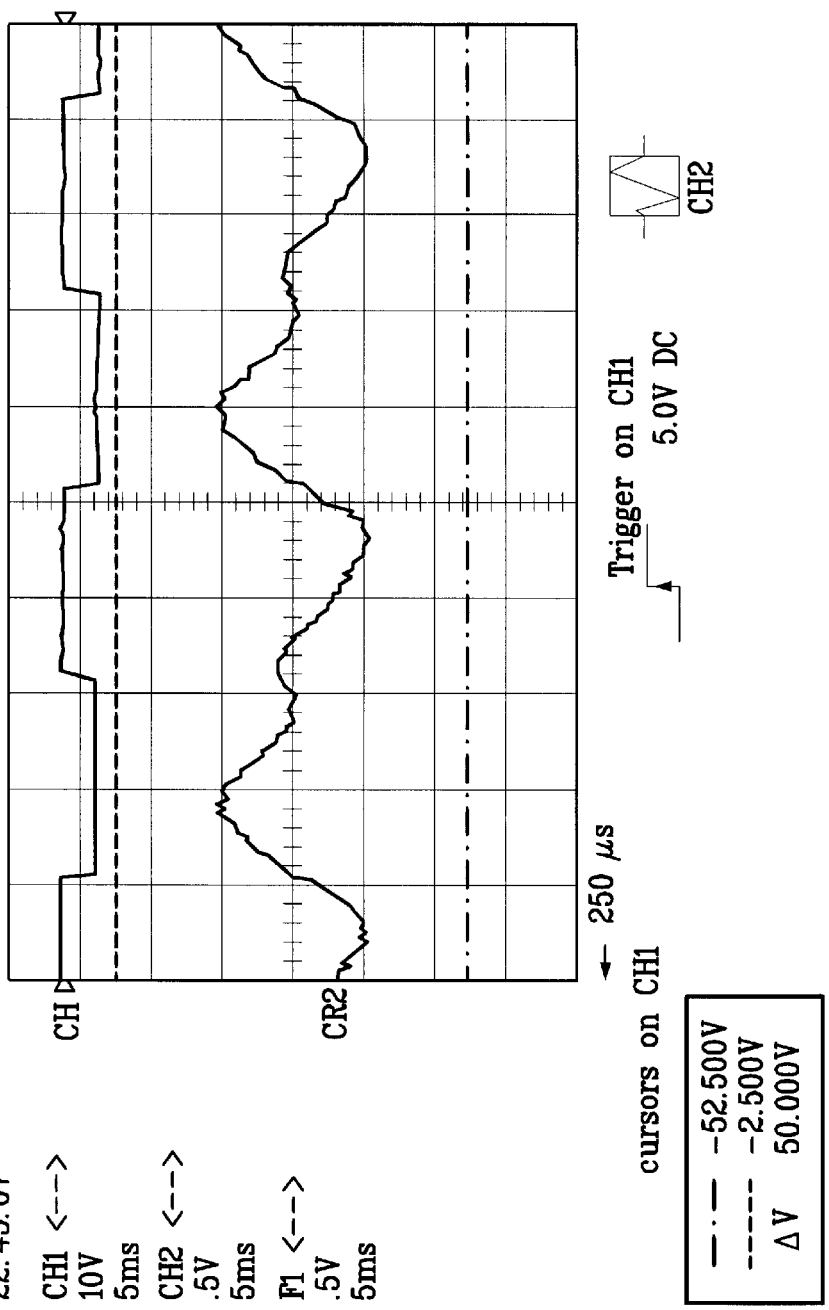
FIG. 8C11

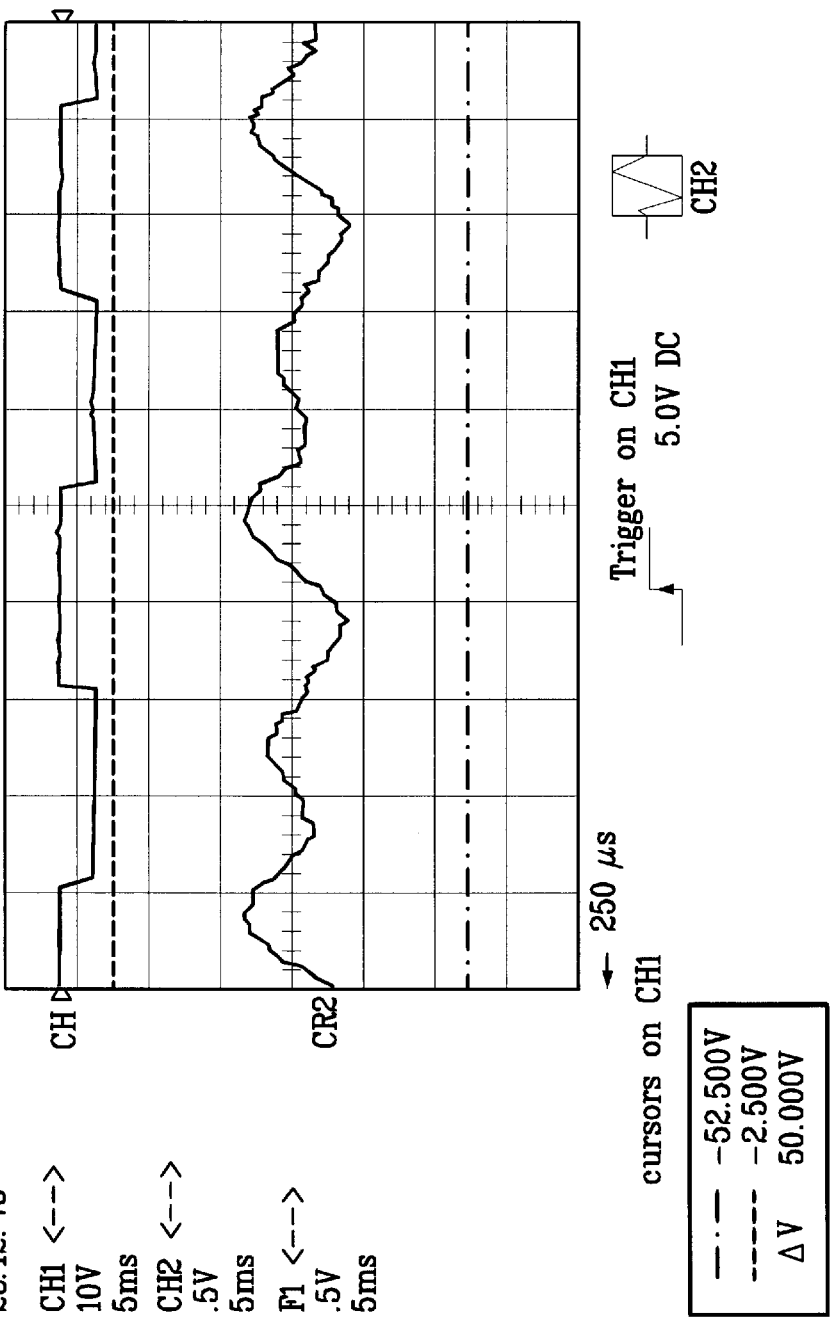
FIG. 8C12

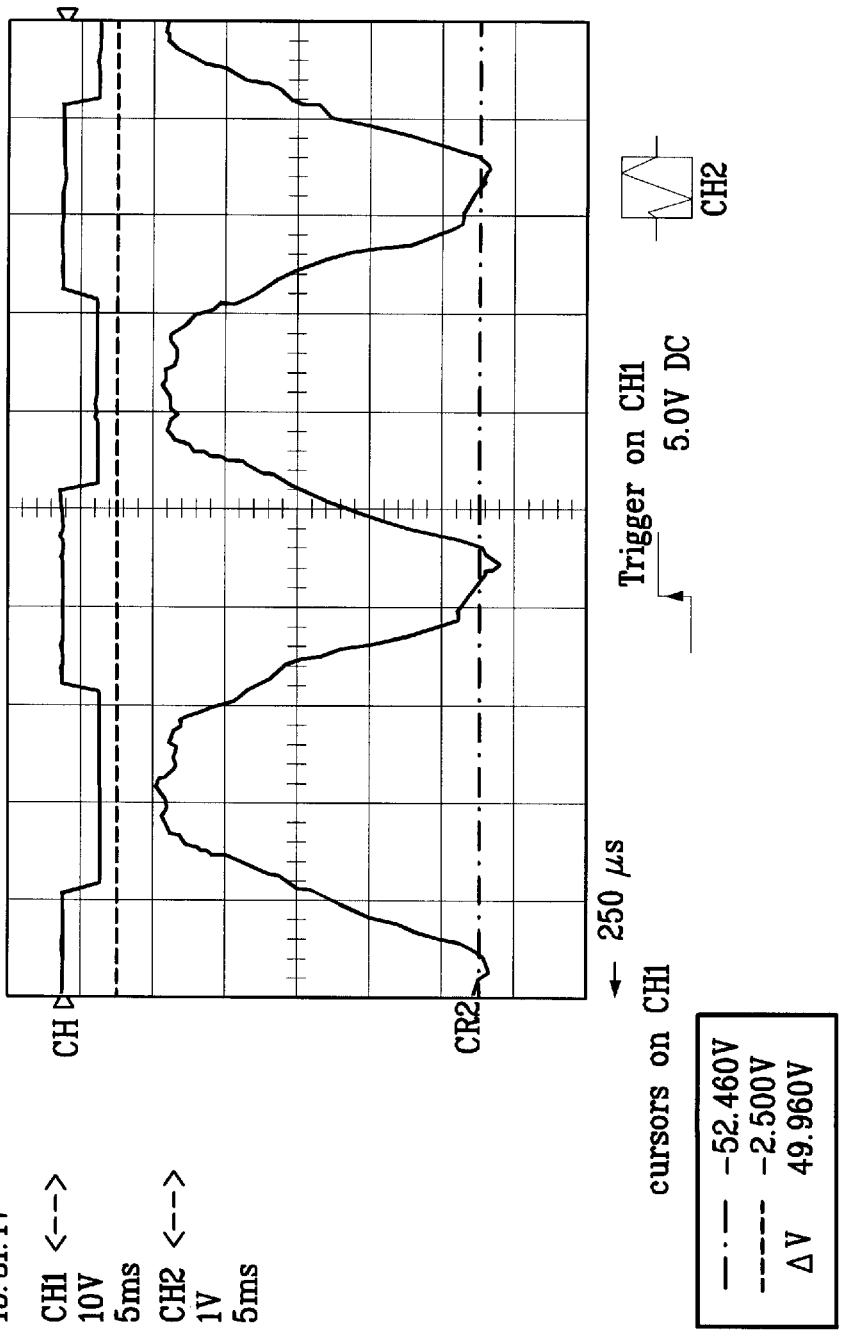
FIG. 8C13

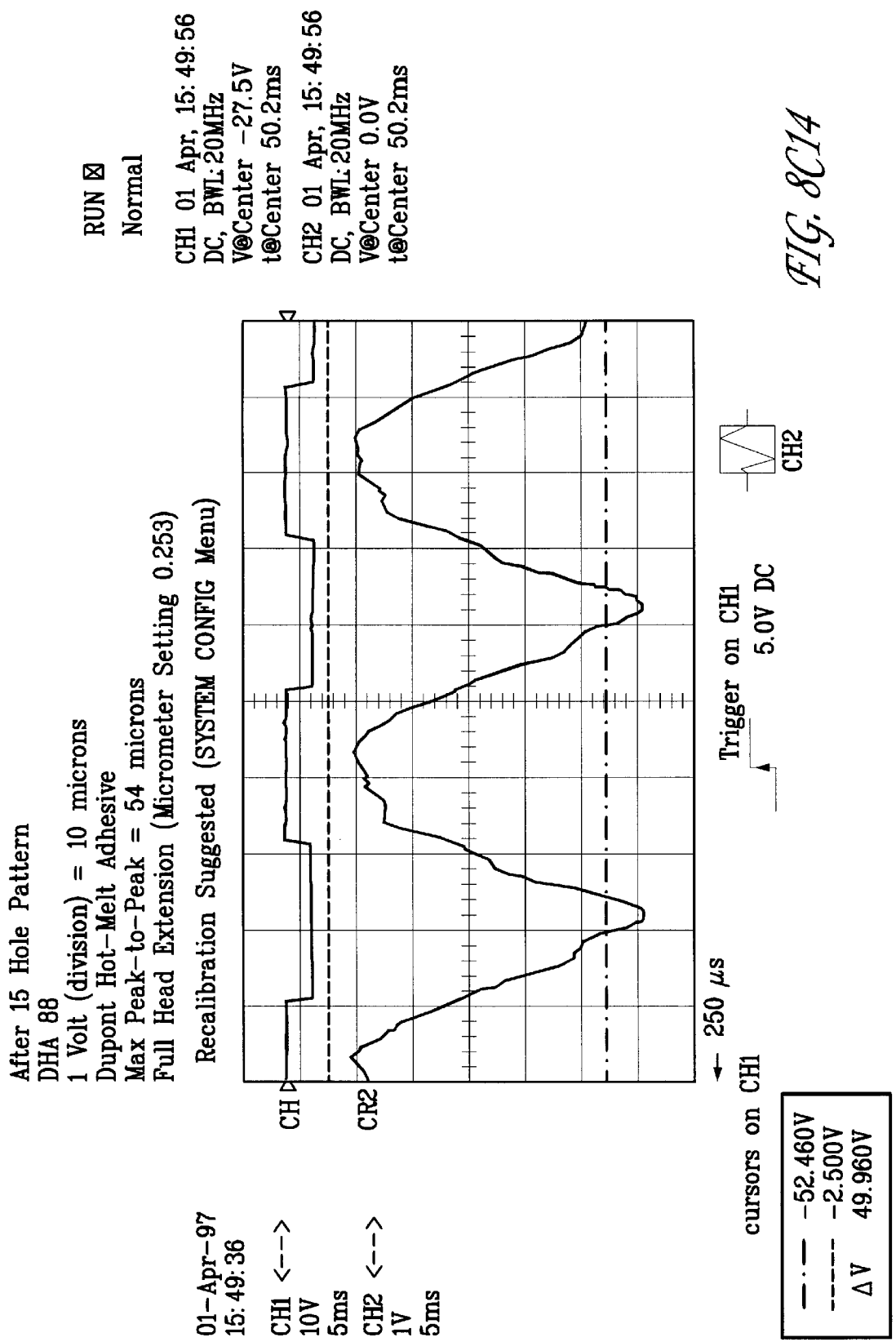
FIG. 8C14

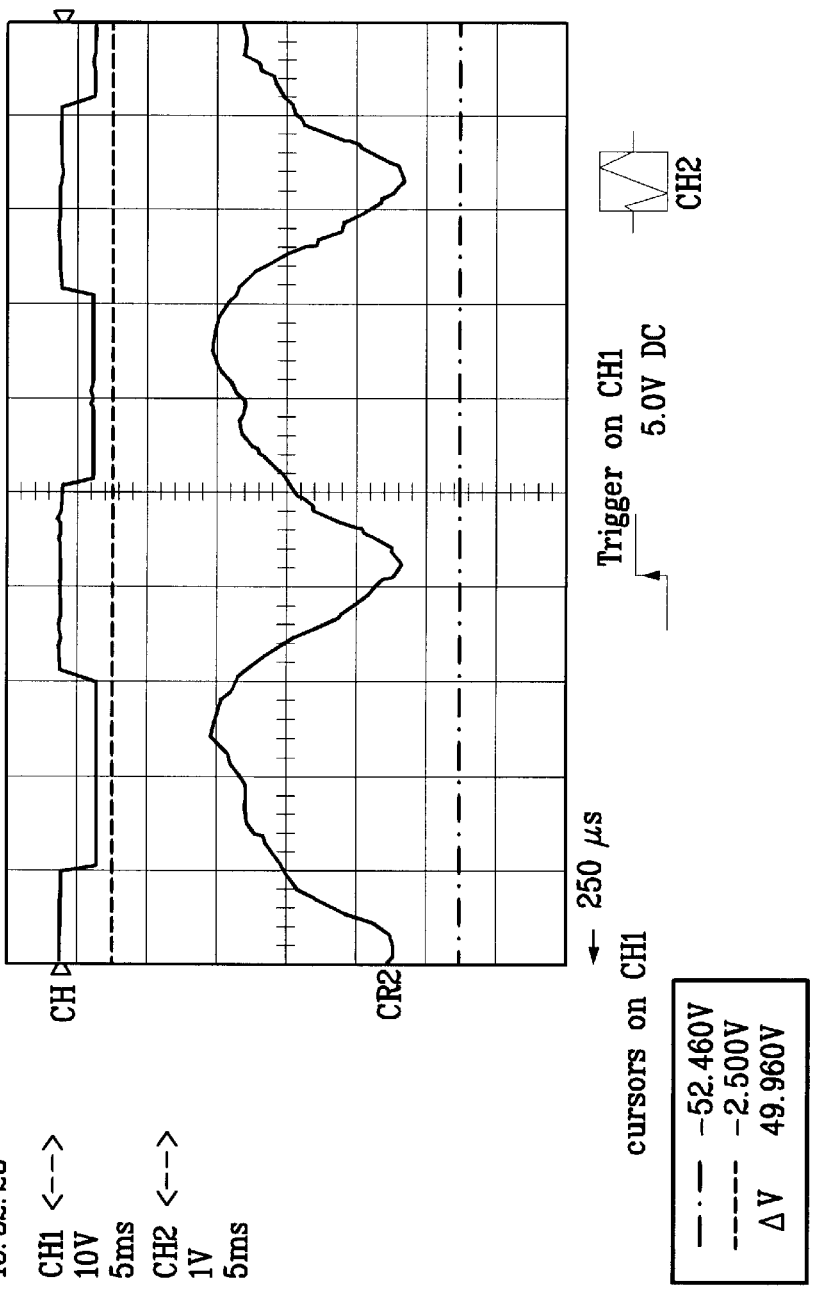
FIG. 8C15

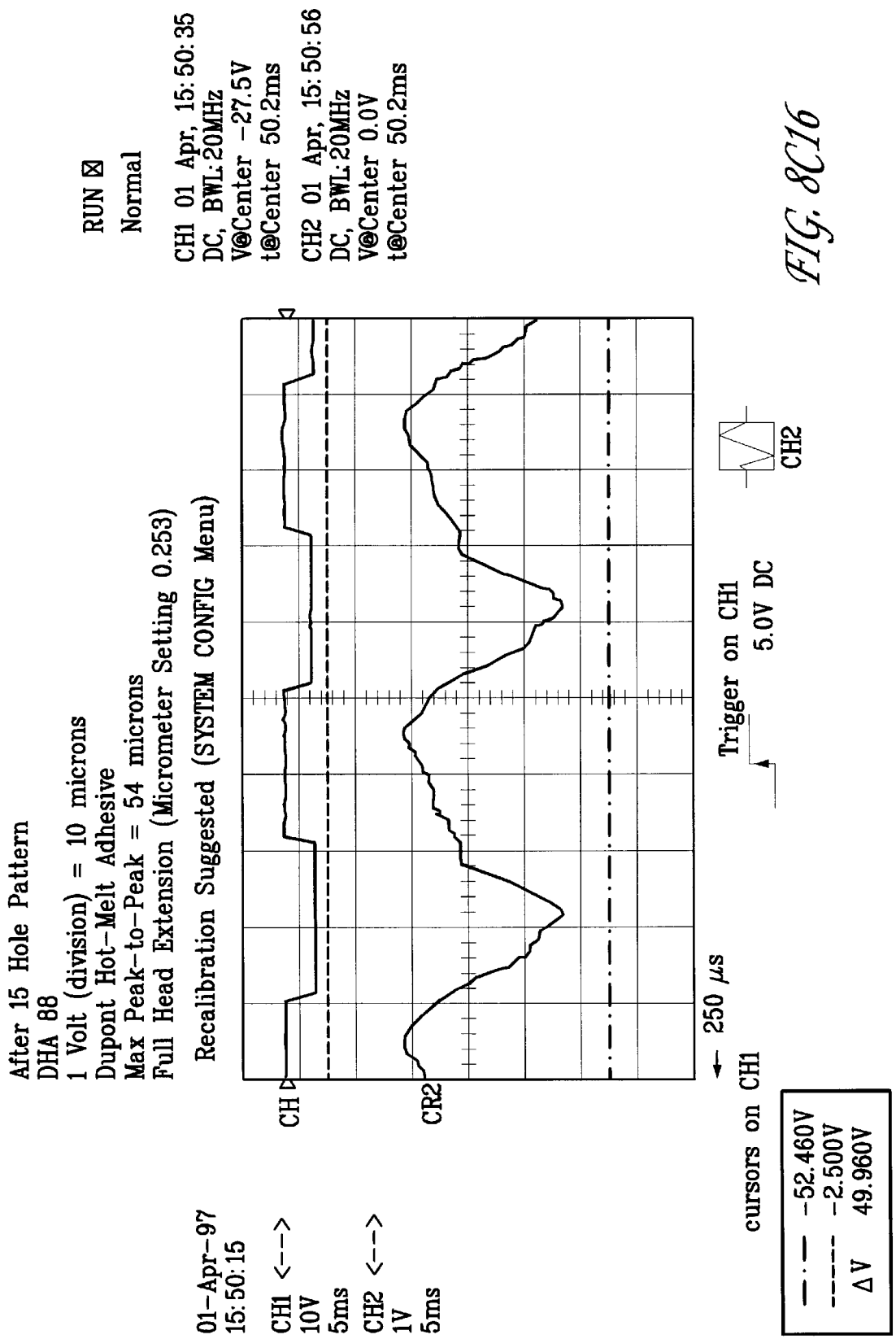
FIG. 8C16

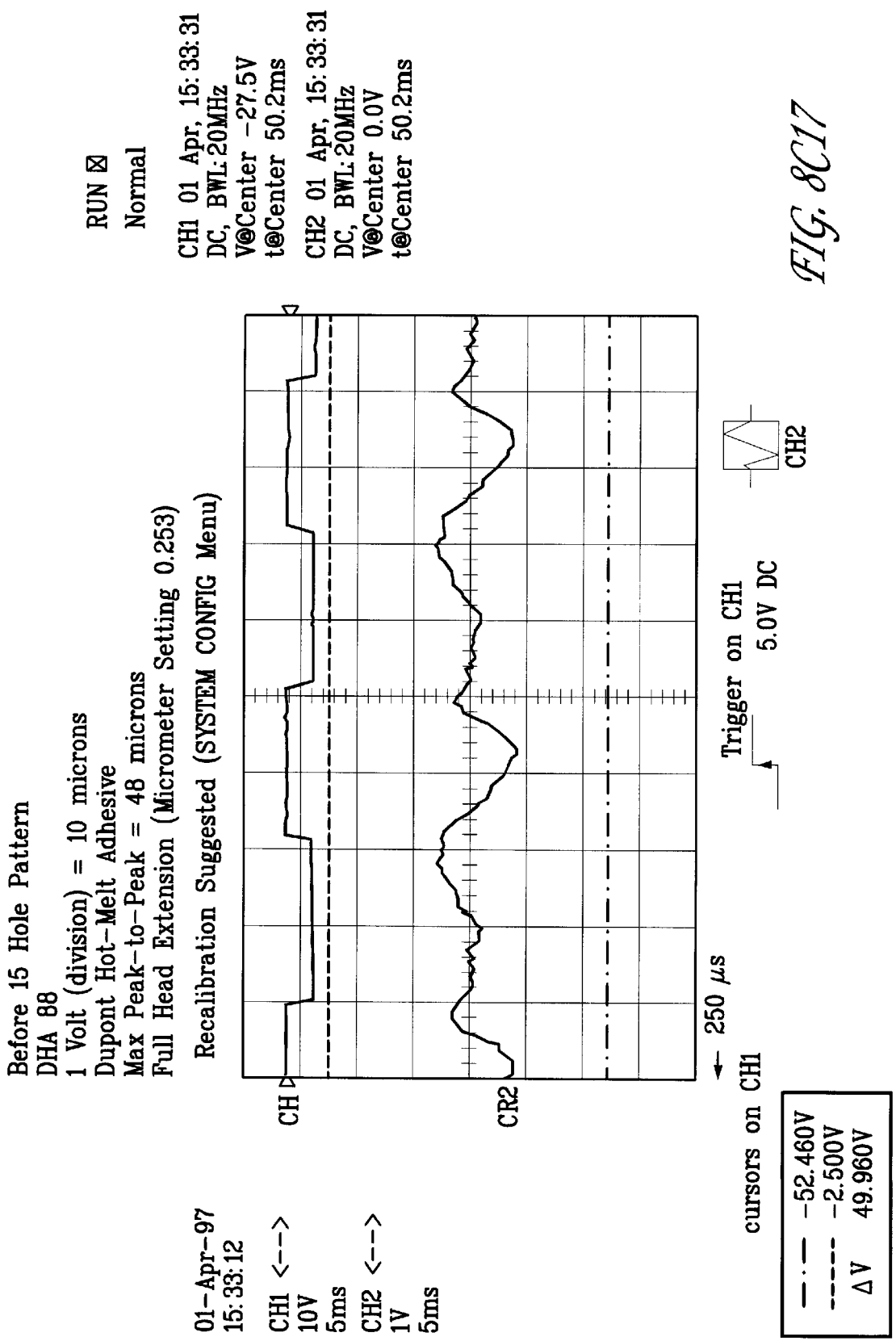
FIG. 8C17

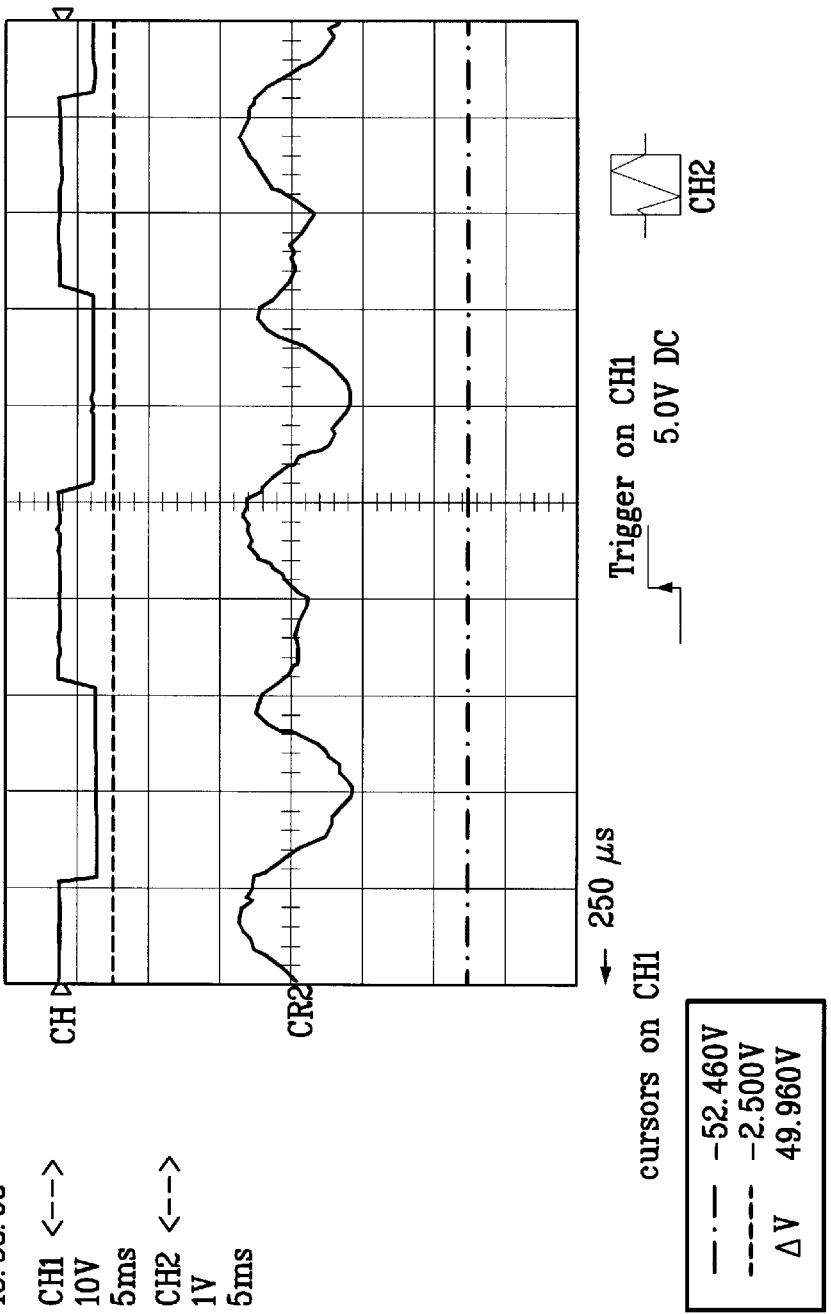
FIG. 8C18

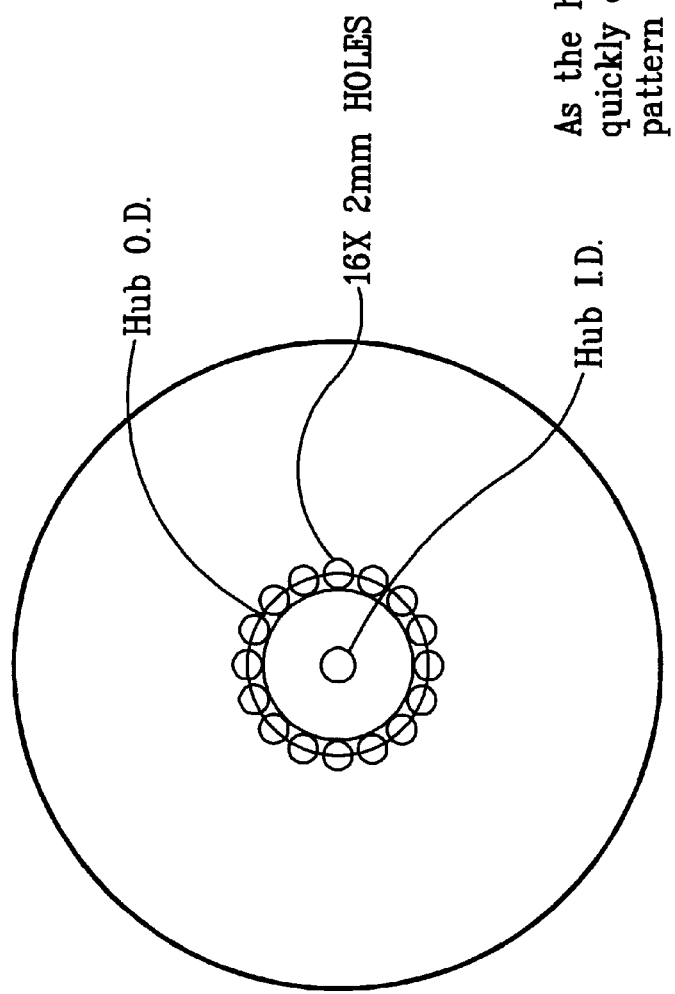
FIG. 8D1
Hub O.D.
16X 2mm HOLES
Hub I.D.
As the heads move away from the hub the 16f quickly disappears. This example shows a hole pattern with the holes half on the hub and half off. Because the 16f decreases quickly as the heads move away from the hub, this pattern should increase the usable data zone.

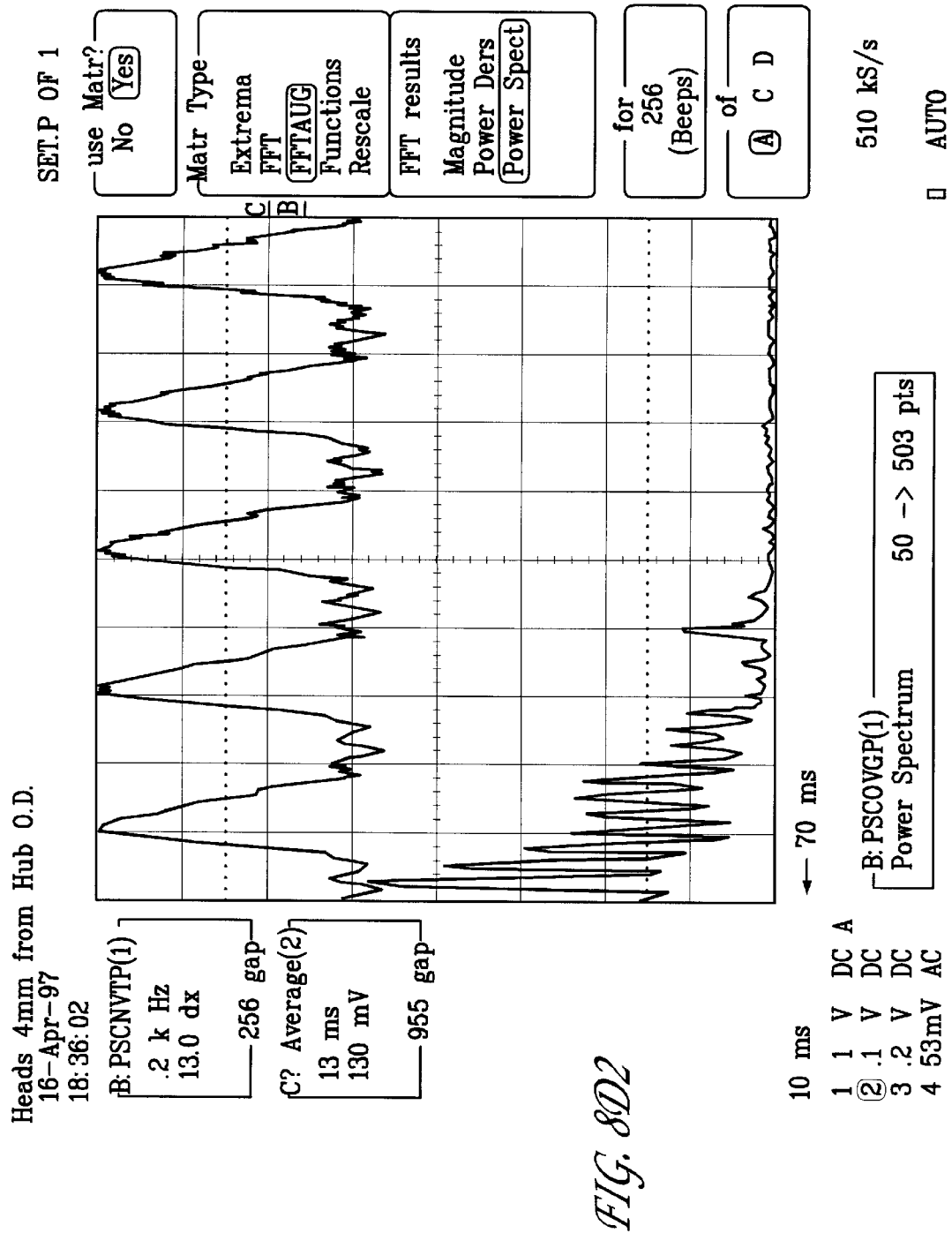
FIG. 8D2

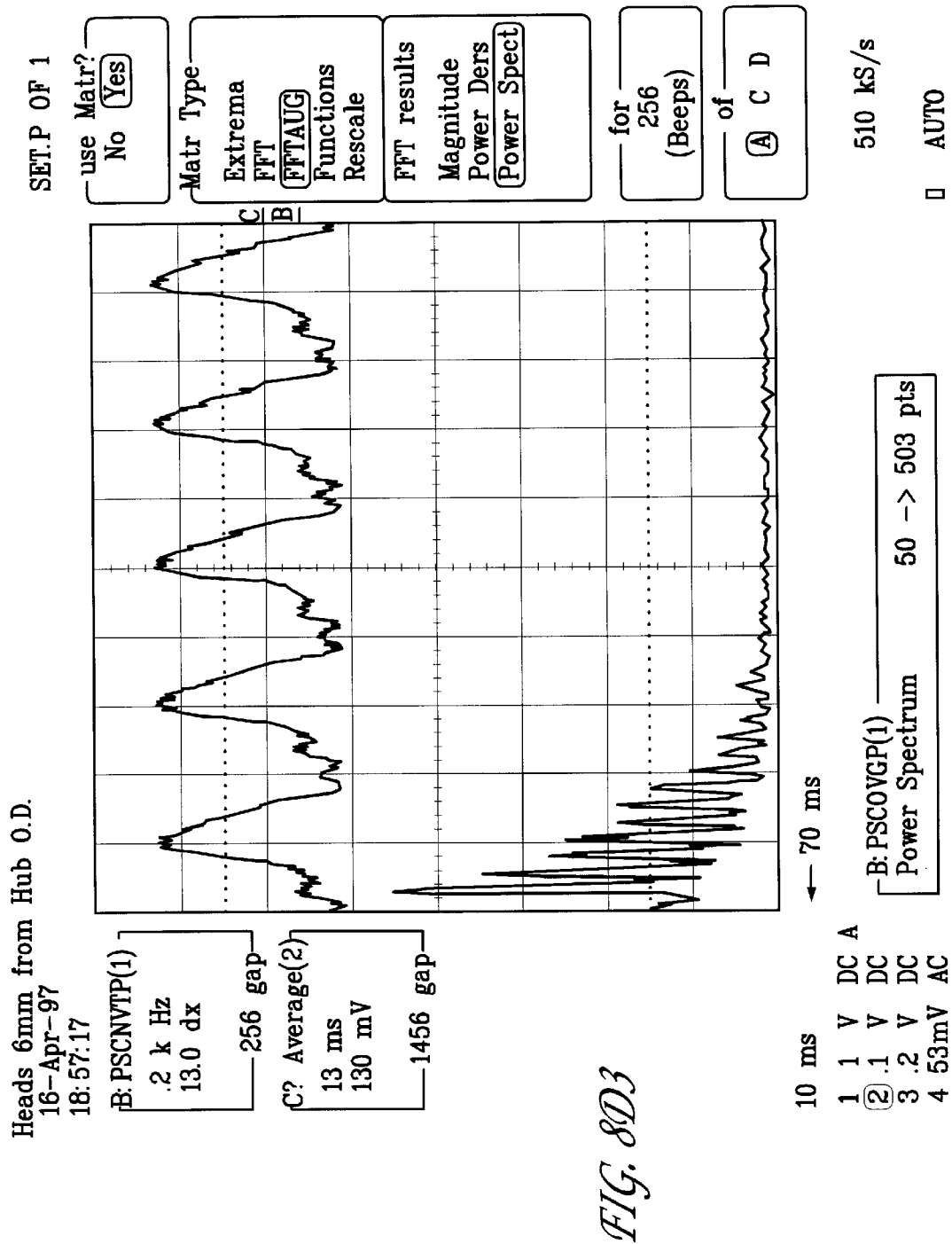
FIG. 8D3

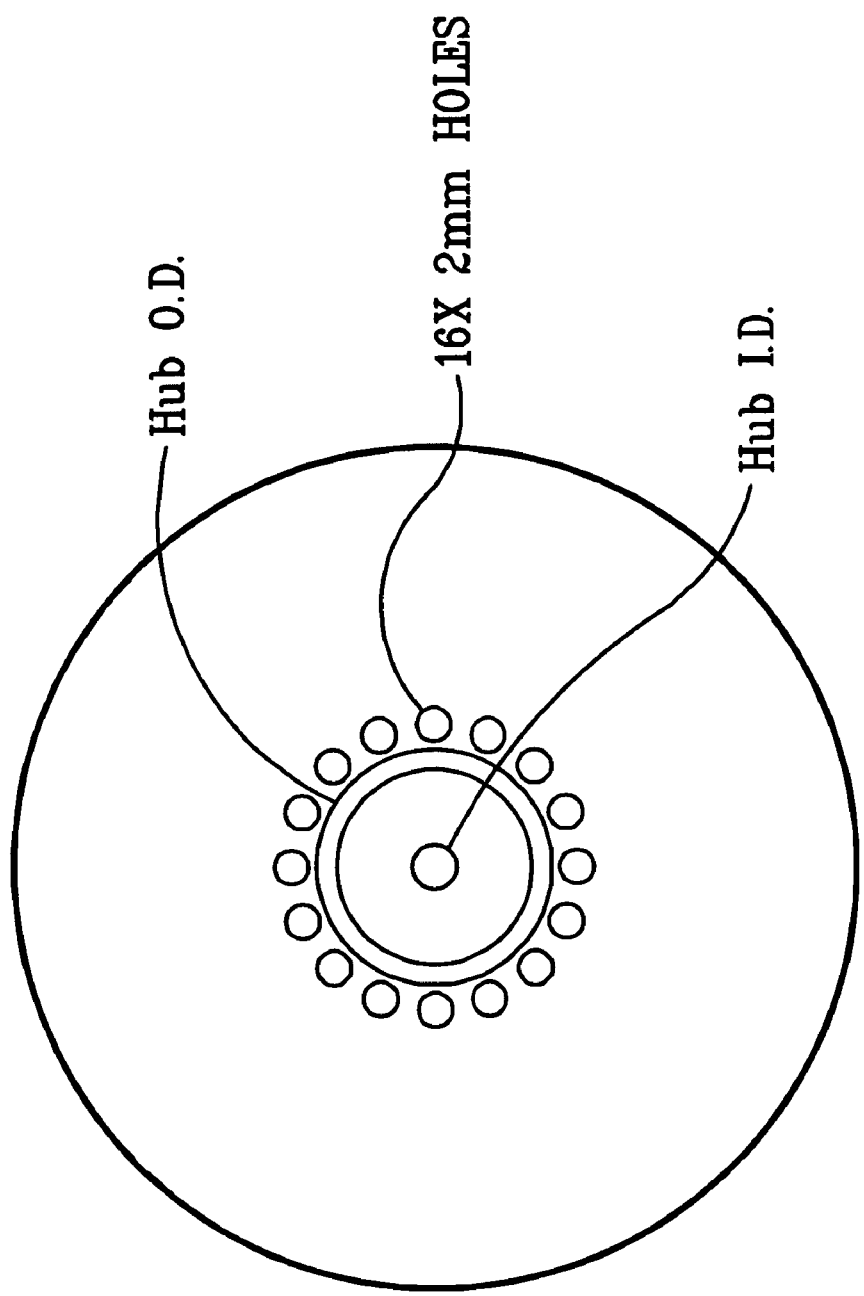
FIG. 8D4

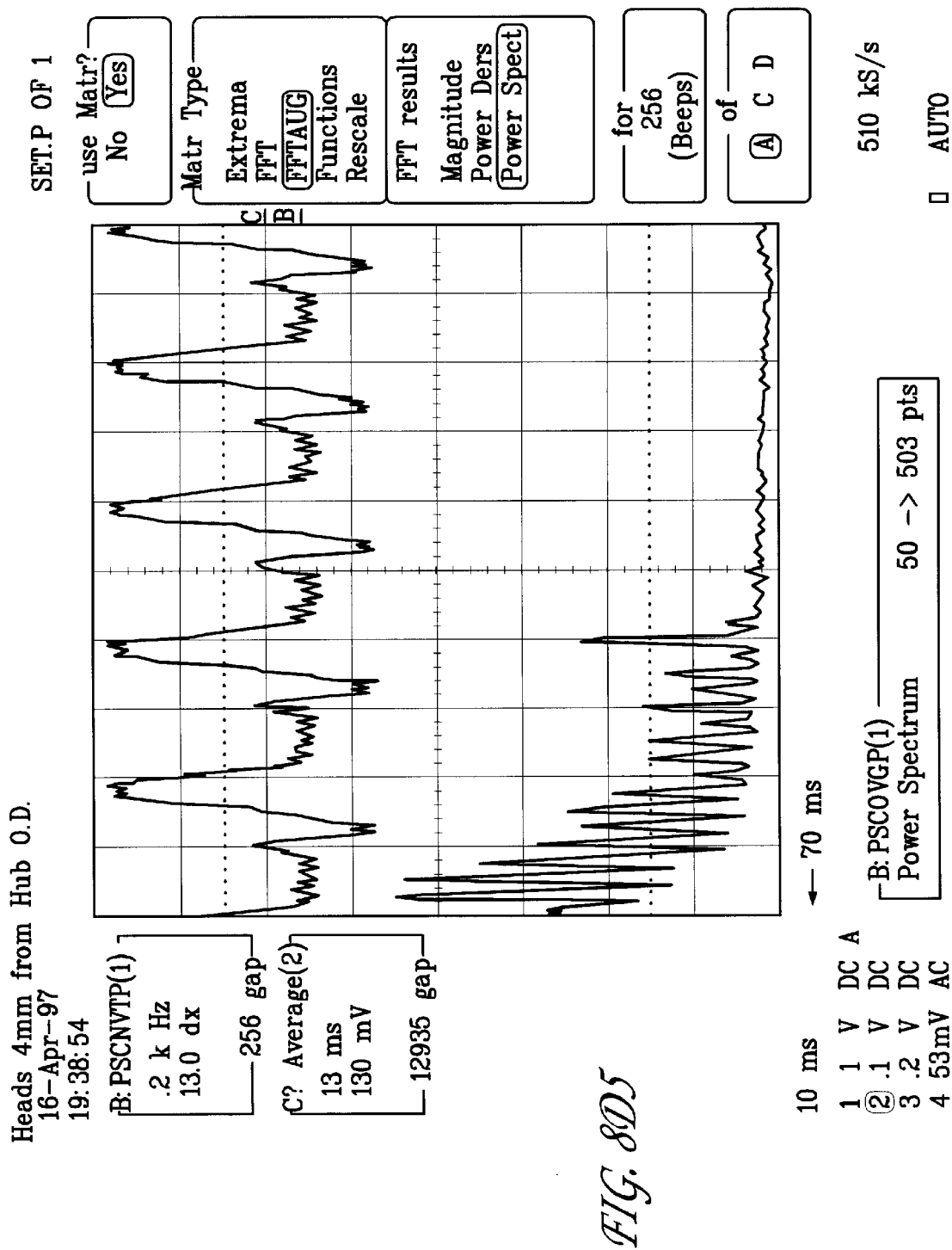
FIG. 8D5

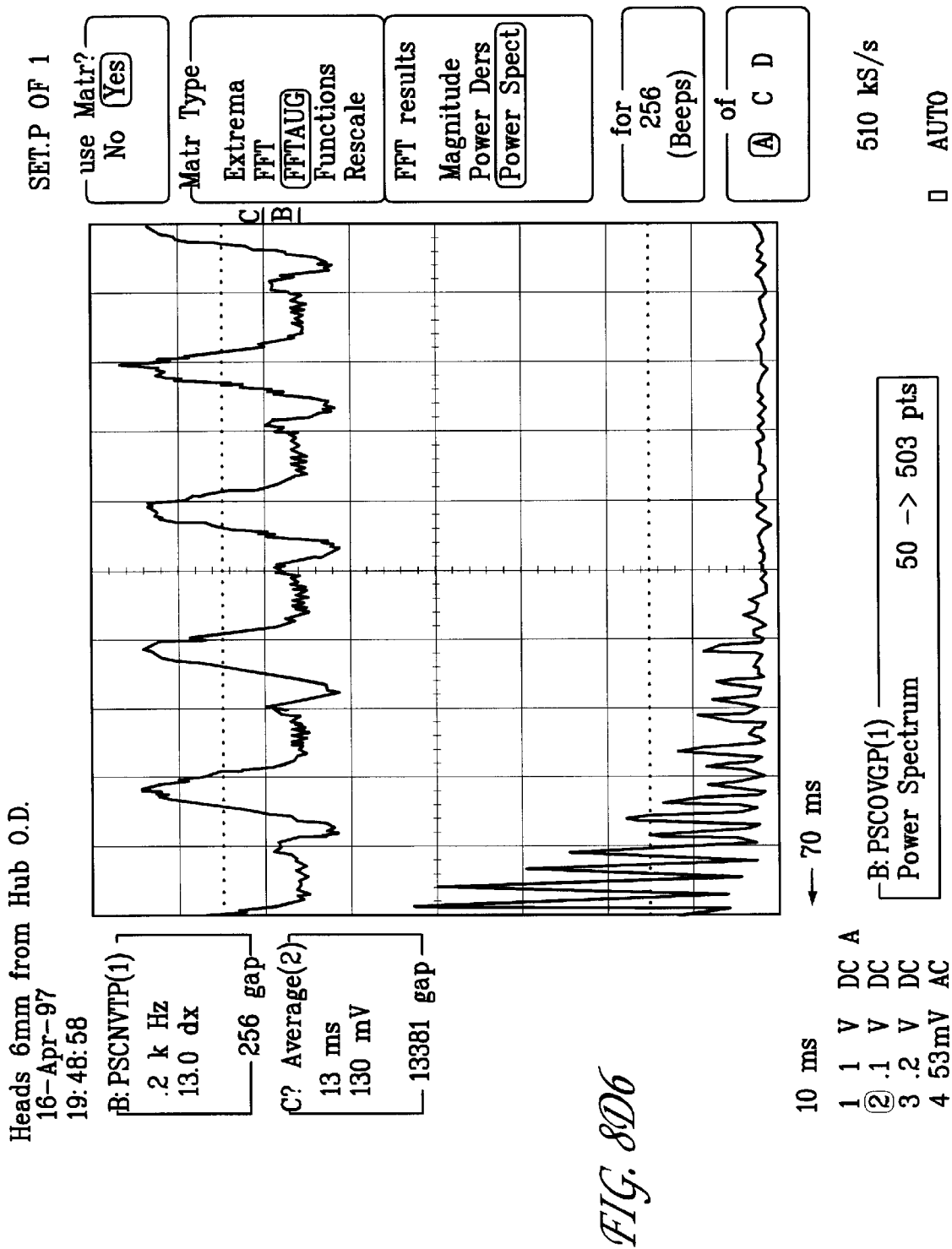
FIG. 8D6

APPARATUS AND SYSTEM FOR STABILIZING A DISK MEDIA SURFACE FOR ENGAGEMENT WITH A DRIVE HEAD

FIELD OF THE INVENTION

This invention relates generally to the field of flexible data storage disks and disk drives. More particularly, the invention relates to a disk apparatus and system having a pattern disposed proximate a center region of a disk for improving the stability of the disk media as it spins in a disk drive thereby improving the cooperation of the drive heads with the disk storage medium.

BACKGROUND OF THE INVENTION

"Flexible" or "floppy" disks are frequently used as a magnetic storage medium because of their portability and low cost. These disks are called "floppy" because they tend to sag away from their center when not otherwise supported. The space between a magnetic disk and the transducer is critical for proper non-contact data recording and pick-up. It has been common practice in the art to attempt to flatten and stabilize the floppy disk during the read/write operation by rotating the disk at high speeds in close juxtaposition to a fixed, flat plate sometimes called a "Bernoulli" plate. In this way, an air bearing is formed between the plate and disk such that the gap between the media surface and the plate is held constant. The thin layer of air between the disk and the plate tends to rotate with the disk and to be thrown outwardly by centrifugal force. This creates a vacuum between the plate and the disk which tends to pull the disk close to the plate and cause it to behave in a substantially rigid manner. This magnetic disk behaving in a substantial rigid manner is then rotated in juxtaposition to magnetic read/write heads disposed very closely to the disk so that the heads "fly" on an air bearing in very close proximity to the disk. This has the advantage of allowing high data density, but without the expense associated with rigid magnetic disks.

A problem associated with these flexible disks, especially miniature flexible disks, is that they are susceptible to vibration modes in the disk media that translate to positioning errors when the disk is operating. These vibration modes are well understood in the rigid disk industry, as described in "The Complete Handbook of Magnetic Recording," $3^{rd}$ Edition, by Finn Jorgensen,©1988. Disk drives generally employ disks that are clamped at their centers, and free on the outside. In this configuration, a flexible disk may best be treated as a circular membrane, while a rigid disk is most similar to a rigid circular plate. Resonance frequencies are present with these spinning disks as a read/write head travels over the surface of the disk, and from vibrations introduced to the disk media from the drive hub. These resonance frequencies may cause fluttering in the disk. Note that the existence of a resonance frequency does not mean that the disk will start vibrating at that, or any other frequency, but it may, if the disk is excited. Radial vibration flexures may be present in a circular membrane, that is clamped at its center and free at the edges. These radial flexures generally behave according to a f x n vibration flexure pattern, where f represents the frequency and n is an integer (1, 2, 3, 4, . . . ). Circumferential vibration flexures may also be present in the same type of disk. These radial and circumferential vibration modes may be present individually as pure radial or pure circumferential waves, or together simultaneously, as a hybrid type of wave having both a radial and a circumferential component.

Under normal circumstances, the disk is rigidly adhered to the center hub via a curricular attachment method. This reflects any vibrations coherently back to the outer edge where the circular outer edge also reflects them coherently, thereby setting up a pattern of standing waves in the media. This circular attachment mechanism leads to disk instability because the vibration modes establish a standing wave phenomena in the circular disk media.

Another problem that results in a lack of disk stability or overall media waviness is the fact that the flexible media is normally anisotropic and develops strain in the disk media when read/write heads are used. The anisotropic media typically shows a "potato-chip" like cylindrical shaped curl or two waves per revolution (2f vertical excursion from the spinning reference frame) in an unsupported free state due to the leftover residual strain. This 2f component has an additional 1f due to any overall wedge or tilt aspect imparted by the hub attachment. This varying strain imposes an additional dynamic burden on the performance of the read write head as the media spins, particularly when the penetration, pitch and roll offsets due to manufacturing tolerances are included. For example, in small diameter disks, i.e., less than 50 mm, these offsets result in increased vertical motions, especially in the stiffer ID region when allowable offsets from nominal target values are present.

Thus, there is a need for an apparatus and system for improving disk stability by minimizing the standing wave phenomena in the disk media resulting from vibration modes in the spinning disk, and for improving disk compliance.

SUMMARY OF THE INVENTION

The present invention is directed to a disk apparatus and system having a disk stability pattern disposed proximate a center region of a disk for improving the stability of the disk media as it spins in a disk drive thereby improving the cooperation of the drive heads with the disk storage media.

According to one aspect of the invention, the disk stability pattern of the present invention improves disk static and dynamic stability by minimizing the formation of standing waves in the flexible disk media and by improving compliance of the disk surface by altering the ID pattern of the disk.

In accordance with another aspect of the invention, the stability pattern comprises a combination of a non-circular shaped attachment ring that disposed between the hub and the disk, and a plurality of openings disposed proximate the buffer region of the disk. This disk stability pattern combination comprising a non-circular attachment ring and a plurality of openings that relieves the overall burden on the disk.

In accordance with another aspect of the invention, a flexible disk is provided for use in a disk drive, the disk comprising: a flat substantially circular body having a geometric center, a top surface and a bottom surface, an outer peripheral edge, an inner peripheral edge, an inner buffer zone is disposed proximate to the inner peripheral edge, a data storage medium is disposed on the body between the buffer zone and the outer peripheral edge, a disk hub is coupled to the central buffer portion of the body, and a stability pattern is disposed in the disk body proximate the central buffer portion of the disk. The stability pattern is disposed on disk to improve the static and dynamic stability of the disk.

In accordance with another aspect of the invention, disk stability is improved by improving disk compliance by removing material from the disk by use of cutting back the attachment ring and/or disposing openings in the body of the disk.

In accordance with another aspect of the invention, disk stability is improved by minimizing the formation standing waves in the disk by providing a non-circular attachment ring and by disposing openings in the body of the disk to attenuate vibration flexures in the disk.

In accordance with another aspect of the invention, the size and shape of the attachment ring cooperates with the number and location of the plurality of openings to improve disk compliance and to reduce disk vibration modes.

In a further embodiment within the scope of the present invention, the stability pattern comprises a non-circular attachment ring to reduce vibration modes in the disk.

According to further aspects of the invention, the stability pattern comprises a polygonal ring that is disposed proximate the hub and the disk.

According to further aspects of the invention, the polygonal ring comprises an octagonal or a hexagonal shape.

According to further aspects of the invention, the stability pattern comprises a non-circular patterned adhesive to attach the hub to a disk to reduce disk vibration modes.

Another embodiment within the scope of the present invention, the stability pattern comprises a plurality of openings disposed in the body of the disk proximate the buffer zone of the disk to improve disk stability by improving disk compliance and to minimizing vibration flexures in the disk. This plurality of openings relives static stresses in the disk and reducing the effects of anisotropic curl and tilt on the disk media.

According to another aspect of the invention, the plurality of openings further comprise through holes in the body of the disk.

According to another aspect of the invention, the plurality of openings further comprise a hole pattern that relates to a standing wave harmonic of the spinning disk.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific apparatus, system, and instrumentalities disclosed. In the drawings:

FIGS. 3A and 3B are top and bottom views of the disk cartridge of FIG. 1 for use in the drive of FIG. 2;

FIGS. 8A, 8B, 8C, and 8D are exemplary wave form data of the disk embodiments of FIG. 6.

DETAILED DESCRIPTION OF EXEMPLARY EMBODIMENTS AND BEST MODE

An apparatus and system for improving disk stability and head contact with a disk media that solves the above-mentioned problems in the prior art and provides other beneficial features in accordance with the presently preferred exemplary embodiment of the invention will be described below with reference to FIGS. 1–8. The present invention is directed to an apparatus and system comprising a disk having a disk stability pattern disposed proximate a center region of the disk for improving the stability of the surface of a disk media as it spins in a disk drive, and thereby improving the engagement of a transducer head with the disk storage medium. The disk stability pattern of the present invention improves disk stability by minimizing the formation of standing waves in the flexible disk media and by improving compliance of the disk surface by altering the ID pattern of the disk. Those skilled in the art will readily appreciate that the description given herein with respect to those figures is for explanatory purposes only and is not intended in any way to limit the scope of the invention. Throughout the following detailed description similar reference numbers refer to similar elements in all the figures of the drawings.

Throughout the description, the invention is described in connection with a removable media disk drive. However, the particular disk drive and cartridge shown only illustrate the operation of the present invention and are not intended as limitations. Aspects of the invention are equally applicable to other disk drives including linear actuator disk drives, fixed medium drives, and removable medium disk drives, as well as, differently sized and shaped disks and disk cartridges. Accordingly, the invention should not be limited to the particular drive or cartridge embodiment shown as the invention contemplates the application to other drive and cartridge types and configurations.

Figure 1:
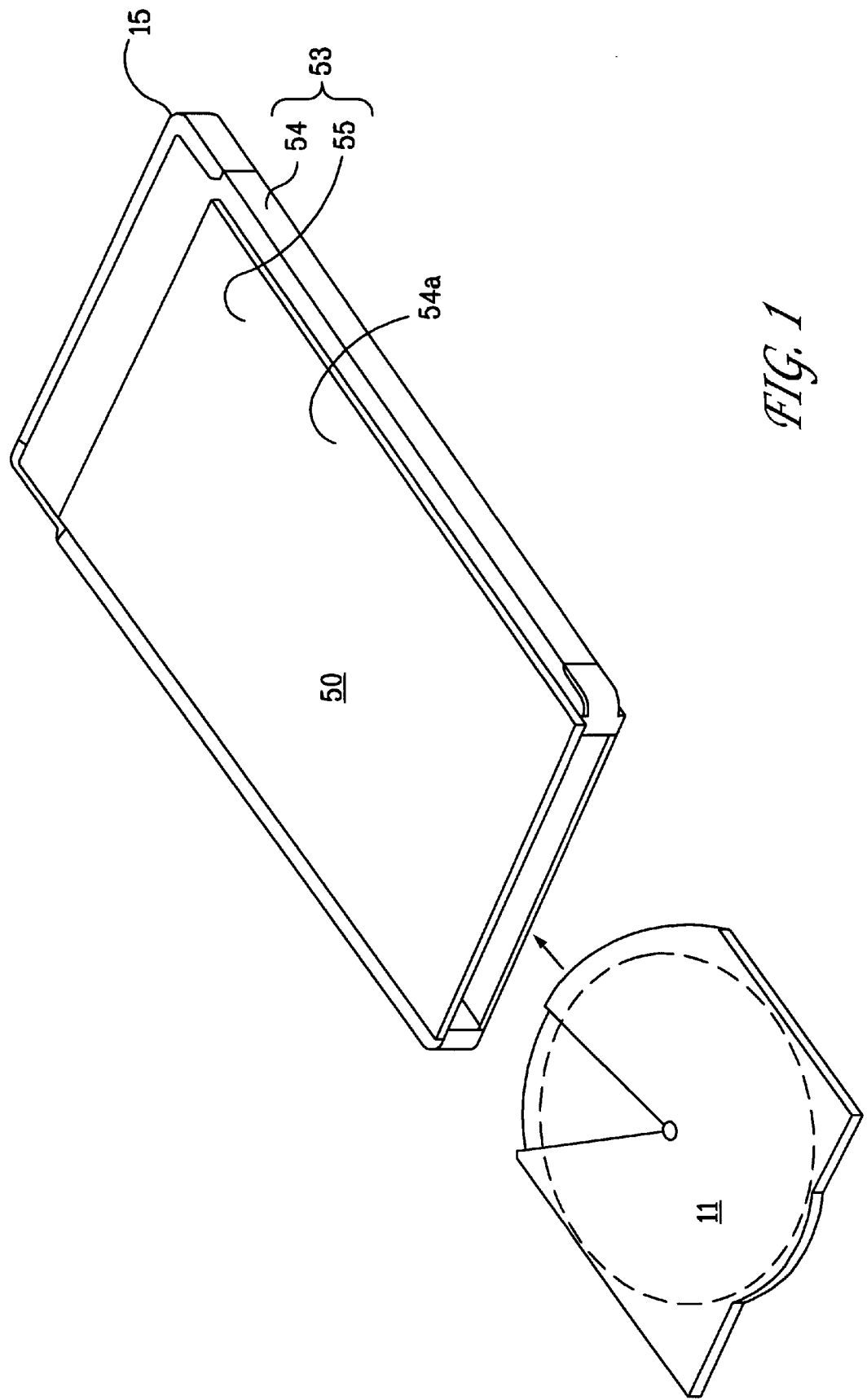
FIG. 1 is a perspective view of an exemplary data storage device, or disk drive, and an exemplary disk cartridge in which the present invention is embodied.

FIG. 1 is a perspective drawing of an exemplary disk drive device 50 and an exemplary disk cartridge 10. Drive 50 may be adapted for removable connection to a computer device or may be built-in to a computer device (not shown). Preferably, disk drive device 50 has a form factor such that it may be adapted for use with a PCMCIA connection (Type III or, more preferably, Type II). Disk drive device 50 may have a protective case, such as protective case 53, consisting of an upper case 54 and a lower case 55, which form an interior space for accepting disk cartridge 10 or a cartridgeless media, such as an optical compact disk (CD). Upper case 54 and lower case 55 are preferably formed from sheet material. Lower case 55 has a bottom surface and side surfaces, and upper case 54 is formed so that it covers the top of lower case 54. Upper case 54 may also have a raised surface 54a, which projects upward across a width of the upper case 54.

A connector 15 (shown in phantom in FIG. 1) is provided in one end of protective case 53. As noted, preferably the external dimensions of the protective case 53 are in a form which conforms to the PCMCIA standards, preferably Type II. According the standard, the form factor should conform to a length of about 85.6 mm, and a width of about 54 mm. By conforming to this standard, drive device 50 can be adapted for insertion into a PCMCIA port, such as the type commonly found in computers (not shown). Furthermore, when disk drive device 50 is inserted into a PCMCIA port of a computer or built-in to a computer device, connector 15 connects to a corresponding connector within the computer such that a power source and electrical signals can be transmitted and received between disk drive device 50 and the computer.

Figure 2:
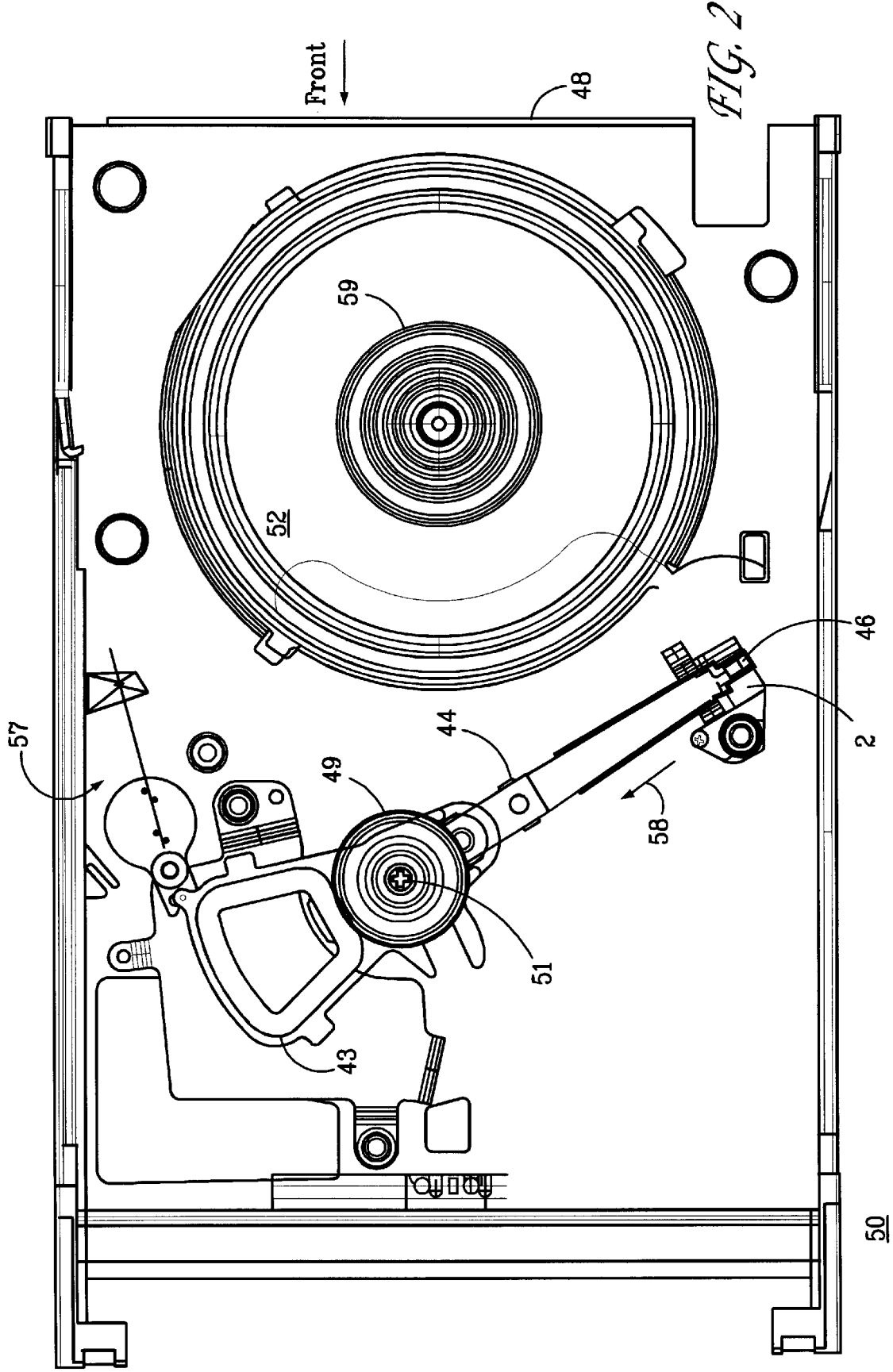
FIG. 2 is a top plan view of the disk drive of FIG. 2.

FIG. 2 is a top plan view of the internal components of the exemplary disk drive 50 of FIG. 1 with the upper case 54 removed for clarity. Drive 50 further comprises a chassis 57, an actuator 49, a spindle motor 52 and a spindle 40, and load ramps 47. The actuator is itself comprised of three major components: (1) a pair of load beams 44 with (2) a read/write head 46 disposed at the distal end of each load beam 44, and (3) a coil 43. Actuator 49 is driven by a voice coil to pivots about point 51. When actuator 49 is not in use, it is generally retracted to the parked position (as shown).

A disk cartridge 10 can be inserted into an opening 48 in the front of drive 50 in the direction indicated by the arrow. During insertion, the disk 10 slides linearly along the top surface of chassis 57 and spindle motor 52 for engagement with the read/write heads 46.

Figure 3B:
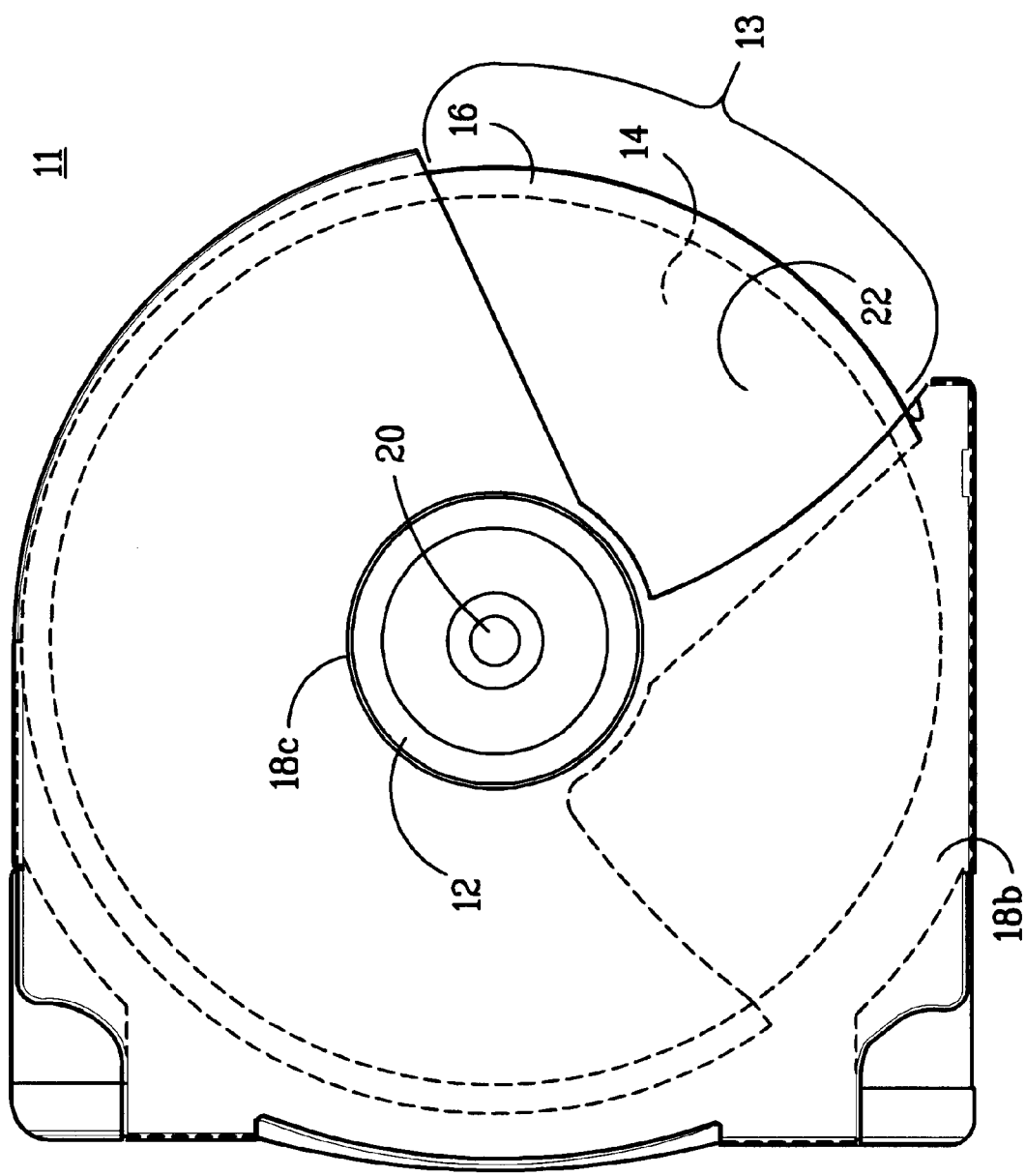

FIGS. 3A and 3B present top and bottom views of an exemplary disk cartridge 10 for use with the drive 50. Disk cartridge 10 comprises a flexible disk 11 having a magnetic storage medium 14, a storage media hub 12, top and bottom cartridge shell halves 18a and 18b, a rotary shutter 16, and a shutter pivot pin 20. Shutter 16 is rotatably disposed in cartridge 10 to selectively cover and expose disk access opening 13. In the open position, shutter 16 is rotated away from a generally wedge shaped disk access opening 13 that is formed in cartridge shell 18, exposing the top and bottom surfaces of disk 11 for access by a read/write head or heads 46 contained within the disk drive 50. In the closed position, shutter 16 is rotated over disk access opening 13, sealing disk cartridge 10 and protecting storage medium 14. The flexible disk 11 is preferably formed of a thin polymer film, such as MYLAR, and has a thin magnetic layer 14 uniformly dispersed on the top and bottom surfaces. The magnetic surfaces magnetically sensitize the flexible storage medium 14 and enable the storage of digital data when the surface is brought into magnetic communication with a magnetic transducer 46 of the type commonly found in disk drives. Preferably, information can be written on both sides of the storage medium 14. While magnetic media is preferred, other media can be employed, and the present invention is by no means limited to use of magnetic storage media. For example, the storage medium 14 can be a re-writeable optical storage medium or a magneto-optical storage medium. Disk 11 is generally circular with a circular outside diameter and a substantially circular hole proximate its center.

Media hub 12 is firmly secured to disk 11 such that the center of hub 12 is aligned proximate the center of disk 11. Media hub 12 is attached to disk 11 via a well-known adhesive process. Preferably the hub 12 is affixed to the disk 11 by use of an adhesive or bonding material, such as Dupont hot-melt adhesive or MMC Glue DHA. The disk 11 and hub 12 assembly are rotatably disposed between upper and lower cartridge shell halves 18a, 18b. Lower cartridge shell half 18b has a substantially circular spindle access opening 18c such that a disk drive 50 can provide rotational power to disk 11 via hub 12.

Figure 4:
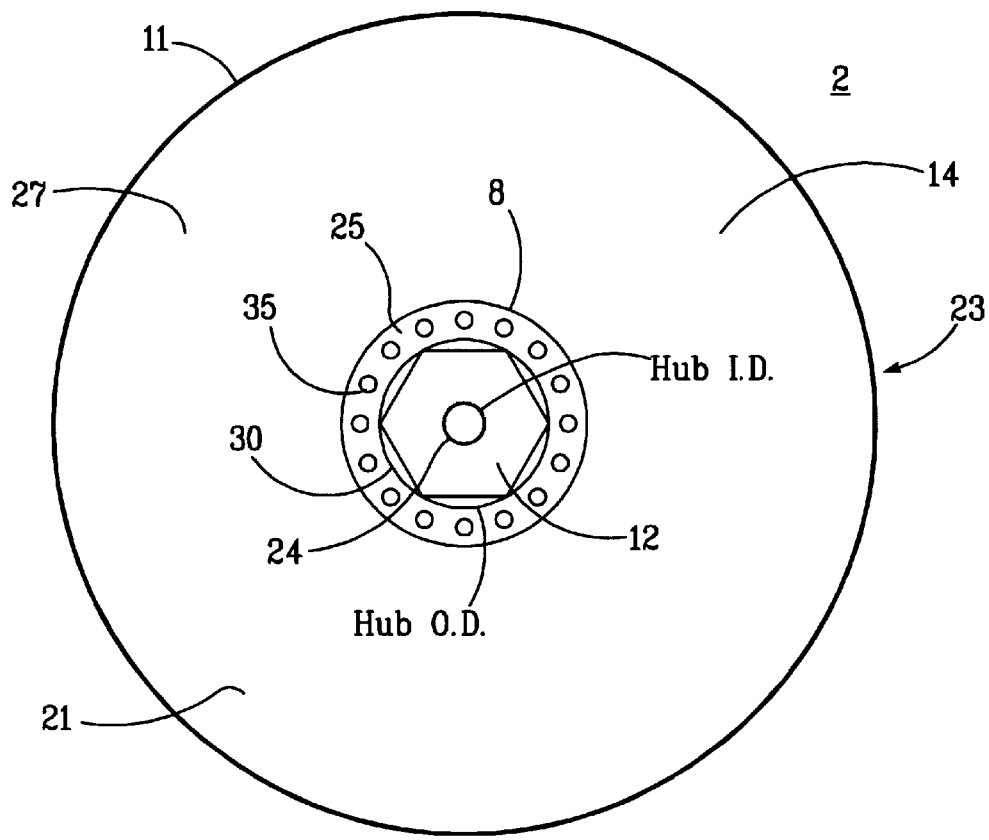
FIG. 4 is a top plan view of a first exemplary disk having a disk stability pattern of the present invention.

FIG. 4 shows an exemplary apparatus 2 of the present invention for improving disk stability, and thereby improving the contact between a drive head 46 and a storage medium 14. Referring now to FIG. 4, shown is an exemplary flexible disk 11 of the present invention for use in a disk drive 50, the disk 11 comprising: a flat substantially circular body 27 having a geometric center, a top surface 21 and a bottom surface 22, an outer peripheral edge 23, an inner peripheral edge 24, an inner buffer zone 25 is disposed proximate to the inner peripheral edge 24, a storage medium 14 is disposed on the body 27 between the buffer zone 25 and the outer peripheral edge 23, a disk hub 12 is coupled to the central buffer portion 25 of the body 27, and a stability pattern 8 is disposed in the disk body 27 proximate the central buffer portion 25 of the disk 11. The stability pattern 8 is disposed on disk 11 to improve the static and dynamic stability of the disk 11.

In one preferred embodiment, the stability pattern 8 comprises a combination of a non-circular shaped attachment ring 30 that disposed proximate the hub 12 and the disk 11, and a plurality of openings 35 disposed in the buffer region 25 of the disk 11. This disk stability pattern 8 combination comprising a non-circular attachment ring 30 and a plurality of openings 35 that relieves the overall burden on the disk 11.

The non-circular attachment ring 30 acts to improve the dynamic stability of the disk 11 by acting as a spoiling shape to minimize the formation of standing waves in the disk 11. The attachment ring 30 primarily spoils circular modes (standing waves) in the radial direction. These modes generally originate in the hub region as a result of vibration of the drive 50 and emanate from the hub region of the disk 11 to the outer peripheral of the disk 11 and then back to the center region of the disk 11. The mode spoiling characteristics of the non-circular shaped attachment ring 30 of the present invention improves dynamic disk stability in the radial sense. The non-circular attachment ring 30 may also improve static stability of the disk 11 by removing material from the attachment ring 30 thereby improving disk compliance. This may be accomplished by undercutting the attachment ring 30 back as far as possible. By cutting back the attachment ring 30 and removing material, the flexibility of the disk body 27 is improved.

The attachment ring 30 may be formed integral with the hub 12. In this embodiment, the ring 30 would be formed on the surface of the hub 12 that is affixed to the surface of the disk 11. Alternatively, the ring 30 may comprise a separate ring piece, such as a body having adhesive or bonding material on both sides of the body for affixing the hub 12 to the disk 11. In addition, the ring 30 may be cut into the body of the flexible disk 11.

The plurality of openings 35 acts to improve both the static and dynamic stability of the disk 11. Static stability is improved by providing a plurality of openings 35 in the body 27 of the disk 11. These openings 35 remove material from the disk body 27 thereby improving the flexibility and compliance of the disk 11. The openings 35 also improve disk stability by removing residual stresses from the disk 11. The openings 35 provides improvements in beam stress flexure of the disk member by eliminating material. The plurality of openings 35 also acts to improve dynamic stability of the disk because the hole pattern has a tendency to spoil the formation of standing waves in the disk body 27, especially in the circumferential sense. The plurality of openings 35 provides dynamic compliance in the spinning sense for the circumferential modes, and provides offset from events such as eddie shredding which produces offset of a spinning plane, and from offset caused by the head 46 engagement with the disk 11. The stability pattern 8 comprising this combination is especially useful in improving the stability of spinning disk media that normally experiences static and dynamic instability, as well as, hybrid modes of disk instability. These hybrid modes comprise both radial and circumferential modes of standing waves in the disk media.

Disk media 11 may also experience pure radial modes or pure circumferential modes and therefore, embodiments comprising a stability pattern 8 comprising only a non-circular attachment ring 30, and embodiments comprising only the plurality of openings 35 are also contemplated.

Preferably, the shape of the non-circular attachment ring 30 and the number of openings 35 are coordinating so that they compliment one another in improving compliance of the surface of the disk and in spoiling the radial and circumferential modes that may be present in the spinning disk. The non-circular ring 30 preferably has a polygonal shape, meaning three or more straight sides. The lengths of the individual sides of the ring 30 may be uniform or they may have different lengths. More preferably, the ring 30 has a hexagonal or octagonal shape. It is desired to match or coordinate the shape of the ring 30 and the number of openings comprising the plurality of openings 35.

Figure 5:
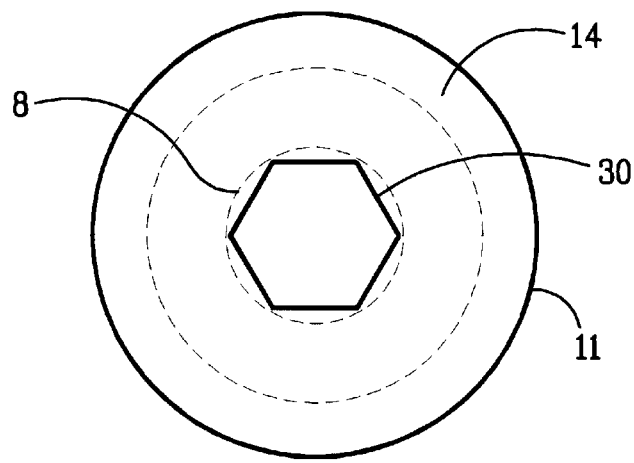
FIG. 5 is a top plan view of a second exemplary disk in accordance with the present invention.

As shown in FIG. 5, the non-circular geometrically shaped attachment ring 30, preferably a polygonally shaped ring, is disposed between the disk 11 and the hub 12 of the disk assembly. This non-uniformed geometrical shaped attachment ring 30 breaks up the standing wave phenomena that usually accompany vibrations in a circular disk media. As stated earlier, under traditional methods and normal circumstances the disk 11 is rigidly adhered to the center hub 12 via a circular attachment mechanism. This disk geometry having a circular attachment mechanism reflects any vibrations coherently back to the outer edge where the circular outer edge also reflects them coherently, thereby setting up a pattern of standing waves in the media. The non-circular attachment apparatus and system of the present invention, reflects vibrations in a non-coherent manner, thereby eliminating or significantly reducing the standing vibration waves in the media 11. Preferably, the non-circular attachment mechanism further comprises a polygonal shaped ring 30 to attach the hub 12 to the disk 11 in order to break up the geometry that normally aids in establishing the usual disk vibration mode behavior.

When dealing with anisotropic flexible media 11 which is flexible by definition, achieving relaxation of the resulting strain when magnetic read-write heads 46 are used to read and write data on the storage medium 14 is critical. The anisotropic media 11 typically has a "potato-chip" like cylindrical shaped curl of two waves per revolution (2f vertical excursion from the spinning reference frame) in an unsupported free state due to the leftover residual strain. This 2f component has an additional 1f due to any overall wedge or tilt aspect imparted by the hub attachment ring 30. This varying strain imposes an additional dynamic burden on the performance of the read write head 46 as the media 11 spins, particularly when the penetration, pitch and roll offsets, due to manufacturing tolerances, are included.

Generally, a cantilever beam becomes more stable or stiff as an applied force approaches the point of support and so it is with flexible media 11. As the read write heads 46 approach the point where the media 11 is attached to the hub 12 the media 11 becomes more stiff. For this reason there is commonly a "buffer zone" 25 near the ID of the media where data is not written due to poor compliance. This buffer zone 25 wastes good media 11 and reduces the data storage capacity of storage medium 14 of the disk cartridge 11. As shown in FIG. 6, a hole pattern 35 comprising a plurality of openings 35 improves compliance of the disk 11. This improved compliance and disk flexibility reduces the size of the buffer zone 25 that is required, allowing for more data to be stored to the disk 11.

FIGS. 8A, 8B, 8C, and 8D show exemplary wave form data of the disk of FIG. 6 that show the theory behind the media openings concept. Testing shows that a 4×n opening pattern 35 aligned in the ID or buffer region 25 of the disk 11, where n is an integer (1,2,3,4, or 5), tones down the major 1f and 2f components present because of the "potato chip" characteristic generally present in flexible media 11. The rationale for this approach working as suggested for thin membrane sheets is that the residual stress in the sheets imparts a local curvature that is exactly proportional to this stress. Hence, an overall two-dimensional map of this curvature shows the stress state of the whole sheet (or in this case the media extent). By addressing the 2f (and by default 1f) components by this 4×n hole pattern in the ID non-data buffer zone 25, it is possible to exactly match these larger known effects by a compliance relieving pattern of openings 35 that is spatially a matched harmonic of these effects. By using an opening pattern 35 that does not align exactly (different than 4×n, i.e., 14, 15, or 18 holes) one gets only a partial relaxation globally over only a limited zone which may actually not be any relaxation at all (due to the additional strain imparted by the hole punching).

Figure 8A1:
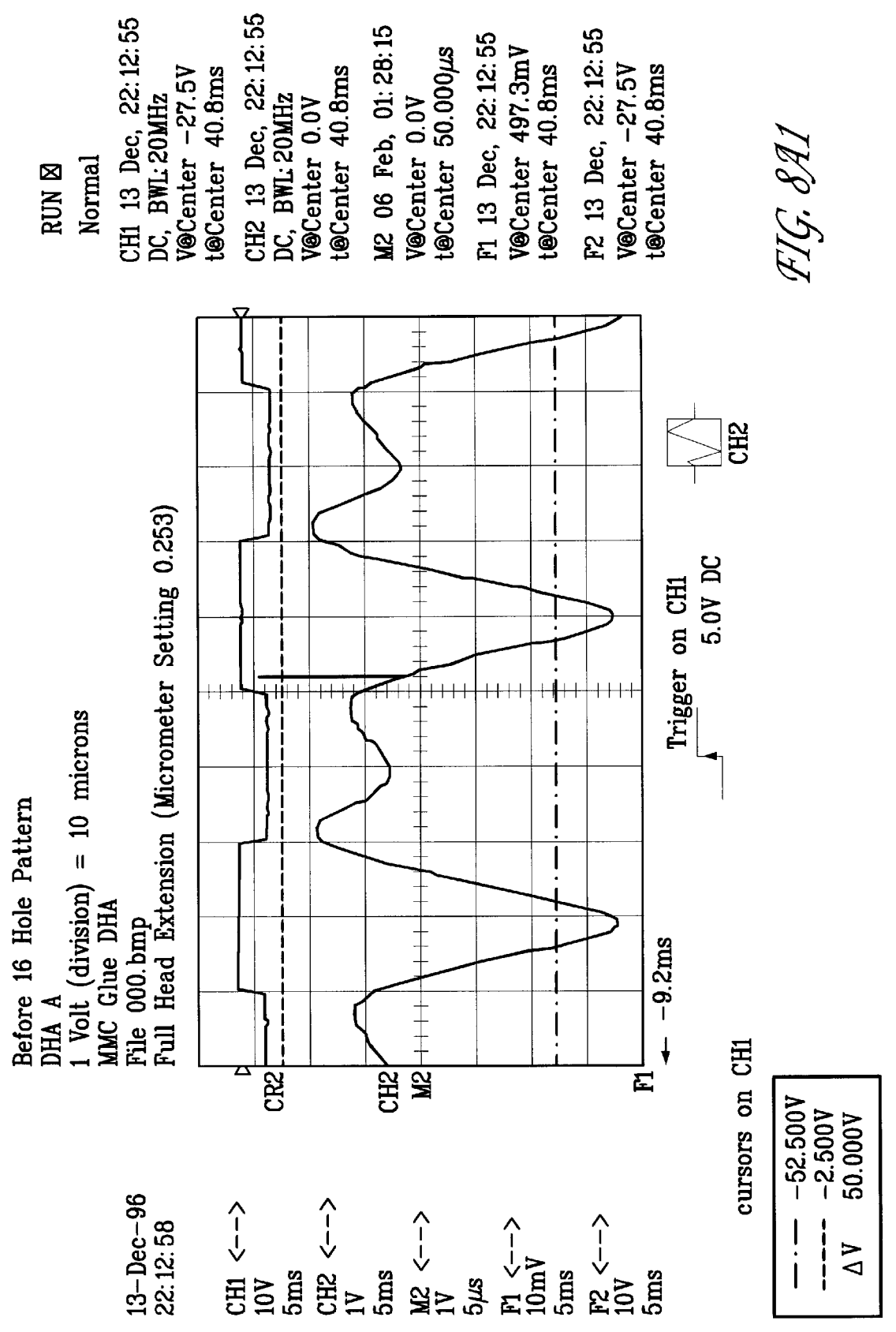
Figure 8A8:
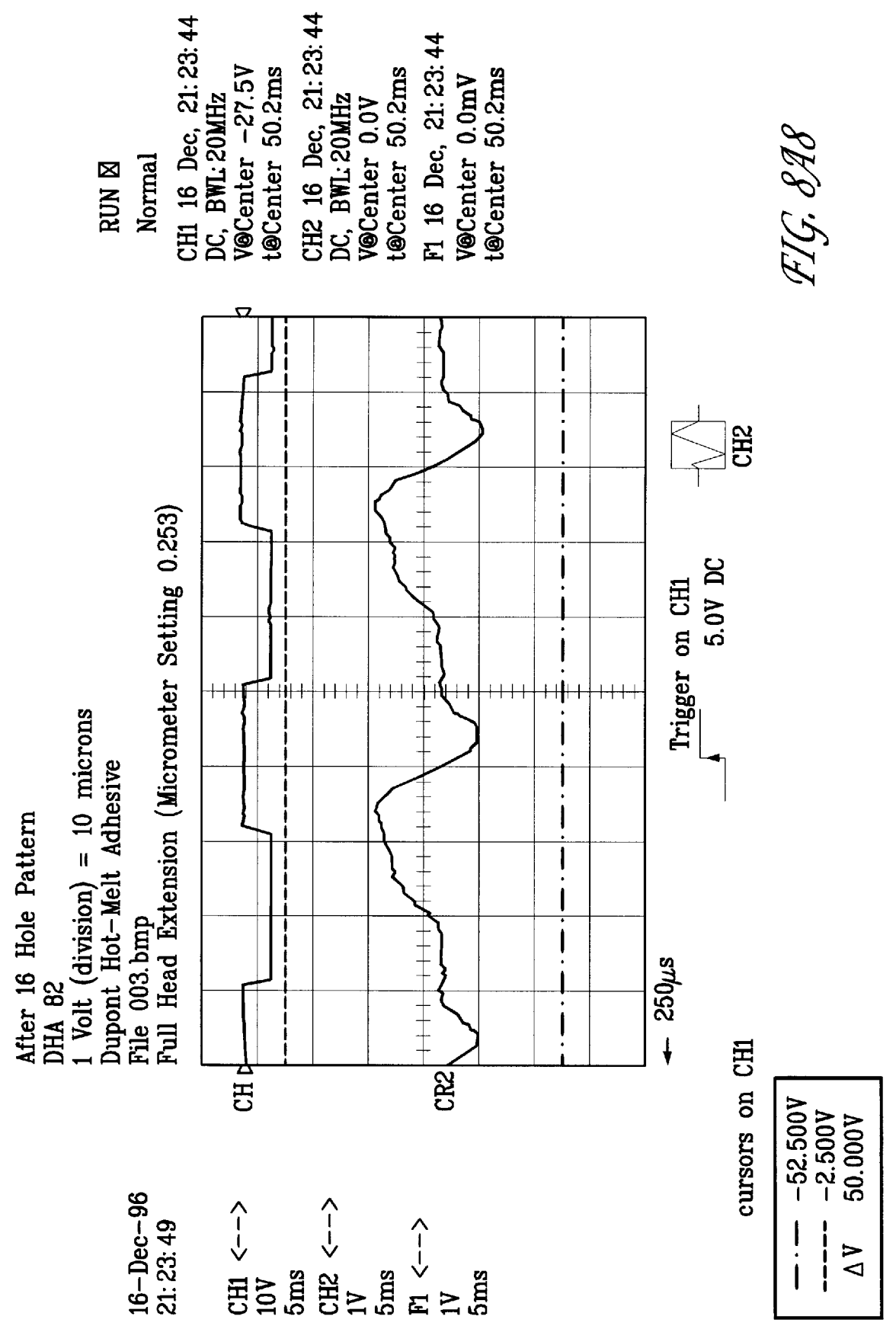

The effect was noted in experimentation with hole punching. Measurements of the vertical displacement of the read write heads 46 were done using a displacement laser at different locations on the media 11 while spinning. FIG. 8A shows that the number 16 seemed to always show an improvement whereas 18, 14, and 15 showed no improvement or a decrease in performance, as shown in FIG. 8C. In one test, as shown in FIG. 8B, the media 11 was first tested to measure its displacement factor without holes and then 4 holes were added and the same piece of media 11 was again tested. The test was again performed with 8 holes. Each step showed an improvement in performance.

One component induced by the holes is a 16f factor (when using 16 holes) that could potentially cause read write difficulty but this factor effect seems to diminish rapidly as the heads 46 move away from the opening pattern 35. As shown in FIG. 8D, the opening pattern 35 will not eliminate the need for a buffer zone 25 near the ID region where no data is stored, but it will allow for a much smaller buffer zone 25 than would typically be possible. This will allow more data to be stored on a piece of media 11 of any given diameter.

In addition, the opening pattern 35 allows a disk to be produced with a higher density data zone (higher capacity disk) in a given data storage zone area on the disk 11. In other words, the size of the data storage zone on the disk 11 may not change, but it would be possible to get more data in the same size data storage zone area. The opening pattern 35 would allow for the production of a higher density disk having a higher density of data tracks in the same size area on the disk 11.

Figure 6A:
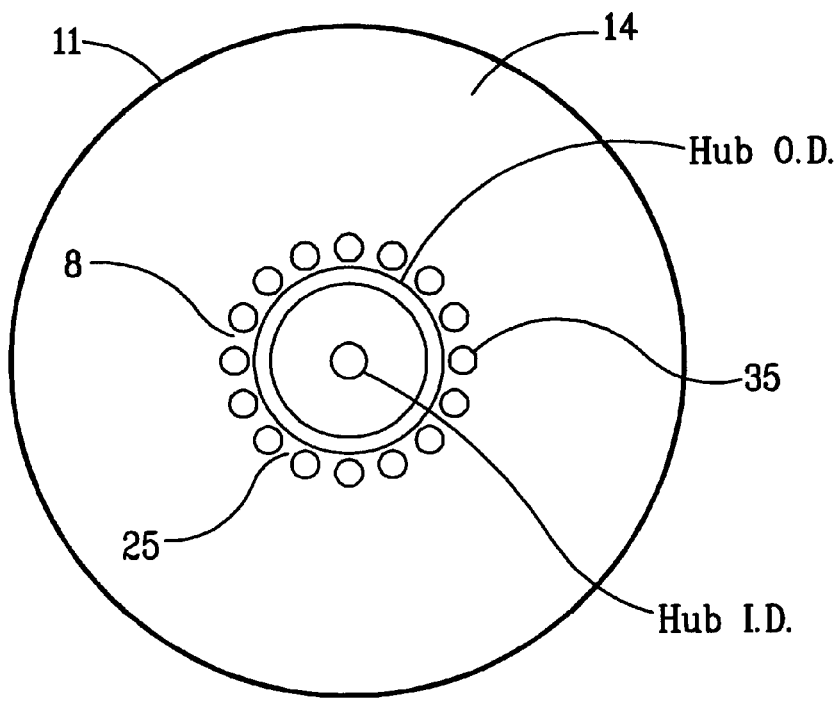
FIGS. 6A and 6B are top plan view of a third exemplary disk in accordance with the present invention showing two separate embodiments.
Figure 6B:
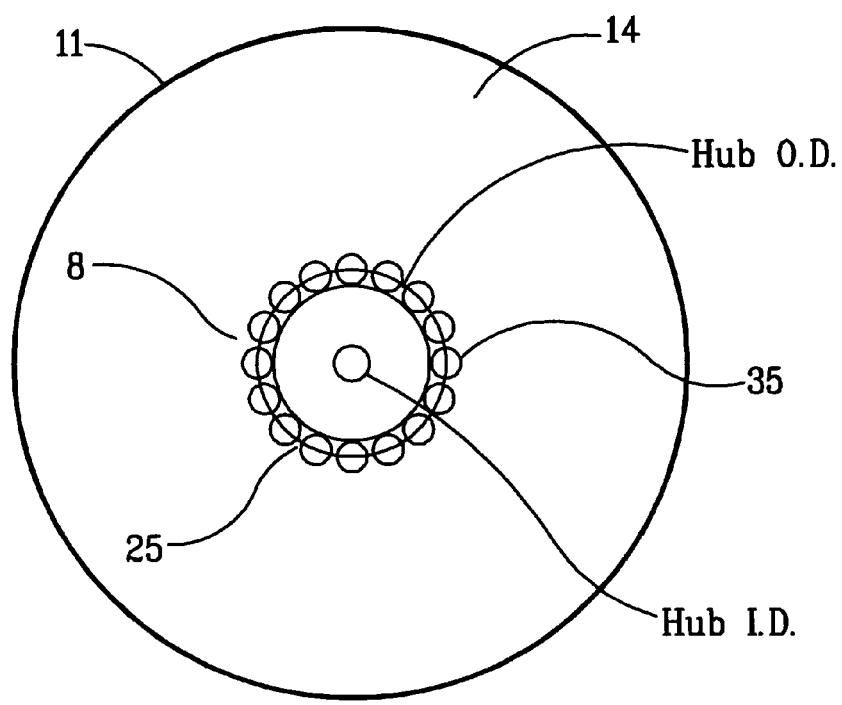
Figure 7:
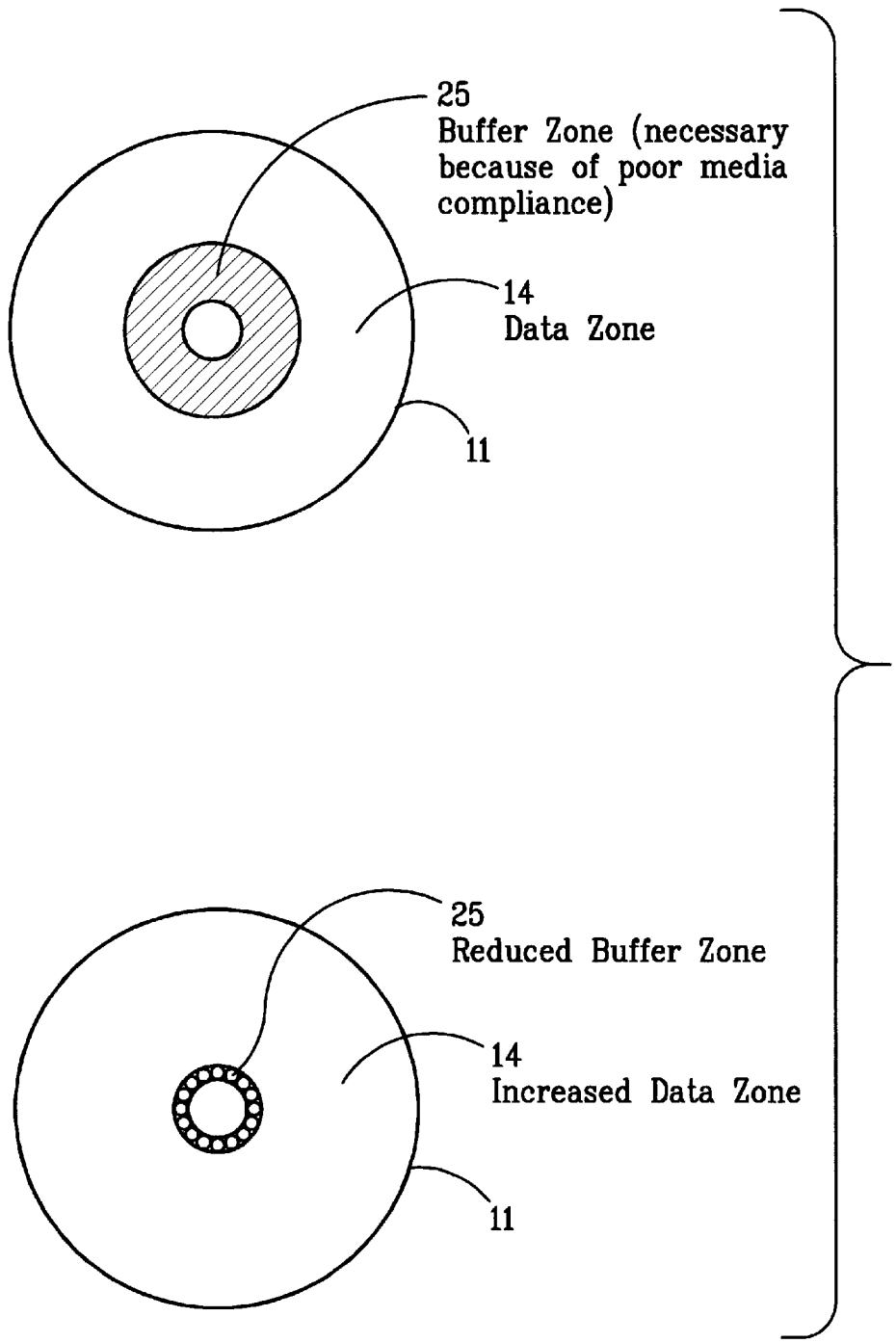
FIG. 7 shows an exemplary disk with the openings of the disk of FIG. 6, having an increased data storage area on the disk.
Figure 849:
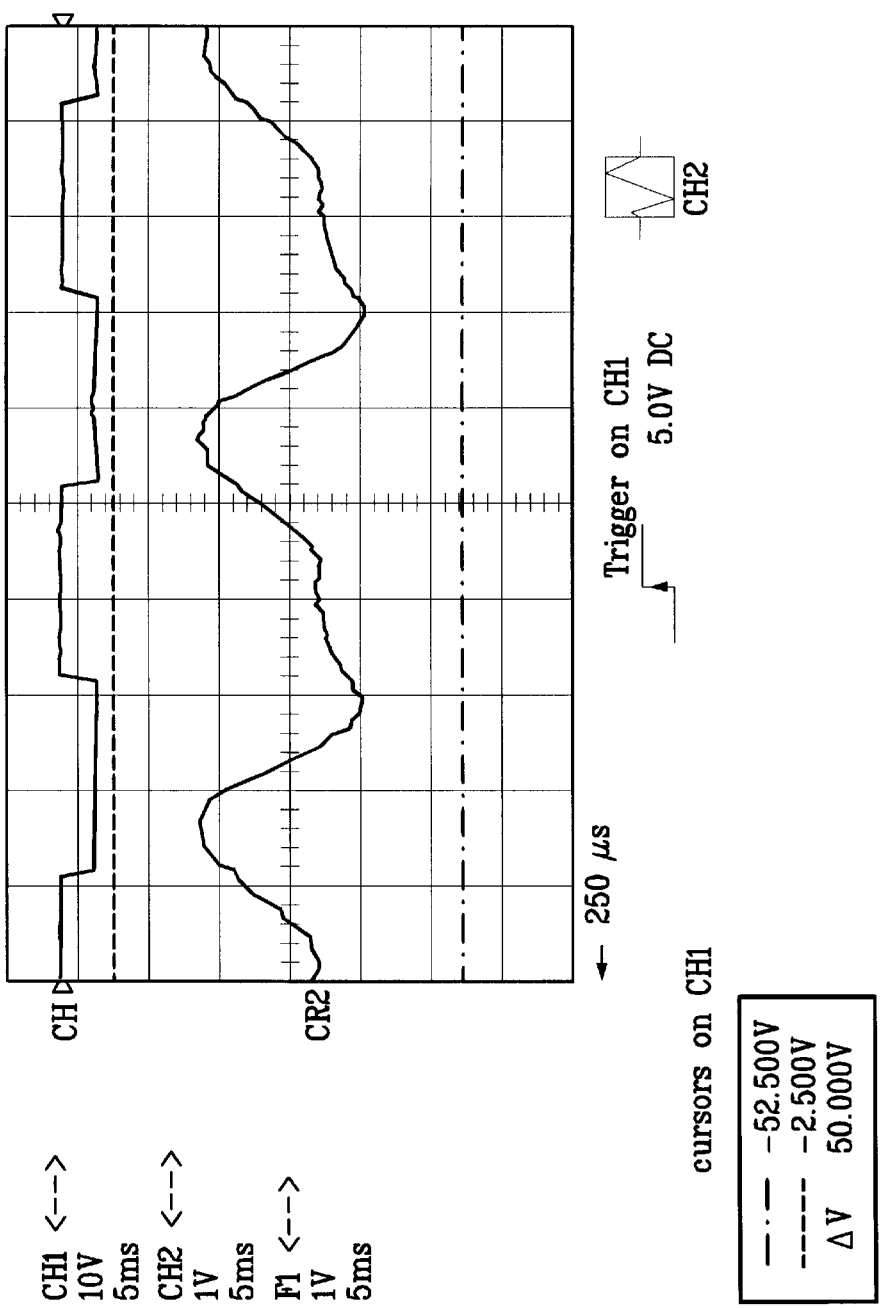

In one preferred embodiment, the openings 35 comprises a 4×n pattern of substantially circular openings 35. Preferably, the openings 35 are substantially circular through holes. Preferably, the openings 35 have a diameter of about 2 mm. However, this invention contemplates the use of other shaped openings 35, as well as, openings 35 that are not through holes in the body 27 of the disk 11, such as recesses in both the top surface and the bottom surface of the disk. These recesses may comprise stretches or cuts in the surface of the disk or indentations. Also, while it is currently preferred to disposed the stability pattern 8 in the ID buffer zone 25 of the disk 11 to maximize the amount of data storage medium 14 on the disk 11, the invention contemplates disposing the opening pattern 35 on other locations on the disk 11, such as in the region where the buffer zone 25 and the hub 12 overlap, in the buffer zone only, in the hub region only, or partially in the buffer zone 25 and partially in the region of the outer edge of the hub 12, as shown in FIGS. 6A and 6B.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A disk of the type comprising a flexible storage media and for use in a disk drive, said disk comprising:
 a flat substantially circular body having a geometric center, a top surface, a bottom surface, an inner peripheral edge, and an outer peripheral edge;
 an inner buffer zone disposed proximate said inner peripheral edge of said body on said top surface and said bottom surface;
 a data storage medium disposed on said top surface and said bottom surface of said body between said buffer zone and said outer peripheral edge;
 a disk hub coupled to a portion of said inner buffer zone of said body proximate said inner peripheral edge;
 a non-circular attachment ring disposed proximate said body and said hub, wherein said attachment ring has a non-circular shape at an outer periphery of said attachment ring; and
 a plurality of openings disposed in said buffer zone of said disk.

2. The disk of claim 1 wherein said flexible storage media is rotatably disposed in a rigid cartridge, said cartridge thereby protecting said flexible disk, said cartridge having a transducer access opening for accessing said disk storage media with read/write heads of said drive, and said cartridge having a drive hole proximate to said disk hub for cooperating with a complementary drive hub in said drive for rotatably driving said flexible storage media from outside said cartridge.

3. The disk of claim 1 wherein said attachment ring is positioned proximate said body and said hub and has a non-circular shaped outer peripheral edge to reduce disk vibration modes and to provide a compliant surface on said disk in the area of said media for compliant interfacing with a read/write head of said drive.

4. The disk of claim 3 wherein said attachment ring is formed integral with said hub.

5. The disk of claim 3 wherein said attachment ring comprises a separate ring disposed between and coupled to said hub and said disk.

6. The disk of claim 3 wherein said attachment ring is formed integral with said body of said disk.

7. The disk of claim 3 wherein said attachment ring further comprises a non-circular outside periphery for attenuating a vibration mode in said body and minimizing any standing wave formation on said disk media.

8. The disk of claim 3 wherein said attachment ring has a polygonal shaped outer periphery.

9. The disk of claim 3 wherein said attachment ring comprises one of a hexagonal shaped and an octagonal shaped outer periphery.

10. The disk of claim 3 wherein said attachment ring further comprises a bonding material for coupling said hub to said body.

11. The disk of claim 1 wherein said plurality of openings are formed in said disk body proximate said buffer zone to relieve stresses in the disk and to reduce wave formation in the flexible body of said disk when said disk is rotated.

12. The disk of claim 1 wherein said plurality of openings further comprises a substantially circular alignment disposed circumferentially in said buffer zone.

13. The disk of claim 1 wherein said plurality of openings further comprises a multiple 4×n hole pattern.

14. The disk of claim 1 wherein said plurality of openings is disposed in said body of said disk in a pattern that is spatially matched as a function of a standing wave caused by the spinning disk.

15. The disk of claim 1 wherein said openings have a circular shape.

16. The disk of claim 1 wherein said openings have a non-circular shape.

17. The disk of claim 1 wherein said plurality of openings further comprise through holes in said body of said disk.

18. The disk of claim 1 wherein said plurality of openings further comprise recesses disposed in said top surface and said bottom surface of said disk.

19. The disk of claim 1 wherein said attachment ring comprises a separate patterned adhesive piece disposed between and coupled to said hub and said disk.

20. A disk of the type comprising a flexible storage media and for use in a disk drive, said disk comprising:
 a flat substantially circular body having a geometric center, a top surface, a bottom surface, an outer peripheral edge, and an inner peripheral edge;
 an inner buffer zone disposed proximate said inner peripheral edge of said body on said top surface and said bottom surface;
 a data storage medium disposed on said top surface and said bottom surface of said body between said buffer zone and said outer peripheral edge;
 a disk hub coupled to a portion of said inner buffer zone of said body;
 a non-circular attachment ring disposed between said body and said hub proximate said inner buffer zone, wherein said attachment ring has a non-circular shape at an outer periphery of said attachment ring; and
 a plurality of openings disposed in said body of said disk proximate said buffer zone.

21. The disk of claim 20 wherein said attachment ring has a polygonal shaped outer periphery, and the number of openings comprising said plurality of openings has a 4×n opening pattern.

22. A data storage system comprising:
 a disk comprising:
  a flat substantially circular body having a geometric center, a top surface, a bottom surface, an outer peripheral edge, and an inner peripheral edge;
  an inner buffer zone disposed proximate said inner peripheral edge of said body on said top surface and said bottom surface;
  a data storage medium disposed on said top surface and said bottom surface of said body between said buffer zone and said outer peripheral edge;
  a disk hub coupled to a portion of said inner buffer zone of said body;
  a disk stability pattern disposed proximate said buffer zone of said body, said disk stability pattern providing an improved stability and compliance in said disk, wherein said disk stability pattern comprises:
   an attachment ring having a non-circular outer periphery disposed proximate a center region of said disk and said hub; and a plurality of openings disposed in said inner buffer zone of said body of said disk to provide a compliant surface on said disk in the area of said media for compliant interfacing with one or more read/write heads of said drive; and a disk drive comprising:
 a spindle motor adapted to engage and rotate said disk; and
 one or more read/write heads for reading or writing to said disk.

23. A data storage system comprising:

a disk comprising:
 a flat substantially circular body having a geometric center, a top surface, a bottom surface, an outer peripheral edge, and an inner peripheral edge;
 an inner buffer zone disposed proximate said inner peripheral edge of said body on said top surface and said bottom surface;
 a data storage medium disposed on said top surface and said bottom surface of said body between said buffer zone and said outer peripheral edge;
 a disk hub coupled to a portion of said inner buffer zone of said body;
 disk stability pattern disposed proximate said buffer zone of said body, wherein said disk stability pattern provides an improved stability and compliance in said disk, and wherein said disk stability pattern comprises a non-circular attachment ring disposed between said body and said hub, said attachment ring having a shaped outer periphery to reduce a vibration mode and a standing wave formation in the flexible body of said disk when said disk is rotated; and a disk drive comprising:
 a spindle motor adapted to engage and rotate said disk;
 a plurality of read/write heads for reading or writing to said disk.

* * * * *